United States Patent
Nagahara

(10) Patent No.: US 7,475,102 B2
(45) Date of Patent: Jan. 6, 2009

(54) RANDOM NUMBER GENERATION METHOD BASED ON MULTIVARIATE NON-NORMAL DISTRIBUTION, PARAMETER ESTIMATION METHOD THEREOF, AND APPLICATION TO SIMULATION OF FINANCIAL FIELD AND SEMICONDUCTOR ION IMPLANTATION

(76) Inventor: Yuichi Nagahara, 1139-1-508, Shinyoshidacho, Kohoku-ku, Yokohama-shi, Kanagawa 223-0056 (JP)

( * ) Notice: Subject to any disclaimer, the term of this patent is extended or adjusted under 35 U.S.C. 154(b) by 533 days.

(21) Appl. No.: 10/508,540

(22) PCT Filed: Mar. 14, 2003

(86) PCT No.: PCT/JP03/03078

§ 371 (c)(1),
(2), (4) Date: Dec. 30, 2004

(87) PCT Pub. No.: WO03/083644

PCT Pub. Date: Oct. 9, 2003

(65) Prior Publication Data
US 2005/0114098 A1 May 26, 2005

(30) Foreign Application Priority Data
Mar. 28, 2002 (JP) .............................. 2002-093355
Mar. 28, 2002 (JP) .............................. 2002-093356

(51) Int. Cl.
*G06F 1/02* (2006.01)
(52) U.S. Cl. .............................. 708/250; 703/2; 705/35; 705/36 R; 438/480; 438/506
(58) Field of Classification Search .................... 703/2; 705/35, 36 R; 438/480, 506; 708/250
See application file for complete search history.

(56) References Cited

U.S. PATENT DOCUMENTS

| 5,790,442 A | 8/1998 | Ninomiya et al. |
| 5,933,359 A | 8/1999 | Sawahata |
| 2002/0016753 A1 | 2/2002 | Torii |

FOREIGN PATENT DOCUMENTS

| JP | 8-139049 | 5/1996 |
| JP | 10-270376 | 10/1998 |
| JP | 2002-15265 | 1/2002 |
| WO | 96/18144 | 6/1996 |

OTHER PUBLICATIONS

R.G. Wilson, "The Pearson IV Distribution and its Application to Ion Implanted Depth Profiles", vol. 46, Radiation Effects, 1980, pp. 141-148.

(Continued)

*Primary Examiner*—Tan V Mai
(74) *Attorney, Agent, or Firm*—Greenblum & Bernstein, P.L.C.

(57) ABSTRACT

Random number generating method for generating random numbers in accordance with multivariate non-normal distributions based on the Yuan and Bentler method I on computer. The method includes application steps for applying n-dimensional multivariate non-normal distributions to n-dimensional experience distribution by using computer and steps for generating random numbers including pseudo-random numbers, quasi-random numbers, low discrepancy sequences, and physical random numbers by methods including additive generator method, M-sequence, generalized feedback shift-register method, and Mersenne Twister, and excluding congruential method, by using computer. The application steps use predetermined relationship equations for the third and fourth order moments to perform application associated with the third and fourth order moments of the empirical distributions. Moreover, by using random numbers generation method, parameters are estimated by maximum likelihood method. Furthermore, the random number generation method and the parameters estimated method are applied to simulation of financial field, semiconductor ion implantation, and the like.

52 Claims, 2 Drawing Sheets

OTHER PUBLICATIONS

Azzalini, A. et al. (1996) "The multivariate skew-normal distribution", Biometrika, 83, 715-726.
Devroye, L. (1984) "A Simple Algorithm for Generating Random Variates with a Log-Concave Density", Computing, 33, 247-257.
Devroye, L. (1986). Non-Uniform Random Variate Generation, 286-309, Springer-Verlag New York Inc.
Elderton, W. P. et al. (1969). Systems of Frequency Curves, 35-71, Cambridge University Press.
Fang K-T. et al. (1990). Symmetric Multivariate and Related Distributions, 80-95, Chapman & Hall, London.
Fleishmann, A. (1978). "A Method For Simulating Non-Normal Distributions", Psychometrika, 43, 521-532.
Hoadley, A. B. (1968). "Use of the Pearson densities for approximating a skew density whose left terminal and first three moments are known", Biometrika, 55,3, 559-563.
Johnson, N. L. et al. (1994). Continuous Univariate Distributions, vol. 1, 2nd ed., 14-33.
Magnus, J. R. et al. (1988). Matrix Differential Calculus with Applications in Statistics and Econometrics, 27-62.
McGrath, E. J. et al. (1973) "Techniques for Efficient Monte Carlo Simulation: vol. 2: Random Number Generation for Selected Probability Distributions", Technical Report SAI-72-590-LJ, Science Applications, Inc., La Jolla, CA.
Muirhead, R. J. (1982). Aspects of Multivariate Statistical Theory, 72-79, John Wiley, New York.
Nagahara, Y. (1999). "The PDF and CF of Pearson type IV distributions and the ML estimation of the parameters", Statistics & Probability Letters, vol. 43, 251-264.
Nagahara, Y. (2003). "Non-Gaussian filter and smoother based on the Pearson distribution system", Journal of Time Series Analysis, vol. 24, No. 6, 721-738.
Ord, J. K. (1972). Families of Frequency Distributions, 1-25, Griffin.
Parrish, R. (1983). "On an integrated approach to member selection and parameter estimation for Pearson distributions", Computational Statistics & Data Analysis, 1, 239-255.
Pearson, E. S. (1963). "Some problems arising in approximating to probability distributions, using moments", Biometrika, 50, 95-112.
Pearson, K. (1895). "Memoir on skew variation in homogeneous material", Phil. Trans. Roy. Soc., A, 186, 343-414.
Pearson, K. (1948). Tables for Statisticians and Biometricians, 1., Cambridge University Press.
Pearson, E. S. et al. (1958). Biometrika Tables for statisticians, 1., 78-85 and 206-210, Cambridge University Press.
Shorack, G. R. (2000). Probability for Statisticians, 190-191, Springer, New York.
Stuart, A. et al. (1994). Kendall's Advanced Theory of Statistics, vol. 1, 215-227, Distribution Theory, Sixth edit. Edward Arnold.
Tadikamalla, P. R. (1980) "On Simulating Non-Normal Distributions", Psychometrika, 45, 273-279.
Yuan K. -H. et al. (1997). "Generating multivariate distributions with specified marginal skewness and kurtosis", in SoftStat'97-Advances in Statistical Software 6, (W. Bandilla and F. Faulbaum, Eds.), 385-391, Lucius & Lucius, Stuttgart, Germany.
Yuan K. -H. et al. (1999a). "On Normal Theory and Associated Test Statistics in Covariance Structure Analysis Under Two Classes of Nonnormal Distributions", Statist. Sinica, 9, 831-853.
Yuan K. -H. et al. (1999b). "On asymptotic distributions of normal theory MLE in covariance structure analysis under some nonnormal distributions", Statistics & Probability Letters, 42, 107-113.
Yuan K. -H. et al. (2000). "Inferences on Correlation Coefficients in Some Classes of Nonnormal Distributions", Journal of Multivariate Analysis, 72, 230-248.
Vale, D. et al. (1983). "Simulating Multivariate Nonnormal Distributions", Psychometrika, 48, 465-471.
Matsumoto M. et al. (1998), "Mersenne Twister: A 623-Dimensionally Equidistributed Uniform Pseudo-Random Number Generator", ACM Transaction on Modeling and Computer Simulation, vol. 8, 3-30 pp.
Press, W. et al. (1992), Numerical Recipes in Fortran 77, Second edition, Cambridge Univ. Press, 298-305.
Konno, H. (1998), "Rizai Kougaku II", Nikka Giren, 68-77.
Konno, H. et al. (1998) "A Branch and Bound Algorithm for Solving Mean-Risk-Skewness Portfolio Models)", Optimization Methods and Software, vol. 10,297-317pp.
Konno, H. et al. (1993) "A Mean-Absolute Deviation-Skewness portfolio Optimization Model" Annals of Operations Research,vol. 45,205-220.
Konno, H. et al. (1995) "A Mean-Variance-Skewness Portfolio Optimization Model", Journal of the Operations Research Society of Japan, vol. 38, 173-187pp.
Burt, C. (1963) "Is Intelligence Distributed Normally?", The British Journal of Statistical Psychology, vol. 16 (XVI), No. 2, 175-190.
Nagahara, Y., (2001) "A Method of Simulating Multivariate Nonnormal Distributions by the Pearson Distribution System", The Institute of Statistical Mathematics, Research Memorandum No. 814, Sep. 28, 2001.
"A Guide to the Pearson Type IV Distribution", J. Heinrich, CDF/Memo/Statistics/Public/6820, which was downloaded from www.doe.gov/engine/content/do?BT CODE=ST SS16 on Feb. 22, 2004.
"The PDF and CF of Pearson Type IV Distributions and the ML Estimation of the Parameters", Y. Nagahara, Statistics and Probability Letters, vol. 43, 1999, pp. 251-264.
"International Statistical Institute", downloaded from http://www.cbs.nl/isi/; dated Apr. 2, 2004.
"International Association for Statistical Computing (IASC)", downloaded from http://www.cbs.nl/isi/iasc.htm, dated Apr. 2, 2004.
English Language Abstract of JP 8-139049.
English Language Abstract of JP 10-270376.
English Language Abstract of JP 2002-15265.
"A Method of Simulating Multivariate Nonnormal Distributions by the Pearson Distribution System and Estimation", Y. Nagahara, Computational Statistics & Data Analysis, vol. 47, 2004, pp. 1-29.
Nagahara, Y., "Non-Gaussian Distribution for Stock Returns and Related Stochastic Differential Equation", Financial Engineering and Japanese Markets, pp. 121-149 (1996).
Nagahara, Y., "Cross-Sectional-Skew-Dependent Distribution Models for Industry Returns in the Japanese Stock Market", Financial Engineering and Japanese Markets, pp. 139-154 (1995).
Nagahara, Y, and Kitagawa, G., "A non-Gaussian Stochastic Volatility Model", Journal of Computational Finance, pp. 33-47 (1999).
Premaratne, G., and Bera, A., "Modeling Asymmetry and Excess Kurtosis in Stock Return Data". University of Illinois, Department of Economics (2001).
Rodriguez, N., "Bayesian Model Estimation and Selection for the Weekly Colombian Exchange Rate", Revista de Economia del Rosorio, vol. 4, No. 2, pp. 143-172 (2000).
Verhoeven, P., and McAleer, M., "Fat Tails and Asymmetry in Financial Volatility Models", Mathematics and Computers in Simulation, vol. 64, pp. 351-361 (2003).

RANDOM NUMBER GENERATION METHOD BASED ON MULTIVARIATE NON-NORMAL DISTRIBUTION, PARAMETER ESTIMATION METHOD THEREOF, AND APPLICATION TO SIMULATION OF FINANCIAL FIELD AND SEMICONDUCTOR ION IMPLANTATION

FIELD OF THE INVENTION

The present invention relates to method for generating random numbers from multivariate non-normal distributions and estimation of its parameters and method for generating random numbers from Pearson type IV distribution and computer programs.

BACKGROUND OF THE INVENTION

There are only a few methods of generating multivariate non-normal distributions. Such distributions are strongly requested by the area of multivariable analysis and statistical modeling.

Fleishmann (1978), Tadikamalla (1980), Vale and Mavrelli (1983) proposed a method for generating multivariate non-normal distributions. Its disadvantage of this method is that it is hard to calculate the population fourth order moment matrix of the simulated random vector. Yuan and Bentler (1997) proposed a procedure of generating multivariate non-normal distributions with specified marginal skewness and kurtosis considering the fourth order moment matrix.

In this description, the method I that they called is the following: $\xi_1, \ldots, \xi_m$ are independent random variables with $E(\xi_j)=0$, $E(\xi_j^2)=1$, $E(\xi_j^3)=\zeta_j$, $E(\xi_j^4)=\kappa_j$ and $\xi=(\xi_1, \ldots, \xi_m)'$. $v$ is a random variable which is independent of $\xi$, $E(v)=0$, $E(v^2)=1$, $E(v^3)=\gamma$, $E(v^4)=\beta$. Furthermore, $T=(t_{ij})$ are a non-random p rows m columns matrix of rank p such that $TT'=\Sigma$ and $m \geq p$. Then the random vector given by the following formula (1), $$X = vT\xi \quad (1)$$

generally following a non-elliptical distribution with Cov $(X)=\Sigma$. Cov (•) is the covariance matrix of vector $X=(x_1, \ldots, x_n)'$. The marginal skewness and kurtosis of $x_i$ are given respectively by the following formula (2) and (3)

$$\text{skew}(x_i) = \gamma \sum_{j=1}^{m} t_{ij}^3 \zeta_j / \sigma_{ii}^{3/2} \quad (2)$$

$$\text{kurt}(x_i) = \beta \left\{ \sum_{j=1}^{m} t_{ij}^4 (\kappa_j - 3) / \sigma_{ii}^2 + 3 \right\} \quad (3)$$

The X follow an elliptical distribution when $\xi \sim N_m(0,I)$ and $\Pr(v \geq 0)=1$ (Nm is m-dimensional normal distributions and Pr denotes probability) (Fang, Kotz and Ng (1990)). Let $v=1$, $z_1, \ldots, z_p$ be independent standard variables and $\xi=|z_1|-E(|z_1|)$, $\xi_j=z_j, j=2, \ldots, p$ then the X in the formula (1) follow the skew-normal distribution as defined by Azzalini and Valle (1996).

Advantage of this method above is that the population fourth order moment matrix is easily calculated. Let S be the sample covariance based on a sample of size n from X in the formula (1). Let vech(•) be an operator which transforms a symmetric matrix into a vector by picking the non-duplicated elements of the matrix, and s=vech(S). Then the asymptotic covariance matrix of s is given $\Gamma/n$, where $\Gamma=\text{var}(\text{vech}(XX'))$ (var denotes variance) and is given by the following formula (4), $$\Gamma = 2\beta D_p^+(\Sigma \otimes \Sigma) D_p^{+\prime} + \quad (4)$$
$$(\beta - 1)\text{vech}(\Sigma)\text{vech}'(\Sigma) + \beta \sum_{j=1}^{m} (\kappa_j - 3)\text{vech}(t_j t_j')\text{vech}'(t_j t_j')$$

$t_j$ being the jth column vector of $T=(t_{ij})$ and ⊗ is the Kronecker product. $D_p$ is the p-order Duplication matrix. $D_p^+$ being the Moore-Penrose generalized inverse of $D_p$.

After that, they studied the theory of test statics (Yuan and Bentler (1999a, 1999b, 2000)). Yuan and Bentler recommended Fleishmann (1978) method for generating random vector. However, its distribution has not so wide skewness and kurtosis. In contrast to this, the Pearson distribution system has the following characteristics.

(1) The Pearson distribution system represent wide class of distributions with various skewness and kurtosis. The Pearson system includes some well-known distributions, Gamma, Beta, t-distribution, etc.
(2) The Pearson distribution system is characterized by its four moments. This characteristics is sufficient for applying Yuan and Bentler's method.
(3) Random numbers from the Pearson distribution system except type IV is generated by using random numbers from the Normal and Gamma distributions.
(4) Recently, we developed a practical approach of using almost all types of its distribution system including the type IV distribution which was difficult to implement (Nagahara (2002)).

We introduce the Pearson distribution system. K. Pearson (1895) defined the Pearson distribution system by the following differential equation (5) with respect to the probability density function p, $$-\frac{p'}{p} = \frac{b_0 + b_1 x}{c_0 + c_1 x + c_2 x^2} \quad (5)$$

Nevertheless, the Pearson type IV distribution was difficult to implement due to the difficulty in computing the normalizing constant. In the previous paper (Nagahara (1990)), by deriving recursive formulas for computing it, the author overcome various difficulties. After that, we developed a practical approach of using almost all types of its distribution system including the type IV distribution for non-Gaussian filter (Nagahara (2002)). These studies lead us to use the Pearson distribution system practically.

A glossary of researchers and texts referred to this distribution system (Pearson (1914), Pearson and Hartrey (1954), Pearson (1963), Hoadley (1968), Elderton and Johnson (1969), Ord (1972), Parrish (1983), Johnson, Kotz and Balakrishnan (1994), Stuart and Ord (1994)).

The references are the followings:

[1] Azzalini, A. and Valle, A. D. (1996) "The multivariate skew-normal distribution", Biometrika, 83, 715-726.
[2] Devroye, L. (1984) "A simple algorithm for generating random variates with a log-concave density", Computing, 33, 247-257.
[3] Devroye, L. (1986). Non-Uniform Random Variate Generation, Springer, New York.

[4] Elderton, W. P. and Johnson, N. L. (1969). Systems of Frequency Curves, Cambridge University Press.
[5] Fang K. - T, Kotz, S. and Ng, K. W. (1990). Symmetric Multivariate and Related Distributions, Chapman & Hall, London.
[6] Fleishmann, A. (1978). "A method for simulating non-normal distributions", Psychometrika, 43, 521-532.
[7] Hoadley, A. B. (1968). "Use of the Pearson densities for approximating a skew density whose left terminal and first three moments are known", Biometrika, 55, 3, 559-563.
[8] Johnson, N. L., Kotz, S. and Balakrishnan, N. (1994). Continuous univariate distributions-1, 2nd ed. John Wiley.
[9] Magnus, J. R. and Neudecker, H. (1988). Matrix Differential Calculus with Applications in Statistics and Econometrics, Wiley, New York.
[10] McGrath E. J. and Irving, D. C. (1973) "Techniques for efficient Monte Carlo simulation: volume 2: random number generation for selected probability distributions", Technical Report SAI-72-590-LJ, Science Applications, Inc., La Jolla, Calif.
[11] Muirhead, R. J. (1982). Aspects of Multivariate Statistical Theory, Wiley, N.Y.
[12] Nagahara, Y. (1999). "The PDF and CF of Pearson type IV distributions and the ML estimation of the parameters", Statistics & Probability Letters, Vol. 43, 251-264.
[13] Nagahara, Y. (2002). "Non-Gaussian filter and smoother based on the Pearson distribution system", Journal of Time Series Analysis, forthcoming.
[14] Ord, J. K. (1972). Families of Frequency Distributions, Griffin.
[15] Parrish, R. (1983). "On an integrated approach to member selection and parameter estimation for Pearson distributions", Computational Statistics & Data Analysis, 1, 239-255.
[16] Pearson, E. S. (1963). "Some problems arising in approximating to probability distributions, using moments", Biometrika, 50, 95-111.
[17] Pearson, K. (1895). "Memoir on skew variation in homogeneous material", Phil. Trans. Roy. Soc., A, 186, 343-414.
[18] Pearson, K. (1914). Tables for Statisticians and Biometricians, 1., Cambridge University Press.
[19] Pearson, E. S. and Hartrey, H. O. (1954). Biometrika Tables for statisticians, 1., Cambridge University Press.
[20] Shorack, G. R. (2000). Probability for Statisticians, Springer, N.Y.
[21] Stuart, A. and Ord, J. K. (1994). Kendall's Advanced Theory of Statistics, Vol. 1, Distribution Theory, Sixth edit.. Edward Arnold.
[22] Tadikamalla, P. R. (1980) "On simulating non-normal distributions", Psychometrika, 45, 273-279.
[23] Yuan K. -H. and Bentler P. M. (1997) "Generating multivariate distributions with specified marginal skewness and kurtosis", in SoftStat'97-Advances in Statistical Software 6, (W. Bandilla and F. Faulbaum, Eds.), 385-391, Lucius & Lucius, Stuttgart, Germany.
[24] Yuan K. -H. and Bentler P. M. (1999a). "On normal theory and associated test statistics in covariance structure analysis under two classes of nonnormal distributions", Statist. Sinica, 9, 831-853.
[25] Yuan K. -H. and Bentler P. M. (1999b). "On asymptotic distributions of normal theory MLE in covariance structure analysis under some nonnormal distributions", Statistics & Probability Letters, 42, 107-113.
[26] Yuan K. -H. and Bentler P. M. (2000), "Inferences on correlation coefficients in some classes of nonnormal distributions", Journal of Multivariate Analysis, 72, 230-248.
[27] Vale, D. and Maurelli, V. A. (1983). "Simulating Multivariate Nonnormal Distribuions", Psychometrika, 48, 465-471.

By the way, in aspect of not only test statistics but also statistical modeling, the methods to construct the approximate distributions to the empirical distributions by introducing the non-normal distributions are more requested. And, the stable estimation of multivariate non-normal distributions from small samples are also requested.

SUMMARY OF THE INVENTION

With the foregoing in view it is an object of the present invention to provide a random number generating method according to multivariate non-normal distributions by the use of random numbers generated in accordance with Pearson distributions or general probability distributions for constructing distributions approximating empirical distributions, a parameter estimation method of multivariate non-normal distributions, a random number generating method in accordance with a Pearson type IV distribution and a computer program thereof.

According to an aspect of the present invention, a random number generating method for generating random numbers in accordance with multivariate non-normal distributions based on the Yuan and Bentler method I on a computer, includes: a step for fitting n-dimensional multivariate non-normal distributions for n-dimensional empirical distributions by using a computer; and a step for generating the random numbers including pseudo-random numbers by means of methods including additive generator method, M-sequence, generalized feedback shift-register method, and Mersenne Twister, and excluding congruential method, quasi-random numbers, low discrepancy sequences, and physical random numbers, with the use of a computer; said fitting step using the following formulae (11) and (12) for an application with respect to the third and fourth order moments of said empirical distributions:

$$E(vech(XX')X') = \gamma D_n^+(T \otimes T)\left(\sum_{j=1}^m \zeta_j E_{ii} \otimes e_i\right)T' \quad (11)$$

and $$var(vech(XX')) =$$

$$2\beta D_n^+(\Sigma \otimes \Sigma)D_n^{+'} + (\beta - 1)vech(\Sigma)vech'(\Sigma) + \quad (12)$$

$$\beta \sum_{j=1}^m (\kappa_j - 3)vech(t_j t_j')vevh'(t_j t_j'),$$

where E (•) is an expectation (and so forth), vech (•) is a vector consists of matrix elements being not duplicated in symmetrical matrix, $D_n$ is n-order duplication matrix, $D_n^{30}$ is the Moore-Penrose generalized inverse matrix of $D_n$, $\otimes$ is the Kronecker product, and $E_n$ is $e_i e_i'$ when $e_i$ is ith column unit; wherein said Yuan and Bentler method I is as follows: independent random variables $\xi_1, \ldots, \xi_m$ satisfy E ($\xi_j$)=0, E ($\xi_j^2$)=1, E ($\xi_j^3$)=$\zeta_j$, E ($\xi_j^4$)=$\kappa_j$ (1≦j≦m) with respect to parameters $\zeta_j$ and $\kappa_j$; a random variable v independent from $\xi_j$ satisfies E (v)=0, E(v²)=1, E (v³)=$\gamma$, E (v⁴)=$\beta$ with respect to parameters $\gamma$ and $\beta$; a non-random n×m (m≦n) matrix T=($t_{ij}$)

of n rank satisfies TT'=Σ with respect to a matrix Σ=$(\sigma_{ij})$ where the matrix T' is a transposed matrix of T wherein a random vector X=$(x_1, \ldots, x_n)$' given by the following expression (13) satisfies Cov (X)=Σ:

$$X = \nu T \xi, \tag{13}$$

Cov (•) is a variance covariance matrix of a vector, and ξ=$(\xi_1, \ldots, \xi_m)$'.

Desirably, random numbers in accordance with the Pearson distribution system are used for the random variables $\xi_1, \ldots, \xi_m$ and ν.

Desirably, at least two or more types of Pearson distribution are used for the random variables $\xi_1, \ldots, \xi_m$ and ν.

Desirably, said fitting step determines at least one of parameters T, ζ=$(\zeta_1, \ldots, \zeta_m)$, γ, κ=$(\kappa_1, \ldots, \kappa_m)$, and β which minimize a value of an expression (16) with respect to the third and fourth order moments of n-dimensional empirical distributions (random vector is to be $(X_1, \ldots, X_n)$') which are given by expressions (14) and (15), respectively:

$$m_{ijk} = E(X_i X_j X_k) \tag{14}$$

$$m_{ijkl} = E(X_i X_j X_k X_l), \tag{15}$$

and $$\sum_{i \leq j \leq k} w_{ijk}(f_{ijk}(T, \zeta, \gamma, \kappa, \beta) - m_{ijk})^2 + \tag{16}$$

$$\sum_{i \leq j \leq k \leq l} w_{ijkl}(f_{ijkl}(T, \zeta, \gamma, \kappa, \beta) - m_{ijkl})^2,$$

where $f_{ijk}$ (T, ζ, γ, κ, β) and $f_{ijkl}$ (T, ζ, γ, κ, β) are represented in accordance with the formulae (14) and (15) corresponding respectively to the third order moment E $(x_i x_j x_k)$ and the fourth order moment E $(x_i x_j x_k x_l)$, and $w_{ijk}$ and $w_{ijkl}$ are predetermined weights, respectively.

Herein, a notation $$\sum_{i \leq j \leq k}$$

represents a summation $$\sum_{i=1}^{n} \sum_{j=1}^{n} \sum_{k=1}^{n}$$

(i≤j≤k), wherein an operand of the summation is summed is summed up with respect to all possible combinations of i, j, k that satisfy each conditions of 1≤i≤n, 1≤j≤n, 1≤k≤n, i≤j≤k. Similarly, a notation $$\sum_{i \leq j \leq k \leq l}$$

represents $$\sum_{i=1}^{n} \sum_{j=1}^{n} \sum_{k=1}^{n} \sum_{l=1}^{n}$$

(i≤j≤k≤l), wherein an operand of the summation is summed up with respect to all possible combination of i, j, k, l that satisfy each condition of 1≤i≤n, 1≤j≤n, 1≤k≤n, 1≤l≤n and i≤j≤k≤l.

With regard to the above mentioned $m_{ijk}=E(X_i X_j X_k)$ and $m_{ijkl}=E(X_i X_j X_k X_l)$, a data distribution $(X_1, \ldots, X_n)$' consists of N data vectors $(x_{l,q}, \ldots, x_{n,q})$' as the following expression (17), wherein x represents each data (realized value), and 1≤q≤N.

$$\begin{pmatrix} X_1 \\ \vdots \\ X_n \end{pmatrix} \rightarrow \begin{pmatrix} x_{1,1} \\ \vdots \\ x_{n,1} \end{pmatrix}, \begin{pmatrix} x_{1,2} \\ \vdots \\ x_{n,2} \end{pmatrix}, \ldots, \begin{pmatrix} x_{1,N} \\ \vdots \\ x_{n,N} \end{pmatrix} \tag{17}$$

Said $m_{ijk}$ and $m_{ijkl}$ are calculated according to the following expressions (18) and (19) by the use of data for elements of data vectors.

$$m_{ijk} = \sum_{q=1}^{N} x_{i,q} \cdot x_{j,q} \cdot x_{k,q} \cdot \frac{1}{N} \tag{18}$$

$$m_{ijkl} = \sum_{q=1}^{N} x_{i,q} \cdot x_{j,q} \cdot x_{k,q} \cdot x_{l,q} \cdot \frac{1}{N} \tag{19}$$

Desirably, $w_{ijk}=1$ and $w_{ijkl}=1$.

Desirably, n=2, and said fitting step determines at least one of parameters T, ζ=$(\zeta_1, \zeta_2)$, γ, κ=$(\kappa_1, \kappa_2)$, and β so as to minimize a value given by an expression (24) with respect to the third and fourth order moments of two-dimensional empirical distributions (random vector is to be $(X_1, X_2)$') given respectively by expressions (20) and (21), and representations corresponding respectively to the third order moment E $(x_i x_j x_k)$ given by the expression (22) and the fourth order moment E $(x_i x_j x_k x_l)$ given by the expression (23):

$$m_1 = E(X_1^3), \tag{20}$$
$$m_2 = E(X_2^3),$$
$$m_3 = E(X_1^2 X_2),$$
$$m_4 = E(X_1 X_2^2),$$

$$m_5 = E(X_1^4), \tag{21}$$
$$m_6 = E(X_2^4),$$
$$m_7 = E(X_1^3 X_2),$$
$$m_8 = E(X_1^2 X_2^2),$$
$$m_9 = E(X_1 X_2^3),$$

$$f_1 = \gamma t_{11}^3 \zeta_1 + \gamma t_{12}^3 \zeta_2, \tag{22}$$
$$f_2 = \gamma t_{21}^3 \zeta_1 + \gamma t_{22}^3 \zeta_2,$$
$$f_3 = \gamma t_{11}^2 t_{21} \zeta_1 + \gamma t_{12}^2 t_{22} \zeta_2,$$
$$f_4 = \gamma t_{11} t_{21}^2 \zeta_1 + \gamma t_{21} t_{22}^2 \zeta_2,$$

-continued $$f_5 = \beta[t_{11}^4(\kappa_1 - 3) + t_{21}^4(\kappa_2 - 3) + 3\sigma_{11}^2] \quad (23)$$
$$= \beta t_{11}^4 \kappa_1 + 6\beta t_{11}^2 t_{21}^2 + \beta t_{12}^4 \kappa_2,$$
$$f_6 = \beta[t_{12}^4(\kappa_1 - 3) + t_{22}^4(\kappa_2 - 3) + 3\sigma_{22}^2]$$
$$= \beta t_{21}^4 \kappa_1 + 6\beta t_{22}^2 t_{12}^2 + \beta t_{22}^4 \kappa_2,$$
$$f_7 = \beta[t_{11}^3 t_{21} \kappa_1 + 3(t_{11} t_{21}^3 + t_{11}^2 t_{22} t_{21}) + t_{21}^3 t_{22} \kappa_2],$$
$$f_8 = \beta[t_{11}^2 t_{21}^2 \kappa_1 + (t_{12}^4 + 4t_{11} t_{21}^2 t_{22} + t_{11}^2 t_{22}^2) + t_{21}^2 t_{22}^2 \kappa_2],$$
$$f_9 = \beta[t_{11} t_{21}^3 \kappa_1 + 3(t_{22} t_{12}^3 + t_{22}^2 t_{11} t_{21}) + t_{21} t_{22}^3 \kappa_2],$$
and $$\sum_{i=1}^{9} w_i (f_i(T, \zeta, \gamma, \kappa, \beta) - m_i)^2. \quad (24)$$

Desirably, $w_i = 1$.

Desirably, at least one of the parameters $T$, $\zeta = (\zeta_1, \ldots, \zeta_m)$, $\gamma$, $\kappa = (\kappa_1, \ldots, \kappa_m)$, and $\beta$ is estimated by the maximum likelihood method.

Desirably, types to which said random variables belong are determined with the use of at least one of correspondence relationships between values of $\kappa$ indicated in table 1:

TABLE 1

| | |
|---|---|
| $0 < \kappa < 1$ | Pearson IV Type |
| $\kappa > 1$ | Pearson VI Type(Beta II Type) |
| $\kappa < 0$ | Pearson I Type(Beta I Type) |
| $\kappa = 0, \beta_1 = 0, \beta_2 < 3$ | Pearson II Type(Beta I Type) |
| $\kappa = 0, \beta_1 = 0, \beta_2 = 3$ | Normal |
| $\kappa = 0, \beta_1 = 0, \beta_2 > 3$ | Pearson VII Type |
| $\kappa = \pm\infty, 2\beta_2 - 3\beta_1 - 6 = 0$ | Pearson III Type(Gamma) |
| $\kappa = 1$ | Pearson V Type | and types of distribution by employing a value of $\kappa$ given by the following expression: (25):

$$\kappa = \frac{\beta_1(\beta_2 + 3)^2}{4(2\beta_2 - 3\beta_1 - 6)(4\beta_2 - 3\beta_1)}, \quad (25)$$

where $\beta_1$ is square of skewness, $\beta_2$ is kurtosis, and $\kappa$ in the expression (25) and the table 1 differs from said parameters $\kappa = (\kappa_1, \ldots, \kappa_m)$.

Desirably, random numbers $Z$ are generated by employing at least one generating methods shown in the following tables 2 and 3 in response to said types determined:

TABLE 2

| Type | Pearson VI | Pearson I | Pearson II |
|---|---|---|---|
| Generator | $X \sim \text{Gamma}(m)$<br>$Y \sim \text{Gamma}(\beta)$ | $X \sim \text{Gamma}(p)$<br>$X \sim \text{Gamma}(q)$ | $X \sim \text{Gamma}(p)$<br>$Y \sim \text{Gamma}(p)$ |
| Random Numbers | (Skewness > 0)<br>$Z = \alpha \dfrac{(X+Y)}{X} - \alpha + a$<br>(Skewness < 0)<br>$Z = \alpha \dfrac{(X+Y)}{X} + \alpha + a$ | $Z = b \dfrac{X}{(X+Y)} + a$ | $Z = b \dfrac{X}{(X+Y)} + a$ |
| Transformation Formula | $r = \dfrac{6(\text{Kurtosis} - (\text{Skewness})^2 - 1)}{6 + 3 \times (\text{Skewness})^2 - 2 \times \text{Kurtosis}} (< 0)$ | $r = \dfrac{6(\text{Kurtosis} - (\text{Skewness})^2 - 1)}{6 + 3 \times (\text{Skewness})^2 - 2 \times \text{Kurtosis}} (< 0)$ | $p = \dfrac{3 - 3 \times \text{Kurtosis}}{2 \times \text{Kurtosis} - 6}$ |
| | $r_1 = \dfrac{1}{2}(r-2) + \dfrac{1}{2}r(r+2)\sqrt{\dfrac{(\text{Skewness})^2}{(\text{Skewness})^2(r+2)^2 + 16(r+1)}}$ | $r_3 = \dfrac{1}{2}r + \dfrac{1}{2}r(r+2)\sqrt{\dfrac{(\text{Skewness})^2}{(\text{Skewness})^2(r+2)^2 + 16(r+1)}}$ | $b = \sqrt{4(2p+1)\text{Var}}$ |
| | $r_2 = \dfrac{1}{2}(r-2) - \dfrac{1}{2}r(r+2)\sqrt{\dfrac{(\text{Skewness})^2}{(\text{Skewness})^2(r+2)^2 + 16(r+1)}}$ | $r_4 = \dfrac{1}{2}r - \dfrac{1}{2}r(r+2)\sqrt{\dfrac{(\text{Skewness})^2}{(\text{Skewness})^2(r+2)^2 + 16(r+1)}}$ | $a = \text{Mean} - \dfrac{b}{2}$ |
| | $\beta = \text{Max}[r_1, r_2] + 1$<br>$m = -\text{Min}[r_1, r_2] - \beta$ | $q = \text{Max}[r_3, r_4]$ (Skewness > 0)<br>$\text{Min}[r_3, r_4]$ (Skewness < 0) | |
| | $\alpha = \sqrt{\dfrac{\text{Var} \times (m-1)^2(m-2)}{(m+\beta-1)\beta}}$ | $p = \text{Max}[r_3, r_4]$ (Skewness > 0)<br>$\text{Min}[r_3, r_4]$ (Skewness < 0) | |
| | $a = \text{Mean} - \dfrac{\alpha\beta}{m-1}$ (Skewness > 0)<br>$\text{Mean} + \dfrac{\alpha\beta}{m-1}$ (Skewness < 0) | $b = (p+q)\sqrt{\dfrac{\text{Var} \times (p+q+1)}{pq}}$<br>$a = \text{Mean} - \dfrac{bp}{p+q}$ | | and

TABLE 3

| Type | Gaussian | Pearson VII | Pearson III | Pearson V |
|---|---|---|---|---|
| Generator | $X \sim$ Normal $(0, 1)$ | $X \sim$ Normal $(0, 1)$<br>$Y \sim$ Gamma $\left(b - \frac{1}{2}\right)$ | $X \sim$ Gamma $(\alpha)$ | $X \sim$ Gamma $(\nu)$ |
| Random Numbers | $Z = \sigma X + \mu$ | $Z = \tau \dfrac{x}{\sqrt{2Y}} + \mu$ | (Skewness > 0)<br>$Z = \beta X + \gamma$<br>(Skewness < 0)<br>$Z = -\beta X + \gamma$ | (Skewness > 0)<br>$Z = \dfrac{\lambda}{X} + a$<br>(Skewness < 0)<br>$Z = -\dfrac{\lambda}{X} + a$ |
| Transformation Formula | $\mu =$ Mean<br>$\sigma = \sqrt{\text{Var}}$ | $b = \dfrac{5 \times \text{Kurtosis} - 9}{2 \times \text{Kurtosis} - 6}$<br>$\tau = \sqrt{(2b - 3) \times \text{Var}}$<br>$\mu =$ Mean | $\alpha = \dfrac{4}{(\text{Skewness})^2}$<br>$\beta = \sqrt{\dfrac{\text{Var}}{\alpha}}$<br>$\gamma =$ Mean $- \alpha\beta$ (Skewness > 0)<br>Mean $+ \alpha\beta$ (Skewness < 0) | $\nu = \dfrac{16 + 6 \times (\text{Skewness})^2 + 8 \times \sqrt{4 + (\text{Skewness})^2}}{2 \times (\text{Skewness})^2}$<br>$\lambda = (\nu - 1)\sqrt{\text{Var} \times (\nu - 2)}$<br>$a =$ Mean $- \dfrac{\lambda}{\nu - 1}$ (Skewness > 0)<br>Mean $+ \dfrac{\lambda}{\nu - 1}$ (Skewness < 0) |

Desirably, random numbers according to Pearson type IV distribution are generated by a step for calculating normalizing constant by using a computer based on an analytical solution of the normalization constant in the Pearson type IV distribution or the expansion represented by the following expression (26):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (26)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2};$$

and a step for generating the random numbers by means of rejection method with the use of the computer.

According to yet another aspect of the present invention, a random number generating method in accordance with a Pearson type IV distribution, includes: a step for calculating normalizing constant by using a computer on an analytical solution of the normalizing constant in the Pearson type IV distribution or the expansion represented by the following expression (27):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (27)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

-continued $$\approx \frac{1}{B\left(b - \frac{1}{2}, \frac{1}{2}\right)} \times \prod_{k=0}^{n} \frac{1}{1 + \left(\frac{b\delta}{b+k}\right)^2};$$

and a step for generating the random numbers by means of rejection method with the use of the computer; said step for generating random numbers are based on the random numbers generated by the use of the computer including pseudo-random numbers by means of methods including additive generator method, M-sequence, generalized feedback shift-register method, and Mersenne Twister, and excluding congruential method, quasi-random numbers, low discrepancy sequences, and physical random numbers.

Desirably, according to yet another aspect of the present invention, a random number generating method in accordance with multivariate non-normal distributions, includes: a step for acquiring data of empirical distributions $\{X_1', \ldots, X_N'\}$ with respect to data vector $X_i'$ consisting of n data $x_{1,i}' \sim x_{n,i}'$ by using a computer; a step for standardizing said data $\{X_1', \ldots, X_N'\}$ to obtain $\{X_1, \ldots, X_N\}$ by using the computer; a step for calculating a variance covariance matrix $\Sigma$ based on said data of standardized $\{X_1, \ldots, X_N\}$ by using the computer; a step for calculating third order moment $m_{ijk}$ ($1 \leq i \leq j \leq k \leq n$) based on said standardized data $\{X_1, \ldots, X_N\}$ by using the computer; a step for calculating fourth order moment $m_{ijkl}$ ($1 \leq i \leq j \leq k \leq l \leq n$) based on said standardized data $\{X_1, \ldots, X_N\}$ by using the computer; a step for calculating a matrix T from said variance covariance matrix $\Sigma$ by using the computer; a step for introducing a loss function wherein a difference between the third other moment $m_{ijk}$ ($1 \leq i \leq j \leq k \leq n$) as well as the fourth order moment $m_{ijkl}$ ($1 \leq i \leq j \leq k \leq l \leq n$) and $f_{ijk}$ (T, $\zeta$, $\gamma$, $\kappa$, $\beta$) as well as $f_{ijkl}$ (T, $\zeta$, $\gamma$, $\kappa$, $\beta$) (where $\zeta = (\zeta_1, \ldots, \zeta_m)$, $\kappa = (\kappa_1, \ldots, \kappa_m)$) is made to be a loss by using the computer with assuming that distributions according to said data vector have non-normal distributions which satisfy X=vTξ (where ξ is random vector $(\xi_1, \ldots, \xi_m)'$ consisting of m (where m>n) random variables $\xi_1 \sim \xi_m$. Independent random variables $\xi_1, \ldots, \xi_m$ satisfy E $(\xi_j)$=0, E $(\xi_j^2)$=1, E $(\xi_j^3)$=$\zeta_j$, E $(\xi_j^4)$=$v_j$ $(1 \leq j \leq m)$ with respect to parameters $\zeta_j$ and $\kappa_j$. Further, a random variable v independent from $\xi_j$ satisfies E (v)=0, E $(v^2)$=1, E $(v^3)$=$\gamma$, and E$(v^4)$=$\beta$ with respect to parameters $\gamma$ and $\beta$.) to determine the parameters T, $(\zeta_1, \ldots, \zeta_m)$, $\gamma$, $(v_1, \ldots, \kappa_m)$, and $\beta$ so as to minimize a risk function assessed as a whole under the condition of TT'=Σ(T' is a transposed matrix of T); a step for determining that said random vector $(\xi_1, \ldots, \xi_m)'$ and the random variable v belong to which type of Pearson distributions based on said determined parameters $(\zeta_1, \ldots, \zeta_m)$, $\gamma$, $(v_1, \ldots, v_m)$ and $\beta$ by using the computer in accordance with the following expression (28):

$$\kappa = \frac{\beta_1(\beta_2+3)^2}{4(2\beta_2 - 3\beta_1 - 6)(4\beta_2 - 3\beta_1)}, \tag{28}$$

and table 4 ($\beta_1$ is square of skewness and $\beta_2$ is kurtosis):

TABLE 4

| | |
|---|---|
| 0 < κ < 1 | Pearson IV Type |
| κ > 1 | Pearson VI Type(Beta II Type) |
| κ < 0 | Pearson I Type(Beta I Type) |
| κ = 0, $\beta_1$ = 0, $\beta_2$ < 3 | Pearson II Type(Beta I Type) |
| κ = 0, $\beta_1$ = 0, $\beta_2$ = 3 | Normal |
| κ = 0, $\beta_1$ = 0, $\beta_2$ > 3 | Pearson VII Type |
| κ = ±∞, 2$\beta_2$ − 3$\beta_1$ − 6 = 0 | Pearson III Type(Gamma) |
| κ = 1 | Pearson V Type | a step for generating random numbers including pseudo-random numbers by means of methods including additive generator method, M-sequence, generated feedback shift-register method, and Mersenne Twister, and excluding congruential method, quasi-random numbers, low discrepancy sequences, and physical random numbers, by using a computer to calculate random numbers with respect to said random vector $(\xi_1, \ldots, \xi_m)'$ and said random variable v based on the random numbers which have been already generated; a step for calculating the standardized random numbers of X based on X=vTξ by using the computer; and a step for transforming the standardized random numbers of X into the random numbers before standardization by using the computer; where $\beta_1$ is square of skewness, $\beta_2$ is kurtosis, and κ differs from said parameter κ=$(\kappa_1, \ldots, \kappa_m)$ in said expression (28) and table 4.

Desirably, according to yet another aspect of the present invention, a random number generating method in accordance with multivariate non-normal distributions, includes: a step for acquiring data of empirical distributions $\{X_1', \ldots, X_N'\}$ with respect to data vector $X_i'$ consisting of n data $x_{1,i}' \sim x_{n,i}'$ by using a computer; a step for standardizing said data $\{X_1', \ldots, X_N'\}$ to obtain $\{X_1, \ldots, X_N\}$ by using the computer; a step for calculating a variance covariance matrix Σ based on said standardized data $\{X_1, \ldots, X_N\}$ by using the computer; a step for calculating third order moment $m_{ijk}$ $(1 \leq i \leq j \leq k \leq n)$ based on said standardized data $\{X_1, \ldots, X_N\}$ by using the computer; a step for calculating fourth order moment $m_{ijkl}$ $(1 \leq i \leq j \leq k \leq l \leq n)$ based on said standardized data $\{X_1, \ldots, X_N\}$ by using the computer; a step for calculating a matrix T satisfying T=$\Sigma^{1/2}$ (square root of the matrix) from said variance covariance matrix Σ by using the computer; a step for introducing a loss function wherein a difference between the third order moment $m_{ijk}$ $(1 \leq i \leq j \leq k \leq n)$ as well as the fourth order moment $m_{ijkl}$ $(1 \leq i \leq j \leq k \leq l \leq n)$ and $f_{ijk}$ $(\zeta, \gamma, \kappa, \beta)$ as well as $f_{ijkl}$ $(\zeta, \gamma, \kappa, \beta)$ (where $\zeta$=$(\zeta_1, \ldots, \zeta_m)$, $\kappa$=$(\kappa_1, \ldots, \kappa_m)$) is made to be a loss by using the computer with assuming that distributions according to said data vector have non-normal distributions which satisfy X=vTξ (where ξ is random vector $(\xi_1, \ldots, \xi_m)'$ consisting of m (where m=n) random variables $\xi_1 \sim \xi_m$. Independent random variables $\xi_1, \ldots, \xi_m$ satisfy E $(\xi_j)$=0, E $(\xi_j^2)$=1, E $(\xi_j^3)$=$\zeta_j$, E $(\xi_j^4)$=$v_j$ $(1 \leq j \leq m)$ with respect to parameters $\zeta_j$ and $\kappa_j$. Further, a random variable v independent from $\xi_j$ satisfies E(v)=0, E $(v^2)$=1, E $(v^3)$=$\gamma$, and E $(v^4)$=$\beta$ with respect to parameters $\gamma$ and $\beta$.) to determine the parameters $(\zeta_1, \ldots, \zeta_m)$, $\gamma$, $(\kappa_1, \ldots, \kappa_m)$, and $\beta$ so as to minimize a risk function assessed as a whole; a step for determining that said random vector $(\xi_1, \ldots, \xi_m)'$ and the random variable v belong to which type of Pearson distributions based on said determined parameters $(\zeta_1, \ldots, \zeta_m)$, $\gamma$, $(v_1, \ldots, v_m)$, and $\beta$ by using the computer in accordance with the following expression (29):

$$\kappa = \frac{\beta_1(\beta_2+3)^2}{4(2\beta_2 - 3\beta_1 - 6)(4\beta_2 - 3\beta_1)} \tag{29}$$

and table 5 ($\beta_1$ is square of skewness and $\beta_2$ is kurtosis):

TABLE 5

| | |
|---|---|
| 0 < κ < 1 | Pearson IV Type |
| κ > 1 | Pearson VI Type(Beta II Type) |
| κ < 0 | Pearson I Type(Beta I Type) |
| κ = 0, $\beta_1$ = 0, $\beta_2$ < 3 | Pearson II Type(Beta I Type) |
| κ = 0, $\beta_1$ = 0, $\beta_2$ = 3 | Normal |
| κ = 0, $\beta_1$ = 0, $\beta_2$ > 3 | Pearson VII Type |
| κ = ±∞, 2$\beta_2$ − 3$\beta_1$ − 6 = 0 | Pearson III Type(Gamma) |
| κ = 1 | Pearson V Type | a step for generating random numbers including pseudo-random numbers by means of methods including additive generator method, M-sequence, generalized feedback shift-register method, and Mersenne Twister, and excluding congruential method, quasi-random numbers, low discrepancy sequences, and physical random numbers, with the use of a computer to a calculate random numbers with respect to said random vector $(\xi_1, \ldots, \xi_m)$ and said random variable v based on the random numbers which have been already generated; a step for calculating the standardized random numbers of X based on X=vTξ by using the computer; and a step for transforming the standardized random numbers of X into the random numbers before standardization by using the computer Herein, data of empirical distributions $\{X_1', \ldots, X_N'\}$ mean as the following:

$$X_1' = \begin{pmatrix} x_{1,1}' \\ x_{2,1}' \\ \vdots \\ x_{n,1}' \end{pmatrix}, \ldots, X_N' = \begin{pmatrix} x_{1,N}' \\ x_{2,N}' \\ \vdots \\ x_{n,N}' \end{pmatrix} \tag{30}$$

wherein $X_r'$ $(1 \leq r \leq n)$ represents a data vector differs from said notation X in data distribution $(X_1, \ldots, X_n)'$. The same applies to normalized data $\{X_1, \ldots, X_n\}$.

In said expression (29) and table 5, $\beta_1$ is square of skewness, $\beta_2$ is kurtosis, and $\kappa$ differs from said parameter $\kappa = (\kappa_1, \ldots, \kappa_m)$.

Desirably, said loss function (L) and said risk function (R) are given by either pair of expressions (31) and (32), (33) and (34), or (35) and (36):

$$L(x, y) = (x - y)^2, \qquad (31)$$

$$R = \sum_{i \leq j \leq k} w_{ijk}(f_{ijk}(T, \zeta, \gamma, \kappa, \beta) - m_{ijk})^2 + \qquad (32)$$
$$\sum_{i \leq j \leq k \leq l} w_{ijkl}(f_{ijkl}(T, \zeta, \gamma, \kappa, \beta) - m_{ijkl})^2,$$

$$L(x, y) = |x - y|, \qquad (33)$$

$$R = \sum_{i \leq j \leq k} w_{ijk}|f_{ijk}(T, \zeta, \gamma, \kappa, \beta) - m_{ijk}| + \qquad (34)$$
$$\sum_{i \leq j \leq k \leq l} w_{ijkl}|f_{ijkl}(T, \zeta, \gamma, \kappa, \beta) - m_{ijkl}|,$$

$$L(x, y) = |x - y|^p \, (p > 0), \qquad (35)$$
and
$$R = \sum_{i \leq j \leq k} w_{ijk}|f_{ijk}(T, \zeta, \gamma, \kappa, \beta) - m_{ijk}|^p + \qquad (36)$$
$$\sum_{i \leq j \leq k \leq l} w_{ijkl}|f_{ijkl}(T, \zeta, \gamma, \kappa, \beta) - m_{ijkl}|^p.$$

Desirably, random numbers Z are generated in response to said type determined by employing at least one generating method shown in the following tables 6 and 7:

TABLE 6

| Type | Pearson VI | Pearson I | Pearson II |
| --- | --- | --- | --- |
| Generator | X~Gamma (m)<br>Y~Gamma ($\beta$) | X~Gamma (p)<br>X~Gamma (q) | X~Gamma (p)<br>Y~Gamma (p) |
| Random Numbers | (Skewness > 0)<br>$Z = \alpha \dfrac{(X+Y)}{X} - \alpha + a$<br>(Skewness < 0)<br>$Z = \alpha \dfrac{(X+Y)}{X} + \alpha + a$ | $Z = b\dfrac{X}{(X+Y)} + a$ | $a = \text{Mean} - \dfrac{b}{2}$ |
| Transformation Formula | $r = \dfrac{6(\text{Kurtosis} - (\text{Skewness})^2 - 1)}{6 + 3 \times (\text{Skewness})^2 - 2 \times \text{Kurtosis}} \; (<0)$ | $r = \dfrac{6(\text{Kurtosis} - (\text{Skewness})^2 - 1)}{6 + 3 \times (\text{Skewness})^2 - 2 \times \text{Kurtosis}} \; (<0)$ | $p = \dfrac{3 - 3 \times \text{Kurtosis}}{2 \times \text{Kurtosis} - 6}$ |
| | $r_1 = \dfrac{1}{2}(r-2) + \dfrac{1}{2}r(r+2)\sqrt{\dfrac{(\text{Skewness})^2}{(\text{Skewness})^2(r+2)^2 + 16(r+1)}}$ | $r_3 = \dfrac{1}{2}r + \dfrac{1}{2}r(r+2)\sqrt{\dfrac{(\text{Skewness})^2}{(\text{Skewness})^2(r+2)^2 + 16(r+1)}}$ | $b = \sqrt{4(2p+1)\text{Var}}$ |
| | $r_2 = \dfrac{1}{2}(r-2) - \dfrac{1}{2}r(r+2)\sqrt{\dfrac{(\text{Skewness})^2}{(\text{Skewness})^2(r+2)^2 + 16(r+1)}}$ | $r_4 = \dfrac{1}{2}r - \dfrac{1}{2}r(r+2)\sqrt{\dfrac{(\text{Skewness})^2}{(\text{Skewness})^2(r+2)^2 + 16(r+1)}}$ | $a = \text{Mean} - \dfrac{b}{2}$ |
| | $\beta = \text{Max}[r_1, r_2] + 1$<br>$m = -\text{Min}[r_1, r_2] - \beta$ | $q = \text{Max}[r_3, r_4]$ (Skewness > 0)<br>$\text{Min}[r_3, r_4]$ (Skewness < 0) | |
| | $\alpha = \sqrt{\dfrac{\text{Var} \times (m-1)^2 (m-2)}{(m + \beta - 1)\beta}}$ | $p = \text{Max}[r_3, r_4]$ (Skewness > 0)<br>$\text{Min}[r_3, r_4]$ (Skewness < 0) | |
| | $a = \text{Mean} - \dfrac{\alpha \beta}{m-1}$ (Skewness > 0)<br>$\text{Mean} + \dfrac{\alpha \beta}{m-1}$ (Skewness < 0) | $b = (p+q)\sqrt{\dfrac{\text{Var} \times (p+q+1)}{pq}}$<br>$a = \text{Mean} - \dfrac{bp}{p+q}$ | |

TABLE 7

| Type | Gaussian | Pearson VII | Pearson III | Pearson V |
|---|---|---|---|---|
| Generator | X~Normal (0, 1) | X~Normal (0, 1) <br> Y~Gamma $\left(b - \frac{1}{2}\right)$ | X~Gamma ($\alpha$) | X~Gamma ($\nu$) |
| Random Numbers | $Z = \sigma X + \mu$ | $Z = \tau \frac{x}{\sqrt{2Y}} + \mu$ | (Skewness > 0) <br> $Z = \beta X + \gamma$ <br> (Skewness < 0) <br> $Z = -\beta X + \gamma$ | (Skewness > 0) <br> $Z = \frac{\lambda}{X} + a$ <br> (Skewness < 0) <br> $Z = -\frac{\lambda}{X} + a$ |
| Transformation Formula | $\mu$ = Mean <br> $\sigma = \sqrt{\text{Var}}$ | $b = \frac{5 \times \text{Kurtosis} - 9}{2 \times \text{Kurtosis} - 6}$ <br> $\tau = \sqrt{(2b - 3) \times \text{Var}}$ <br> $\mu$ = Mean | $\alpha = \frac{4}{(\text{Skewness})^2}$ <br> $\beta = \sqrt{\frac{\text{Var}}{\alpha}}$ <br> $\gamma$ = Mean $- \alpha\beta$ (Skewness > 0) <br> Mean $+ \alpha\beta$ (Skewness < 0) | $\nu = \frac{16 + 6 \times (\text{Skewness})^2 + 8 \times \sqrt{4 + (\text{Skewness})^2}}{2 \times (\text{Skewness})^2}$ <br> $\lambda = (\nu - 1)\sqrt{\text{Var} \times (\nu - 2)}$ <br> $a$ = Mean $- \frac{\lambda}{\nu - 1}$ (Skewness > 0) <br> Mean $+ \frac{\lambda}{\nu - 1}$ (Skewness < 0) |

Desirably, random numbers according to a Pearson type IV distribution are generated with the use of a computer by a step for calculating normalizing constant based on an analytical solution of the normalizing constant in the Pearson type IV distribution or the expansion represented by the following expression (37):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (37)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2};$$

and a step for generating the random numbers by means of rejection method with the use of the computer.

According to yet another aspect of the present invention, a parameter estimation method of multivariate non-normal distributions, includes: a step for calculating the multivariate non-normal distributions given by a random vector X= $(x_1, \ldots, x_n)'$ obtained as a product of a random variable $\nu$ in accordance with a predetermined probability distribution, a non-random n×m (m≦n) matrix T of a rank n, and random vector $\xi=(\xi_1, \ldots, \xi_m)'$ in accordance with a predetermined probability distribution as indicated by the following expression (38) by using a computer:

$$X_{\nu T\xi;} \quad (38)$$

and a step for estimating the parameters by the maximum likelihood method.

Desirably, said step for estimating the parameters by the maximum likelihood method includes: a step for dividing n-dimensional space by using a computer; a step for dividing the number of random numbers belonging to respective divisions to which $X_i$ belongs with respect to empirical distribution data $\{X_1, \ldots, X_N\}$ by the total number of the random numbers by using the computer to determine a probability of the questioned division given by the following expression (39):

$$P_i(\theta) = \frac{\text{the number of points belonging to division of } Xi}{\text{the number of all the points}}; \quad (39)$$

a step for dividing said probability of division by an N-dimensional volume of the questioned division to determine a likelihood $f_i(\theta)$ of the division given by the following expression (40):

$$f_i(\theta) = \frac{P_i(\theta)}{(\Delta h)^n}, \quad (40)$$

to which said $X_i$ belongs by using the computer; and a step for estimating the parameters $\theta$ by which a product $\Pi_{i=1}^N fi(\theta)$ of the likelihood or a sum of logarithmic likelihood $\Sigma_{i=1}^N$ long $fi(\theta)$ comes to be the maximum by using the computer.

Desirably, random numbers according to the Pearson distribution system are employed for the random variables $\xi_1, \ldots, \xi_m$ and $\nu$.

Desirably, at least two or more types of Pearson distribution are employed for random variables $\xi_1, \ldots, \xi_m$ and $\nu$.

Desirably random numbers according to a Pearson type IV distribution are generated with the use of a computer by a step for calculating normalizing constant based on an analytical solution of the normalizing constant in the Pearson type IV distribution or the expansion represented by the following expression (41):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (41)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{\infty} \frac{1}{1 + \left(\frac{b\delta}{b+k}\right)^2};$$

and a step for generating the random numbers by means of rejection method with the use of the computer.

Desirably, a step for fitting n-dimensional multivariate non-normal distributions for n-dimensional empirical distributions based on the Yuan and Bentler method I by employing the following formulae (42) and (43) with the use of a computer is included:

$$E(vech(XX')X') = \gamma D_n^+ (T \otimes T)\left(\sum_{j=1}^{m} \zeta_j E_{ii} \otimes e_i\right)T' \quad (42)$$

and $$\text{var}(vech(XX')) = 2\beta D_n^+ (\Sigma \otimes \Sigma) D_n^{+'} + \quad (43)$$
$$(\beta - 1) vech(\Sigma) vech'(\Sigma) +$$
$$\beta \sum_{j=1}^{m} (\kappa_j - 3) vech(t_j t_j') vech'(t_j t_j');$$

and parameters θ are estimated with respect to neighborhood of the parameters determined in said step for fitting, where E (•) is an expectation (and so forth), vech (•) is a vector consists of matrix elements being not duplicated by symmetrical matrix, $D_n$ is n-order duplication matrix, $D_n^{30}$ is the Moore-Penrose generalized inverse matrix $D_n$, ⊗ is the Kronecker product, and $E_{ii}$ is $e_i e_i'$ when $e_i$ is ith column unit; wherein said Yuan and Bentler method I is as follows: independent random variables $\xi_1, \ldots, \xi_m$ satisfy E ($\xi_j$)=0, E ($\xi_j^2$)=1, E ($\xi_j^3$)=$\zeta_j$, E ($\xi_j^4$)=$\kappa_j$ (1≦j≦m) with respect to parameters $\zeta_j$ and $v_j$; a random variable v independent from $\xi_j$ satisfies E (v)=0, E (v²)=1, E (v³)=γ, E (v⁴)=β with respect to parameters γ and β; a non-random n×m (m≦n) matrix T=($t_{ij}$) of n rank satisfies TT'=Σ with respect to a matrix Σ=($\sigma_{ij}$) where the matrix T' is a transposed matrix of T wherein a random vector X= ($x_1, \ldots, x_n$)' given by the following expression (44) satisfies Cov (X)=Σ;

$$X = vT\xi, \quad (44)$$

where Cov (•) is a variance covariance matrix of a vector, and $\xi=(\xi_1, \ldots, \xi_m)'$.

Desirably, said parameter θ represents at least one of the parameters T, $\zeta=(\zeta_1, \ldots, \zeta_m)$, γ, $\kappa=(\kappa_1, \ldots, \kappa_m)$, and β.

Desirably, random numbers including pseudo-random numbers by means of methods including additive generator method, M-sequence, generalized feedback shift-register method, and Mersenne Twister, and excluding congruential method, quasi-random numbers, low discrepancy sequences, and physical random numbers, are generated by using a computer.

Desirably, according to yet another aspect of the present invention, a parameter estimation method of multivariate non-normal distributions, includes: a step for fitting n-dimensional multivariate non-normal distributions for n-dimensional empirical distributions based on the Yuan and Bentler method I by employing the following formulae (45) and (46) with the use of a computer:

$$E(vech(XX')X') = \gamma D_n^+ (T \otimes T)\left(\sum_{j=1}^{m} \zeta_j E_{ii} \otimes e_i\right)T' \quad (45)$$

and $$\text{var}(vech(XX')) = 2\beta D_n^+ (\Sigma \otimes \Sigma) D_n^{+'} + \quad (46)$$
$$(\beta - 1) vech(\Sigma) vech'(\Sigma) +$$
$$\beta \sum_{j=1}^{m} (\kappa_j - 3) vech(t_j t_j') vech'(t_j t_j');$$

a step for calculating random numbers with respect to the following X by using a computer with assuming that the n-dimensional empirical distributions have non-normal distributions which satisfy X=vTξ (where ξ is random vector ($\xi_1, \ldots, \xi_m$)' consisting of m (where m=n) random variables $\xi_1 \sim \xi_m$. Independent random variables $\xi_1, \ldots, \xi_m$ satisfy E ($\xi_j$)=0, E ($\xi_j^2$)=1, E ($\xi_j^3$)=$\zeta_j$, E ($\xi_j^4$)=$\kappa_j$ (1≦j≦m) with respect to parameters $\kappa_j$ and $v_j$. Further, a random variable v independent from $\xi_j$ satisfies E (v)=0, E (v²)=1, E (v³)=γ, and E (v⁴)=β with respect to parameters γ and β.); a step for dividing spaces concerning respective random varies $x_1$ to $x_n$ with a predetermined spacing Δh by using the computer to divide the n-dimensional spaces into hypercubes of $(\Delta h)^n$; a step for dividing the number of random numbers existing in sections $(\Delta h)^n$ to which respective data vectors belong by the total number of the random numbers with the use of the computer to calculate a probability $P_i(\theta)$ of the questioned sections $(\Delta h)^n$; a step for dividing said probability $P_i(\theta)$ by n-dimensional volume $(\Delta h)^n$ to calculate a likelihood $f_i(\theta)$ of the sections $(\Delta h)^n$ to which said data vectors belong with the use of the computer; and a step for estimating a parameter θ by which a product $\Pi_{i=1}^{N} fi(\theta)$ of the likelihood or a sum of logarithmic likelihood $\Sigma_{i=1}^{N} \log fi(\theta)$ comes to be the maximum by using the computer, where E (•) is an expectation (and so forth), vech (•) is a vector consists of matrix elements being not duplicated in symmetrical matrix, $D_n$ is n-order duplication matrix, $D_n^+$ is the Moore-Penrose generalized inverse matrix of $D_n$, ⊗ is the Kronecker product, and $E_{ii}$ is $e_i e_i'$ when $e_i$ is ith column, unit; wherein said Yuan and Bentler method I is as follows: independent random variables $\xi_1, \ldots, \xi_m$ satisfy E ($\xi_j$)=0, E ($\xi_j^2$)=1, E ($\xi_j^3$)=$\zeta_j$, E ($\xi_j^4$)=$\kappa_j$ (1≦j≦m) with respect to parameters $\zeta_j$ and $\kappa_j$; a random variable v independent from $\xi_j$ satisfies E (v)=0, E (v²)=1, E (v³)=γ, E (v⁴)=β with respect to parameters γ and β; a non-random n×m (m≦n) matrix T=($t_{ij}$) of n rank satisfies TT'=Σ with respect to a matrix Σ=($\sigma_{ij}$) where the matrix T' is a transported matrix of T wherein random vector X=($x_1, \ldots, x_n$)' given by the following expression (47) satisfies Cov (X)=Σ:

$$X = vT\xi. \quad (47)$$

where Cov (•) is a variance covariance matrix of a vector, and $\xi=(\xi_1, \ldots, \xi_m)'$.

Desirably, random numbers according to the Pearson distribution system are employed for the random variables $\xi_1, \ldots, \xi_m$ and v.

Desirably, at least two or more types of Pearson distribution are employed for random variables $\xi_1, \ldots, \xi_m$ and v.

Desirably, random numbers according to a Pearson type IV distribution are generated with the use of a computer by a step for calculating normalizing constant based on an analytical solution of the normalizing constant in the Pearson type IV distribution or the expansion represented by an expression (48):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (48)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{\infty} \frac{1}{1 + \left(\frac{b\delta}{b+k}\right)^2};$$

and a step for generating the random numbers by means of rejection method with the use of the computer.

Desirably, random numbers including pseudo-random numbers by means of methods including additive generator method, M-sequence, generalized feedback shift-register method, and Mersenne Twister, and excluding congruential method, quasi-random numbers, low discrepancy sequences, and physical random numbers, are generated by using a computer.

According to yet another aspect of the present invention, a calculation method of expected amount of loss, includes a step for fitting n-dimensional multivariate non-normal distributions for n-dimensional profit and loss distributions of n types of assets constituting a portfolio to calculate the expected amount of loss in a simulation in accordance with said procedures.

According to yet another aspect of the present invention, a simulation method of financial instruments, includes a step for simulating the characteristics of the financial instruments by using a computer based on random numbers according to said multivariate non-normal distributions by employing said procedures.

According to yet another aspect of the present invention, designing and pricing method of weather-insurance derivatives, includes a step for employing said procedures.

According to yet another aspect of the present invention, a method of asset allocation includes a step for employing said procedures.

According to yet another aspect of the present invention, a simulation method of ion implantation, includes a step for simulating ion distributions according to ion implantation with the use of a computer based on random numbers in accordance with said multivariate non-normal distributions by employing said procedures.

According to yet another aspect of the present invention, a method of assessment of human ability includes a step for employing said procedures.

Desirably, according to yet another aspect of the present invention, a calculation method of expected amount of loss wherein multivariate non-normal distributions are employed on the basis of the Yuan and Bentler method I on a computer, and n-dimensional multivariate non-normal distributions are applied to n-dimensional profit and loss distributions of n types of assets constituting a portfolio to calculate the expected amount of loss in a simulation, includes: a step for fitting the n-dimensional multivariate non-normal distributions for n-dimensional empirical distributions with the use of a computer; a step for generating random numbers by using the computer; and said fitting step employing the following formulae (49) and (59) with respect to an application as to third and fourth order moments of said empirical distributions:

$$E(vech(XX')X') = \gamma D_n^+(T \otimes T)\left(\sum_{j=1}^{m} \zeta_j E_{ii} \otimes e_i\right)T' \quad (49)$$

and $$\text{var}(vech(XX')) = 2\beta D_n^+(\Sigma \otimes \Sigma)D_n^{+'} + \quad (50)$$
$$(\beta - 1)vech(\Sigma)vech'(\Sigma) +$$
$$\beta \sum_{j=1}^{m} (\kappa_j - 3)vech(t_j t_j')vech'(t_j t_j');$$

where E (•) is an expectation (and so forth), vech (•) is a vector consists of matrix elements being not duplicated in symmetrical matrix, $D_n$ is n-order duplication matrix, $D_n^+$ is the Moore-Penrose generalized inverse matrix of $D_n$, $\otimes$ is the Kronecker product, and $E_{ii}$ is $e_i e_i'$ when $e_i$ is ith column unit; wherein said Yuan and Bentler method I is as follows: independent random variables $\xi_1, \ldots, \xi_m$ satisfy E $(\xi_j)$=0, E $(\xi_j^2)$=1, E $(\xi_j^3)$=$\zeta_j$, E $(\xi_j^4)$=$v_j$ $(1 \leq j \leq m)$ with respect to parameters $\zeta_j$ and $v_j$; a random variable $v$ independent from $\xi_j$ satisfies E $(v)$=0, E $(v^2)$=1, E $(v^3)$=$\gamma$, E $(v^4)$=$\beta$ with respect to parameters $\gamma$ and $\beta$; a non-rancom n×m $(m \leq n)$ matrix T=$(t_{ij})$ of n rank satisfies TT'=$\Sigma$ with respect to a matrix $\Sigma$=$(\sigma_{ij})$ where the matrix T' is a transposed matrix of T wherein random vector X=$(x_i, \ldots, x_n)'$ given by the following expression (51) satisfies Cov (X)=$\Sigma$:

$$X = vT\xi, \quad (51)$$

where Cov (•) is a variance covariance matrix of a vector, and $\xi = (\xi_1, \ldots, \xi_m)'$.

Desirably, according yet another aspect of the present invention, a simulation method of financial instruments wherein multivariate non-normal distributions are employed according to the Yuan and Bentler method I on a computer to simulate the characteristics of the financial instruments based on random numbers in accordance with said multivariate non-normal distributions, includes: a step for fitting n-dimensional multivariate non-normal distributions for n-dimensional empirical distributions by using a computer; a step for generating random numbers by using the computer; and said fitting step employing the following formulae (52) and (53) with respect to an application as to third and fourth order moments of said empirical distributions:

$$E(vech(XX')X') = \gamma D_n^+(T \otimes T)\left(\sum_{j=1}^{m} \zeta_j E_{ii} \otimes e_i\right)T' \quad (52)$$

and $$\text{var}(vech(XX')) = 2\beta D_n^+(\Sigma \otimes \Sigma)D_n^{+'} + \quad (53)$$
$$(\beta - 1)vech(\Sigma)vech'(\Sigma) +$$
$$\beta \sum_{j=1}^{m} (\kappa_j - 3)vech(t_j t_j')vech'(t_j t_j'),$$

where E (•) is an expectation (and so forth), vech (•) is a vector consists of matrix elements being not duplicated in symmetrical matrix, $D_n$ is n-order duplication matrix, $D_n^{30}$ is the Moore-Penrose generalized inverse matrix of $D_n$, ⊗ is the Kronecker product, and $E_{ii}$ is $e_i e_i'$ when $e_i$ is ith column unit; wherein said Yuan and Bentler method I is as follows: independent random variables $\xi_1, \ldots, \xi_m$ satisfy E $(\xi_j)=0$, E $(\xi_j^2)=1$, E $(\xi_j^3)=\zeta_j$, E $(\xi_j^4)=\kappa_j$ $(1 \leq j \leq m)$ with respect to parameters $\zeta_j$ and $\kappa_j$; a random variable ν independent from $\xi_j$ satisfies E (ν)=0, E (ν²)=1, E (ν³)=γ, E (ν⁴)=β with respect to parameters γ and β; a non-random n×m (m≦n) matrix T=$(t_{ij})$ of n rank satisfies TT'=Σ with respect to a matrix Σ=$(\sigma_{ij})$ where the matrix T' is a transposed matrix of T wherein a random vector X=$(x_1, \ldots, x_n)'$ given by the following expression (54) satisfies Cov (X)=Σ:

$$X = \nu T \xi, \quad (54)$$

where Cov (•) is a variance covariance matrix of a vector, and $\xi = (\xi_1, \ldots, \xi_m)'$.

Desirably, a simulation method of ion implantation wherein multivariate non-normal distributions are employed according to the Yuan and Bentler method I on a computer to simulate ion distributions according to ion implantation with the use of a computer based on random numbers in accordance with said multivariate non-normal distributions, includes: a step for fitting n-dimensional multivariate non-normal distributions for n-dimensional empirical distributions by using a computer; a step for generating random numbers by using the computer; and said fitting step employing the following formulae (55) and (56) with respect to an application as to third and fourth order moments of said empirical distributions:

$$E(vech(XX')X') = \gamma D_n^+ (T \otimes T) \left( \sum_{j=1}^{m} \zeta_j E_{ii} \otimes e_i \right) T' \quad (55)$$

and $$\text{var}(vech(XX')) = 2\beta D_n^+ (\Sigma \otimes \Sigma) D_n^{+'} + (\beta - 1) vech(\Sigma) vech'(\Sigma) + \beta \sum_{j=1}^{m} (\kappa_j - 3) vech(t_j t_j') vech'(t_j t_j'), \quad (56)$$

where E (•) is an expectation (and so forth), vech (•) is a vector consists of matrix elements being not duplicated in symmetrical matrix, $D_n$ is n-order duplication matrix, $D_n^+$ is the Moore-Penrose generalized inverse matrix of $D_n$, ⊗ is the Kronecker product, and $E_{ii}$ is $e_i e_i'$ when $e_i$ is ith column unit; wherein said Yuan and Bentler method I is as follows: independent random variables $\xi_1, \ldots, \xi_m$ satisfy E $(\xi_j)=0$, E $(\xi_j^2)=1$, E $(\xi_j^3)=\zeta_j$, E $(\xi_j^4)=\kappa_j$ $(1 \leq j \leq m)$ with respect to parameters $\zeta_j$ and $\kappa_j$; a random variable ν independent from $\xi_j$ satisfies E (ν)=0, E (ν²)=1, E (ν³)=γ, E (ν⁴)=β with respect to parameters γ and β; a non-random n×m (m≦n) matrix T=$(t_{ij})$ of n rank satisfies TT'=Σ with respect to a matrix Σ=$(\sigma_{ij})$ where the matrix T' is a transposed matrix of T wherein a random vector X=$(x_1, \ldots, x_n)'$ given by the following expression (57) satisfies Cov (X)=Σ:

$$X = \nu T \xi, \quad (57)$$

where Cov (•) is a variance covariance matrix of a vector, and $\xi = (\xi_1, \ldots, \xi_m)'$.

Desirably, according to said simulation method of ion implantation, random numbers according to a Pearson type IV distribution are generated with the use of a computer by a step for calculating normalizing constant based on an analytical solution of the normalizing constant in the Pearson type IV distribution or the expansion represented by the following expression (58):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (58)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{\infty} \frac{1}{1 + \left(\frac{b\delta}{b+k}\right)^2};$$

and a step for generating the random numbers by means of rejection method with the use of the computer.

According to yet another aspect of the present invention, a computer program executable by means of a computer includes a step for realizing said procedures. Desirably, the program is supplied by at least one of optical disk, magnetic disk, magneto optical disk, or electromagnetic tape.

PREFERRED EMBODIMENTS OF THE INVENTION

Figure 1:
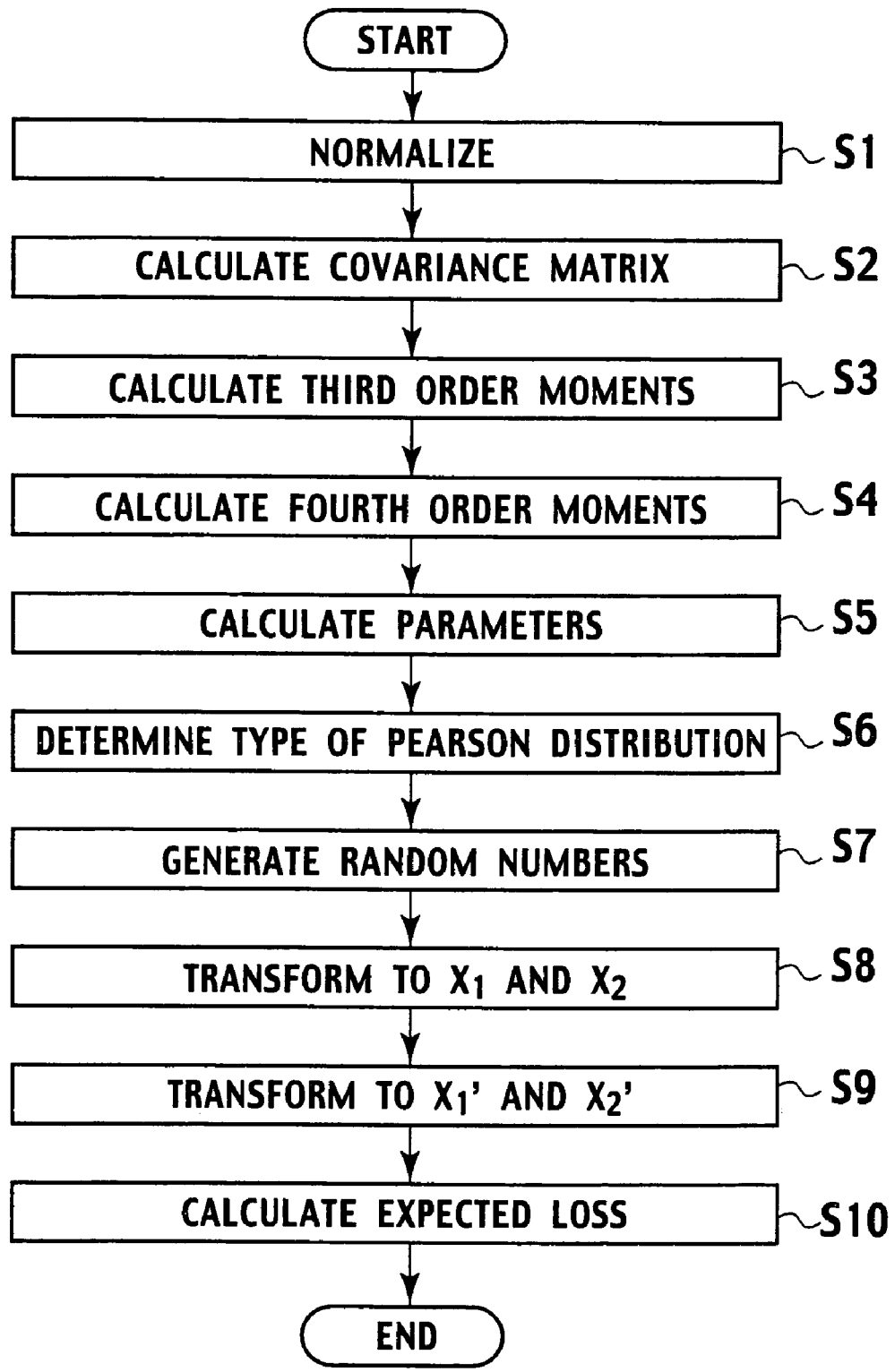
FIG. 1 is the flowchart of the procedure to calculate the expected loss.

Preferred embodiments of the present invention which are the method of generating random numbers of multivariate non-normal distributions, the estimation of the parameters of multivariate non-normal distributions, generating random numbers of the Pearson type IV distribution, and the embodiments of computer programs, the method of calculating the expected loss in the risk management, will now be described in detail in accordance with the accompanying drawings.

The outline of these embodiments is as follows.

1. The Pearson Distribution System and Random Generators
   1.1 The Pearson Distribution System
   1.2 Generating Random Numbers from the Pearson Type IV
   1.3 Generating Random Numbers from the Pearson Distribution System
2. Generating Multivariate Non-normal Distributions by Using the Pearson Distribution System
   2.1 Random Vector of Multivariate Non-normal Distribution
   2.2 Simulation
   2.3 Procedure for Fitting in Application
3. Maximum Likelihood Method
4. Embodiments
5. Modifications
   5.1 Simulation Method for Financial Instruments
   5.2 Ion Implantation of Semiconductor Materials
   5.3 Asset Allocation
   5.4 Assessment of Human Ability For preferred embodiments, method of simulating multivariate non-normal distributions by using the Pearson distribution system which represents wide class of distributions with various skewness and kurtosis will be proposed. Firstly, a procedure of generating random numbers from the Pearson distribution system including the type IV distribution which was difficult to implement will be derived. Secondly, the Pearson distribution system will be applied to generate random numbers from the multivariate non-normal distributions by using the method developed by Yuan and Bentler (1997). thirdly, by using the third order moment matrix obtained by inventor of this invention, we will construct the approximated multivariate non-normal distributions by fitting the third and fourth order moment matrix to the empirical distributions. Fourthly, the estimation of the parameters by maximum likelihood method will be proposed. The fact that these estimation methods of the parameters estimate its parameters of multivariate non-normal distributions much more precisely than method of moments will be shown. Moreover, the fact that these methods can be applied to various business area will be shown by explaining operative example of the expected loss in the area of risk management. Lastly, as modifications, simulation method of financial instruments, ion implantation of semiconductor materials, asset allocation and assessment of human ability will be proposed.

1. The Pearson Distribution System and Random Generators 1.1 The Pearson Distribution System The types of the Pearson distribution system are classified by the following parameters, $\kappa$. The $\kappa$ is defined by the following formula (71).

$$\kappa = \frac{\beta_1(\beta_2 + 3)^2}{4(2\beta_2 - 3\beta_1 - 6)(4\beta_2 - 3\beta_1)} \tag{71}$$

where $\beta_1$ and $\beta_2$ are squared skewness and kurtosis, respectively.

For $\kappa<0$, $0<\kappa<1$ and $1<\kappa$, the distribution is called Type I, IV and VI, respectively. These three cases are called "the main type" (Elderton and Johnson (1969)). The type III ($\kappa=\pm\infty$) lies on the boundaries between the type I and the type VI. The type V ($\kappa=1$) lies on the boundaries between the type IV and the type VI. For the case of $\kappa=0$, the type VII, the type II and the normal distribution are included.

In the Pearson distribution system, if the type is specified, the three or four parameters of its distribution can be determined from the mean, variance, skewness and kurtosis. The typical relation between squared skewness and kurtosis is shown in many textbooks (Johnson, Kotz and Balakrishnan (1994), Stuart and Ord (1994) etc.).

Firstly, as shown in Tables 11–14, the Pearson distribution system is classified into eight types by the most appropriate representation and the explicit form of the density function and the mean, variance, skewness and kurtosis are given.

Secondly, we also show the transformation formula and procedure for obtaining the parameters of each type from the moments. The transformation formulae for each type are also shown in Tables 11–14. In these Tables, we can easily calculate all parameters in order through the transformation formula.

TABLE 11

THE DISTRIBUTION AND TRANSFORMATION FORMULA

| Type | Pearson IV | | Pearson VI (Beta II) | |
|---|---|---|---|---|
| Criteria | $0 < \kappa < 1$ | | $\kappa > 1$ | |
| Domain | $-\infty < x < \infty$ | | $x \geqq a$ (Skewness > 0) | |
| | | | $x \leqq a$ (Skewness < 0) | |
| Restriction | $\tau > 0, b > \dfrac{1}{2}$ | | $\alpha > 0, \beta > 0, m > 0$ | |
| Probability Density Density Function (p.d.f) | $\dfrac{\Gamma(b+b\delta i)\Gamma(b-b\delta i)\tau^{2b-1}}{\Gamma(b)\Gamma\left(b-\dfrac{1}{2}\right)\pi^{\frac{1}{2}}}$ | $\dfrac{\exp\left\{2b\delta \arctan\left(\dfrac{x-\mu}{\tau}\right)\right\}}{\{(x-\mu)^2+\tau^2\}^b}$ | $\dfrac{\alpha^m(x-a)^{\beta-1}}{B(\beta,m)(\alpha+x-a)^{m+\beta}}$ | (Skewness > 0) |
| | | | $\dfrac{\alpha^m(a-x)^{\beta-1}}{B(\beta,m)(\alpha+a-x)^{m+\beta}}$ | (Skewness < 0) |
| Mean | $\dfrac{b\delta\tau}{b-1} + \mu$ | | $a + \dfrac{\alpha\beta}{m-1}$ | (Skewness > 0) |
| | | | $a - \dfrac{\alpha\beta}{m-1}$ | (Skewness < 0) |
| Variance | $\dfrac{\tau^2}{2b-3}\left\{1+\left(\dfrac{b}{b-1}\delta\right)^2\right\}$ | | $\dfrac{\alpha^2(m+\beta-1)\beta}{(m-1)^2(m-2)}$ | |
| Skewness | $\dfrac{2b(2b-3)^{\frac{1}{2}}}{(b-1)(b-2)}$ | $\dfrac{\delta^2}{\left\{1+\left(\dfrac{b}{b-1}\delta\right)^2\right\}^{\frac{1}{2}}}$ | $\dfrac{2(2\beta+m-1)\sqrt{(m-2)}}{(m-3)\sqrt{\beta(\beta+m-1)}}$ | (Skewness > 0) |
| | | | $-\dfrac{2(2\beta+m-1)\sqrt{(m-2)}}{(m-3)\sqrt{\beta(\beta+m-1)}}$ | (Skewness < 0) |

TABLE 11-continued

THE DISTRIBUTION AND TRANSFORMATION FORMULA

| Type | Pearson IV | Pearson VI (Beta II) |
|---|---|---|
| Kurtosis | $\dfrac{3(2b-3)}{(2b-5)} \dfrac{\left\{1 + \dfrac{b+2}{b-2}\left(\dfrac{b\delta}{b-1}\right)^2\right\}}{\left\{1 + \left(\dfrac{b}{b-1}\delta\right)^2\right\}}$ | $\dfrac{6[\{\beta^2 + (\beta+m-1)^2\}(m-2) + \beta(\beta+m-1)(m-1)]}{(m-4)(m-3)\beta(\beta+m-1)}$ |
| Transformation Formula | $b = \dfrac{9 + 6\times(\text{Skewness})^2 - 5\times\text{Kurtosis}}{6 + 3\times(\text{Skewness})^2 - 2\times\text{Kurtosis}}$ | $r = \dfrac{6(\text{Kurtosis} - (\text{Skewness})^2 - 1)}{6 + 3\times(\text{Skewness})^2 - 2\times\text{Kurtosis}}(<0)$ |
| | $\tau = \dfrac{\sqrt{\text{Var}\times\{4(2b-3) - (\text{Skewness})^2(b-2)^2\}}}{2}$ | $r_1 = \dfrac{1}{2}(r-2) + \dfrac{1}{2}r(r+2)\sqrt{\dfrac{(\text{Skewness})^2}{(\text{Skewness})^2(r+2)^2 + 16(r+1)}}$ |
| | $\delta = \dfrac{\sqrt{\text{Var}}\times\text{Skewness}\times(b-1)(b-2)}{2b\tau}$ | $r_2 = \dfrac{1}{2}(r-2) - \dfrac{1}{2}r(r+2)\sqrt{\dfrac{(\text{Skewness})^2}{(\text{Skewness})^2(r+2)^2 + 16(r+1)}}$ |
| | $\mu = \text{Mean} - \dfrac{b\delta\tau}{b-1}$ | $\beta = \text{Max}[r_1, r_2] + 1$ |
| | | $m = -\text{Min}[r_1, r_2] - \beta$ |
| | | $\alpha = \sqrt{\dfrac{\text{Var}\times(m-1)^2(m-2)}{(m+\beta-1)\beta}}$ |
| | | $a = \text{Mean} - \dfrac{\alpha\beta}{m-1}(\text{Skewness}>0)$ |
| | | $\text{Mean} + \dfrac{\alpha\beta}{m-1}(\text{Skewness}<0)$ |

TABLE 12

THE DISTRIBUTION AND TRANSFORMATION FORMULA

| Type | Pearson I (Beta I) | Pearson II (Beta I) |
|---|---|---|
| Criteria | $\kappa < 0$ | $\kappa = 0, \beta_1 = 0, \beta_2 < 3$ |
| Domain | $a \leq x \leq a + b$ | $a \leq x \leq a + b$ |
| Restriction | $b > 0$ | $b > 0$ |
| Probability Density Function (p.d.f) | $\dfrac{(x-a)^{p-1}}{b^p B(p,q)}\left\{1 - \dfrac{(x-a)}{b}\right\}^{q-1}$ | $\dfrac{(x-a)^{p-1}}{b^p B(p,p)}\left\{1 - \dfrac{(x-a)}{b}\right\}^{p-1}$ |
| Mean | $a + \dfrac{bp}{p+q}$ | $a + \dfrac{b}{2}$ |
| Variance | $\dfrac{b^2 pq}{(p+q+1)(p+q)^2}$ | $\dfrac{b^2}{4(2p+1)}$ |
| Skewness | $\dfrac{2(q-p)\sqrt{(p+q+1)}}{(p+q+2)\sqrt{pq}}$ | 0 |
| Kurtosis | $\dfrac{3(p+q+1)\{2(q^2 - pq + p^2) + pq(p+q)\}}{(p+q+3)(p+q+2)pq}$ | $\dfrac{3(2p+1)}{2p+3}$ |
| Transformation Formula | $r = \dfrac{6(\text{Kurtosis} - (\text{Skewness})^2 - 1)}{6 + 3\times(\text{Skewness})^2 - 2\times\text{Kurtosis}}(<0)$ | $p = \dfrac{3 - 3\times\text{Kurtosis}}{2\times\text{Kurtosis} - 6}$ |

TABLE 12-continued

THE DISTRIBUTION AND TRANSFORMATION FORMULA

| Type | Pearson I (Beta I) | Pearson II (Beta I) |
|---|---|---|
| | $r_3 = \frac{1}{2}r + \frac{1}{2}r(r+2)\sqrt{\frac{(\text{Skewness})^2}{(\text{Skewness})^2(r+2)^2 + 16(r+1)}}$ | $b = \sqrt{4(2p+1)\text{Var}}$ |
| | $r_4 = \frac{1}{2}r - \frac{1}{2}r(r+2)\sqrt{\frac{(\text{Skewness})^2}{(\text{Skewness})^2(r+2)^2 + 16(r+1)}}$ | $a = \text{Mean} - \frac{b}{2}$ |
| | $q = \text{Max}[r_3, r_4]$ (Skewness > 0) $\text{Min}[r_3, r_4]$ (Skewness < 0) | |
| | $p = \text{Max}[r_3, r_4]$ (Skewness > 0) $\text{Min}[r_3, r_4]$ (Skewness < 0) | |
| | $b = (p+q)\sqrt{\frac{\text{Var} \times (p+q+1)}{pq}}$ | |
| | $a = \text{Mean} - \frac{bp}{p+q}$ | |

In Table 12, s the Pearson I, when p, q>1, unimodal type. When 0<q≦1<p, J shape type. When 0<p≦1<q is, J shape type, when 0<p, q≦1, U shape type. Herein, when p=q=1, the uniform distribution. Furthermore, as the Pearson II distribution, when p>1, unimodal, when 0<p<1, U shape type. Herein, when p=1, the uniform distribution.

TABLE 13

THE DISTRIBUTION AND TRANSFORMATION FORMULA

| Type | Normal | Pearson VII |
|---|---|---|
| Criteria | $\kappa = 0, \beta_1 = 0, \beta_2 = 3$ | $\kappa = 0, \beta_1 = 0, \beta_2 > 3$ |
| Domain | $-\infty < x < \infty$ | $-\infty < x < \infty$ |
| Restriction | $\sigma > 0$ | $\tau > 0, b > \frac{1}{2}$ |
| Probability Density Function (p.d.f) | $\frac{1}{\sqrt{2\pi}\,\sigma}\exp\left\{-\frac{(x-\mu)^2}{2\sigma^2}\right\}$ | $\frac{\Gamma(b)}{\Gamma\left(b-\frac{1}{2}\right)\sqrt{\pi}} \frac{1}{\tau\left\{1+\left(\frac{x-\mu}{\tau}\right)^2\right\}^b}$ |
| Mean | $\mu$ | $\mu$ |
| Variance | $\sigma^2$ | $\frac{\tau^2}{2b-3}$ |
| Skewness | 0 | 0 |
| Kurtosis | 3 | $\frac{3(2b-3)}{2b-5}$ |
| Transformation Formula | $\mu = \text{Mean}$ $\sigma = \sqrt{\text{Var}}$ | $b = \frac{5 \times \text{Kurtosis} - 9}{2 \times \text{Kurtosis} - 6}$ $\tau = \sqrt{(2b-3) \times \text{Var}}$ $\mu = \text{Mean}$ |

TABLE 14

THE DISTRIBUTION AND TRANSFORMATION FORMULA

| Type | Pearson III (Gamma) | Pearson V |
|---|---|---|
| Criteria | $\kappa = \pm\infty, 2\beta_2 - 3\beta_1 - 6 = 0$ | $\kappa = 1$ |
| Domain | $x \geq \gamma$ (Skewness > 0) <br> $x \leq \gamma$ (Skewness < 0) | $x \geq a$ (Skewness > 0) <br> $x \leq a$ (Skewness > 0) |
| Restriction | $\alpha > 0, \beta > 0$ | $\lambda > 0, \nu > 0$ |
| Probability Density Function (p.d.f) | $\dfrac{(x-\gamma)^{\alpha-1}}{\beta^\alpha \Gamma(\alpha)} \exp\left\{-\dfrac{(x-\gamma)}{\beta}\right\}$ (Skewness > 0) <br><br> $\dfrac{(\gamma-x)^{\alpha-1}}{\beta^\alpha \Gamma(\alpha)} \exp\left\{-\dfrac{(\gamma-x)}{\beta}\right\}$ (Skewness < 0) | $\dfrac{\lambda^\nu}{\Gamma(\nu)(x-a)^{\nu+1}} \exp\left\{-\left(\dfrac{\lambda}{x-a}\right)\right\}$ (Skewness > 0) <br><br> $\dfrac{\lambda^\nu}{\Gamma(\nu)(a-x)^{\nu+1}} \exp\left\{-\left(\dfrac{\lambda}{a-x}\right)\right\}$ (Skewness < 0) |
| Mean | $\gamma + \alpha\beta$ (Skewness > 0) <br> $\gamma - \alpha\beta$ (Skewness < 0) | $a + \dfrac{\lambda}{\nu-1}$ (Skewness > 0) <br> $a - \dfrac{\lambda}{\nu-1}$ (Skewness < 0) |
| Variance | $\alpha\beta^2$ | $\dfrac{\lambda^2}{(\nu-1)^2(\nu-2)}$ |
| Skewness | $\dfrac{2}{\sqrt{\alpha}}$ (Skewness > 0) <br> $-\dfrac{2}{\sqrt{\alpha}}$ (Skewness < 0) | $\dfrac{4\sqrt{\nu-2}}{\nu-3}$ (Skewness > 0) <br> $-\dfrac{4\sqrt{\nu-2}}{\nu-3}$ (Skewness < 0) |
| Kurtosis | $\dfrac{6}{\alpha} + 3$ | $\dfrac{3(\nu-2)(\nu+5)}{(\nu-4)(\nu-3)}$ |
| Transformation Formula | $\alpha = \dfrac{4}{(\text{Skewness})^2}$ <br> $\beta = \sqrt{\dfrac{\text{Var}}{\alpha}}$ <br> $\gamma = \text{Mean} - \alpha\beta$ (Skewness > 0) <br> $\phantom{\gamma =}\text{Mean} + \alpha\beta$ (Skewness < 0) | $\nu = \dfrac{16 + 6 \times (\text{Skewness})^2 + 8 \times \sqrt{4 + (\text{Skewness})^2}}{2 \times (\text{Skewness})^2}$ <br> $\lambda = (\nu-1)\sqrt{\text{Var} \times (\nu-2)}$ <br> $a = \text{Mean} - \dfrac{\lambda}{\nu-1}$ (Skewness > 0) <br> $\phantom{a =}\text{Mean} + \dfrac{\lambda}{\nu-1}$ (Skewness < 0) |

1.2 Generating Random Numbers from the Pearson Type IV

In this embodiment, the probability density function of Pearson type IV is defined by the following formula (72), $$h(x) = \frac{\Gamma(b+b\delta i)\Gamma(b-b\delta i)\tau^{2b-1}}{\Gamma(b)\Gamma\left(b-\dfrac{1}{2}\right)\pi^{\frac{1}{2}}} \cdot \frac{\exp\left\{2b\delta\arctan\left(\dfrac{x-\mu}{\tau}\right)\right\}}{\{(x-\mu)^2 + \tau^2\}^b} \quad (72)$$

$$= \frac{\Gamma(b+b\delta i)\Gamma(b-b\delta i)}{\{\Gamma(b)\}^2} \times$$

$$\frac{\tau^{2b-1}}{B\left(b-\dfrac{1}{2}, \dfrac{1}{2}\right)} \cdot \frac{\exp\left\{2b\delta\arctan\left(\dfrac{x-\mu}{\tau}\right)\right\}}{\{(x-\mu)^2 + \tau^2\}^b}$$

when $\Gamma(\cdot)$ and $B(\cdot)$ are Gamma function and Beta function, respectively.

According to Devroye (1986), when random variable X is distributed as Pearson type IV and b>1 by the following formula (73), $$f(x) = C\frac{\exp\{2b\delta\arctan(x)\}}{\{x^2+1\}^b} \quad (73)$$

Then arctan(x) has a log-concave density defined by the following formula (74), $$g(x) = C\cos^{2(b-1)}(x)\exp(2b\delta), \left(|x| \leq \frac{\pi}{2}\right) \quad (74)$$

He suggested that the rejection algorithm (exponential version) for log-concave density in Devroye (1984) is applied to generate random numbers from this distribution. But its normalizing constant is open-problem in that book (2.7 exercise in Devroye (1986)). We solved this problem analytically and suggested that its normalizing constant (the formula (75)) can easily be calculated in our paper (Nagahara (1999)). The algorithm of generating random numbers from Pearson type IV is the following. C denotes the normalizing constant of Pearson type IV.

[Algorithm]
(Set up)
Step 0

$$C = \frac{1}{B\left(b-\frac{1}{2},\frac{1}{2}\right)} \times \frac{\Gamma(b+b\delta i)\Gamma(b-b\delta i)}{\{\Gamma(b)\}^2} \quad (75)$$

$$= \frac{1}{B\left(b-\frac{1}{2},\frac{1}{2}\right)} \times \prod_{k=0}^{\infty} \frac{1}{1+\left(\frac{b\delta}{b+k}\right)^2}$$

$$\approx \frac{1}{B\left(b-\frac{1}{2},\frac{1}{2}\right)} \times \prod_{k=0}^{n} \frac{1}{1+\left(\frac{b\delta}{b+k}\right)^2}$$

$M \leftarrow \arctan\left(\frac{b\delta}{b-1}\right)$ $L \leftarrow C \times \cos^{2(b-1)}(M)\exp(2b\delta M)$ $R = \log(L)$ Generator (Routine for Generating Random Numbers)
Repeat
Step 1
    Generate U~Uniform (0, 2)
    Generate E~Exponential Distribution
If U ≦ 1 then (Y, T) ← (U, −E)
else (Y, T) ← (1 + E∗, −E − E∗)  (E∗ ~ New Exponential Distribution)

Step 2
    Generation W~Uniform (0, 1)

If W ≤ 0.5 then Y ← −Y $Y \leftarrow M + \frac{Y}{L}$

If $Y \geq \frac{\pi}{2}$ then go to Step 1

If Y ≦ log g(Y) − R then X = arctan(Y)
    else go to Step 1
(Transformation)
X = τX + μ

This algorithm includes either step of using the analytical solution of the normalizing constant or step of using calculation of its expansion, and also includes step of generating random numbers by using rejection algorithm.

Herein, seeds of generating random numbers will be explained. Generating random numbers from certain probability distributions is based on uniform random numbers.

Basically, if uniform random numbers are given, random numbers from various probability distributions are obtained by using inverse function method. In this invention, random numbers from exponential distribution, Gamma distribution and normal distribution which are used in order to generate random numbers from Pearson distribution system, are generated by using uniform random numbers. The methods of generating uniform random numbers are physical random numbers, pseudo-random numbers, quasi-random numbers and low discrepancy sequences. The characteristics of quasi-random numbers and low discrepancy sequences which are different from pseudo-random numbers, are not having randomness but uniform distribution sequences of points.

Pseudo-random numbers includes, congruential method, additive generator method, M-sequence, Generalized Feedback Shift-register (GFSR) method, and Mersenne Twister. Quasi-random numbers includes, Ritchtmyer sequences, Haselgrove sequences, Hammersley sequences, and as Low Discrepancy sequences, Halton sequences, generalized Halton sequences, Sobol sequences, modified Sobol sequences, Faure sequences, generalized Faure sequences, generalized Niederreiter sequences. In recent years, Low Discrepancy sequences are researched and are used as important definition.

Furthermore, the reference of Mersenne Twister is "Mersenne Twister: A 623-dimensionally equidistributed uniform pseudorandom number generator" by Matsumoto M. and Nishimura, T., 1998, ACM Transaction on Modeling and Computer Simulation, Vol. 8, 3-30 pp.

And the reference of Sobol sequences is "Numerical Recipes in Fortran 77" by Press, W., Teukolsky, S. Vetterling, W., Flannery, B., 1992, Second edition, Cambridge Univ. Press.

In these methods, the most typical method is the congruential method of pseudo-random numbers. Recently, GFSR method and Mersenne Twister which have much longer period than the congruential method are developed. Furthermore, quasi-random numbers and low discrepancy sequences are researched and are used practically.

The usage of pseudo-random numbers (c.f. Mersenne Twister) and quasi-random numbers (c.f. low discrepancy sequences) in this invention improves dramatically the most important characteristics of random numbers for practical embodiment. This embodiment obtains random numbers which represent the average, the variance, the skewness and the kurtosis of target probability distributions in the degree of preciseness which is impossible for typical congruential generators.

The most important point of the embodiment of this invention is to represent the complicated probability distribution which is unable to represent analytically, by using huge number of random numbers. For this objective, random numbers which represent the target probability distributions more precise than by using typical congruential generators, are expected. Especially, in the case that the target probability distributions (c.f. Pearson type IV) have different skewness and kurtosis from the normal distribution, such as the characteristics of the embodiment of this invention, it improves dramatically by either using ones which have longer period than the congruential method (ex. Mersenne Twister) among pseudo-random numbers or using quasi-random numbers, and it completes to obtain more practical preciseness.

Hereafter, one dimension case will be described. Firstly, in the case of Pearson type IV distribution, compared with using typical congruential generators, values of using Mersenne Twister, quasi-random numbers (Sobol sequences is used. Sobol sequences is also low discrepancy sequences) are dramatically closer to target values of the average, the variance, the skewness and the kurtosis (the first row of tables) according to the increase of the number of random numbers.

For examples in Table 23 (congruential method), Table 27 (Mersenne Twister) and Table 31 (Sobol sequences), the average of 1000 cases simulated by 100,000 points are 0.01023, 0.00018 and −0.00001, respectively. The precision of two decimal places in congruential method is dramatically improved to the precision of four decimal places in Mersenne Twister and the precision of five decimal places in quasi-random numbers. Similarly, as for the variance, the average of 1000 cases are 1.03433 in congruential method, 1.00009 in Mersenne Twister and 0.99999 in quasi-random numbers. The precision of two decimal places in congruential method is dramatically improved to the precision of five decimal places in Mersenne Twister and the precision of six decimal places in quasi-random numbers.

Moreover, the skewness and kurtosis which are important for this embodiment of the present invention, are more dramatically improved. In each previous tables, when the target values of the skewness is 0.75, the average of 1000 cases are 0.79651 in congruential method, 0.75041 in Mersenne Twister and 0.75007 in quasi-random numbers. The precision of two decimal places in congruential method is dramatically improved to the precision of four decimal places in Mersenne Twister and the precision of five decimal places in quasi-random numbers. When the target values of the kurtosis is 5.0, the average of 1000 cases are 5.36334 in congruential method, 5.00057 in Mersenne Twister and 5.00257 in quasi-random numbers. The precision of one decimal places in congruential method is dramatically improved to the precision of four decimal places in Mersenne Twister and the precision of three decimal places in quasi-random numbers. Furthermore, the characteristics of Mersenne Twister and quasi-random numbers which is better than congruential method, is that the increase of the number of random numbers converges each value to the target value. This is the most important characteristics of random numbers for this embodiment.

Herein, antithetic variates (negative correlation) method, control variates method, moment-matching method, regression analysis method, non-linear regression analysis method, weighted sampling method stratified sampling method, Latin-hypercube method, martingale variance reduction method, conditional Monte Carlo method and so on, these various variance reduction method will be easily used. These are methods of improving calculation independent on generators.

In Table 21-32, number denotes the number of random numbers and the values are their average of 1000 cases. The values in each parenthesis are the standard deviation of each value. As a result, the adequate random numbers by these algorithm are obtained.

TABLE 21

Random Numbers of Pearson IV (Congruential Method)

| Number | Mean = 0.0 | Variance = 1.0 | Skewness = 0.1 | Kurtosis = 3.5 |
| --- | --- | --- | --- | --- |
| 100 | 0.00447 (0.09891) | 0.98699 (0.14722) | 0.09806 (0.29827) | 3.29029 (0.68626) |
| 500 | 0.00217 (0.04616) | 0.99926 (0.06942) | 0.11460 (0.16846) | 3.51279 (0.52759) |
| 1000 | 0.00462 (0.03383) | 1.00194 (0.05169) | 0.11863 (0.13216) | 3.58080 (0.38730) |
| 5000 | 0.00760 (0.01573) | 1.00044 (0.03359) | 0.12699 (0.06533) | 3.65049 (0.15212) |
| 10000 | 0.01063 (0.01054) | 1.00146 (0.03248) | 0.13117 (0.07302) | 3.61033 (0.12948) |
| 100000 | 0.01548 (0.00807) | 1.00580 (0.01368) | 0.14029 (0.09867) | 3.57286 (0.10688) |

TABLE 22

Random Numbers of Pearson IV (Congruential Method)

| Number | Mean = 0.0 | Variance = 1.0 | Skewness = 0.5 | Kurtosis = 4.0 |
| --- | --- | --- | --- | --- |
| 100 | 0.00663 (0.09965) | 0.99137 (0.16555) | 0.45083 (0.35131) | 3.64524 (1.24502) |
| 500 | 0.00443 (0.04934) | 0.99950 (0.07659) | 0.51265 (0.21807) | 4.02561 (1.28539) |
| 1000 | 0.00570 (0.03605) | 1.00266 (0.05671) | 0.53036 (0.15066) | 4.10128 (0.92307) |
| 5000 | 0.01132 (0.01496) | 1.00855 (0.03807) | 0.53669 (0.05845) | 4.16750 (0.28505) |
| 10000 | 0.01239 (0.01118) | 1.01587 (0.03881) | 0.52695 (0.04615) | 4.09870 (0.17478) |
| 100000 | 0.01758 (0.01286) | 1.03348 (0.02942) | 0.52261 (0.05082) | 4.06428 (0.09143) |

TABLE 23

Random Numbers of Pearson IV (Congruential Method)

| Number | Mean = 0.0 | Variance = 1.0 | Skewness = 0.75 | Kurtosis = 5.0 |
| --- | --- | --- | --- | --- |
| 100 | 0.00506 (0.09874) | 0.98799 (0.18450) | 0.64200 (0.41440) | 4.17985 (1.77286) |
| 500 | 0.00206 (0.04826) | 0.99519 (0.08929) | 0.71253 (0.25379) | 4.68471 (1.52584) |
| 1000 | 0.00328 (0.03540) | 0.99744 (0.06842) | 0.74232 (0.18379) | 4.86990 (1.10814) |
| 5000 | 0.00687 (0.01507) | 1.01106 (0.04064) | 0.77973 (0.05598) | 5.18173 (0.34892) |
| 10000 | 0.00724 (0.01194) | 1.01800 (0.03985) | 0.78576 (0.04429) | 5.25458 (0.24899) |
| 100000 | 0.01023 (0.00662) | 1.03433 (0.01665) | 0.79561 (0.02661) | 5.36334 (0.07054) |

TABLE 24

Random Numbers of Pearson IV (Congruential Method)

| Number | Mean = 0.0 | Variance = 1.0 | Skewness = 1.00 | Kurtosis = 5.5 |
|---|---|---|---|---|
| 100 | 0.00305 (0.10082) | 0.99007 (0.20657) | 0.84825 (0.48811) | 4.48756 (2.62329) |
| 500 | 0.00020 (0.0805) | 0.99526 (0.09386) | 0.97613 (0.28029) | 5.32036 (2.15427) |
| 1000 | 0.00420 (0.03570) | 0.99896 (0.06611) | 0.99749 (0.20157) | 5.45077 (1.66673) |
| 5000 | 0.00731 (0.01879) | 1.00819 (0.04423) | 1.03869 (0.10489) | 5.95229 (1.07085) |
| 10000 | 0.00693 (0.01681) | 0.99788 (0.04081) | 1.02337 (0.08034) | 5.83364 (0.76257) |
| 100000 | 0.01270 (0.01623) | 0.97853 (0.02681) | 0.97976 (0.10058) | 5.49212 (0.89251) |

TABLE 25

Random Numbers of Pearson IV (Mersenne Twister)

| Number | Mean = 0.0 | Variance = 1.0 | Skewness = 0.1 | Kurtosis = 3.5 |
|---|---|---|---|---|
| 100 | 0.00233 (0.10019) | 0.99461 (0.15921) | 0.08793 (0.30055) | 3.32960 (0.75833) |
| 500 | 0.00103 (0.04490) | 1.00097 (0.07110) | 0.09599 (0.15228) | 3.47107 (0.43281) |
| 1000 | −0.00040 (0.03090) | 1.00224 (0.05085) | 0.09980 (0.10931) | 3.48287 (0.31513) |
| 5000 | −0.00032 (0.01410) | 0.99976 (0.02283) | 0.10064 (0.04993) | 3.49983 (0.15514) |
| 10000 | −0.00015 (0.00994) | 0.99959 (0.01592) | 0.09970 (0.03423) | 3.50407 (0.11241) |
| 100000 | 0.00013 (0.00326) | 1.00011 (0.00495) | 0.09980 (0.01134) | 3.50059 (0.03373) |

TABLE 26

Random Numbers of Pearson IV (Mersenne Twister)

| Number | Mean = 0.0 | Variance = 1.0 | Skewness = 0.5 | Kurtosis = 4.0 |
|---|---|---|---|---|
| 100 | 0.00057 (0.09835) | 0.99769 (0.17118) | 0.45751 (0.36195) | 3.69753 (1.43914) |
| 500 | 0.00083 (0.04605) | 1.00222 (0.07905) | 0.49289 (0.20024) | 3.96777 (1.13901) |
| 1000 | −0.00001 (0.03143) | 1.00320 (0.05762) | 0.49842 (0.14436) | 3.98117 (0.79259) |
| 5000 | −0.00048 (0.01377) | 1.00027 (0.02476) | 0.50105 (0.06376) | 3.99698 (0.33253) |
| 10000 | −0.00012 (0.00966) | 0.99984 (0.01722) | 0.50134 (0.04631) | 4.00855 (0.33835) |
| 100000 | 0.00019 (0.00329) | 1.00021 (0.00564) | 0.50088 (0.01480) | 4.00335 (0.08575) |

TABLE 27

Random Numbers of Pearson IV (Mersenne Twister)

| Number | Mean = 0.0 | Variance = 1.0 | Skewness = 0.75 | Kurtosis = 5.0 |
|---|---|---|---|---|
| 100 | −0.00039 (0.09573) | 0.99302 (0.19116) | 0.64920 (0.42641) | 4.20517 (1.79893) |
| 500 | 0.00090 (0.04532) | 1.00309 (0.08979) | 0.73315 (0.28195) | 4.83534 (1.98488) |
| 1000 | −0.00015 (0.03159) | 1.00323 (0.06384) | 0.74090 (0.23644) | 4.91825 (2.66872) |
| 5000 | −0.00067 (0.01387) | 1.00006 (0.02862) | 0.75308 (0.10876) | 5.02739 (1.23673) |
| 10000 | −0.00019 (0.00977) | 0.99949 (0.01975) | 0.75148 (0.07372) | 5.00961 (0.76594) |
| 100000 | 0.00018 (0.00319) | 1.00009 (0.00643) | 0.75041 (0.02437) | 5.00057 (0.26266) |

TABLE 28

Random Numbers of Pearson IV (Mersenne Twister)

| Number | Mean = 0.0 | Variance = 1.0 | Skewness = 1.00 | Kurtosis = 5.5 |
|---|---|---|---|---|
| 100 | 0.00112 (0.10128) | 0.99378 (0.21189) | 0.86661 (0.45746) | 4.52543 (2.29353) |
| 500 | 0.00307 (0.04383) | 1.00159 (0.09618) | 0.97733 (0.30724) | 5.31378 (2.61860) |
| 1000 | 0.00025 (0.03135) | 1.00052 (0.06727) | 0.98887 (0.23153) | 5.42052 (2.18324) |
| 5000 | −0.00016 (0.01370) | 1.00047 (0.03100) | 1.00097 (0.12542) | 5.53558 (1.74722) |
| 10000 | 0.00008 (0.00994) | 1.00069 (0.02178) | 1.00288 (0.08360) | 5.53846 (1.06884) |
| 100000 | 0.00020 (0.00326) | 1.00024 (0.00703) | 1.00082 (0.02590) | 5.51252 (0.28719) |

TABLE 29

Random Numbers of Pearson IV (Sobol Sequences)

| Number | Mean = 0.0 | Variance = 1.0 | Skewness = 0.1 | Kurtosis = 3.5 |
|---|---|---|---|---|
| 100 | 0.00036 (0.06580) | 0.99738 (0.09820) | 0.09223 (0.27859) | 3.37184 (0.79285) |
| 500 | 0.00001 (0.02486) | 0.99925 (0.03312) | 0.09989 (0.12042) | 3.48336 (0.41287) |
| 1000 | 0.00002 (0.01525) | 0.99970 (0.02229) | 0.09955 (0.08547) | 3.49402 (0.27866) |
| 5000 | 0.00000 (0.00388) | 1.00001 (0.00690) | 0.09997 (0.02774) | 3.49884 (0.10251) |
| 10000 | −0.00002 (0.00218) | 0.99998 (0.00442) | 0.10004 (0.02050) | 3.49832 (0.07080) |
| 100000 | −0.00000 (0.00052) | 1.00000 (0.00171) | 0.09996 (0.00646) | 3.49966 (0.02223) |

TABLE 30

Random Numbers of Pearson IV (Sobol sequences)

| Number | Mean = 0.0 | Variance = 1.0 | Skewness = 0.5 | Kurtosis = 4.0 |
|---|---|---|---|---|
| 100 | −0.00008 (0.05708) | 0.99691 (0.10377) | 0.45681 (0.31460) | 3.73242 (1.11785) |
| 500 | −0.00015 (0.01631) | 0.99902 (0.04223) | 0.48988 (0.14059) | 3.91884 (0.68722) |
| 1000 | −0.00011 (0.01038) | 0.99960 (0.02941) | 0.49509 (0.09992) | 3.95825 (0.54347) |
| 5000 | 0.00004 (0.00270) | 1.00012 (0.01149) | 0.50050 (0.03922) | 4.00151 (0.28826) |
| 10000 | 0.00001 (0.00163) | 1.00009 (0.00678) | 0.50011 (0.02655) | 3.99900 (0.20461) |
| 100000 | 0.00000 (0.00036) | 1.00000 (0.00253) | 0.49998 (0.00688) | 3.99929 (0.06312) |

TABLE 31

Random Numbers of Pearson IV (Sobol Sequences)

| Number | Mean = 0.0 | Variance = 1.0 | Skewness = 0.75 | Kurtosis = 5.0 |
|---|---|---|---|---|
| 100 | −0.00000 (0.05757) | 0.99730 (0.13725) | 0.66482 (0.42193) | 4.32472 (1.98319) |
| 500 | −0.00005 (0.01705) | 0.99980 (0.05963) | 0.73482 (0.24817) | 4.86517 (2.20758) |
| 1000 | 0.00000 (0.01016) | 1.00008 (0.04438) | 0.74469 (0.19717) | 4.96121 (2.06326) |
| 5000 | −0.00004 (0.00299) | 0.99994 (0.01592) | 0.74932 (0.07629) | 4.99126 (0.96457) |
| 10000 | −0.00002 (0.00162) | 0.99993 (0.00869) | 0.74912 (0.05118) | 4.99003 (0.65315) |
| 100000 | −0.00001 (0.00030) | 0.99999 (0.00170) | 0.75007 (0.01477) | 5.00257 (0.24489) |

TABLE 32

Table 8. Random Numbers of Pearson IV (Sobol Sequences)

| Number | Mean = 0.0 | Variance = 1.0 | Skewness = 1.00 | Kurtosis = 5.5 |
|---|---|---|---|---|
| 100 | −0.00002 (0.04383) | 0.99915 (0.14947) | 0.90586 (0.40783) | 4.70167 (2.25571) |
| 500 | −0.00018 (0.01528) | 0.99943 (0.059916) | 0.97726 (0.23922) | 5.27112 (1.93671) |
| 1000 | −0.00002 (0.00942) | 1.00010 (0.04320) | 0.99087 (0.17874) | 5.40236 (1.64491) |
| 5000 | 0.00001 (0.00338) | 1.00013 (0.02135) | 0.99863 (0.08354) | 5.48482 (0.89792) |
| 10000 | −0.00002 (0.00177) | 0.99993 (0.00990) | 0.99868 (0.05048) | 5.48025 (0.57218) |
| 100000 | 0.00000 (0.00032) | 1.00001 (0.00200) | 1.00000 (0.01297) | 5.49903 (0.19535) |

1.3 Generating Random Numbers from the Pearson Distribution System

It is known that random numbers from the Pearson distribution system except type IV are easily generated by using random numbers from Normal and Gamma distributions (McGrath and Irving (1973)). In this description, we develop the practical procedure of implementing our definition such as Tables 11-14. These results are shown in Tables 33 and 34. The typical examples are shown in Tables 35-55. Numbers denotes the number of random numbers and the values are their average of 1000 cases. The values in each parenthesis are the standard deviation of each value. As a result, the adequate random numbers by these algorithm are obtained.

In the case of other types than the Pearson type IV, as for the average and the variance almost all values in Mersenne Twister and quasi-random numbers (Sobol sequences are used here. Sobol sequences are also low discrepancy sequences.) are much more improved. As for the skewness and the kurtosis which are important for this embodiment of this invention, the case of Pearson type VI and I which have wide range of their values will be shown as results of 1000 cases of 100,000 points. Firstly, for the Pearson type VI, in Table 35 (Congruential method), Table 42 (Mersenne Twister), and Table 46 (Sobol sequences), the target value of the skewness is 1.0, but its observed value of congruential method is 0.99323, its value of Mersenne Twister is 0.99975, and is value of quasi-random numbers is 0.99968. the precision of three decimal places in the case of the congruential method is improved to the precision of four decimal places in the case of Mersenne Twister and also the precision of four decimal places in the case of quasi-random numbers. In the same table, the target value of the kurtosis is 4.8, but its value of congruential method is 4.73386, its value of Mersenne Twister is 4.79863, and its value of quasi-random numbers is 4.79836. The precision of two decimal places in the case of congruential method is improved to the precision of three decimal places in the case of Mersenne Twister and also the precision of three decimal places in the case of quasi-random numbers.

Next, for the Pearson type I, in Table 36 (Congruential method), Table 43 (Mersenne Twister), and Table 50 (Sobol sequences), the target value of the skewness is 1.0, but is value of congruential method is 1.00610, its value of Mersenne Twister is 0.99945, and its value of quasi-random numbers is 1.00004. The precision of three decimal places in the case of congruential method is improved to the precision of four decimal places in the case of Mersenne Twister and also the precision of five decimal places in the case of quasi-random numbers. In the same table, the target value of the kurtosis is 4.0, buts its value of congruential method is 4.00580, its value of Mersenne Twister is 3.99737, and its value of quasi-random numbers is 4.00037. The precision of three decimal places in the case of congruential method is improved to the precision of three decimal places in the case of Mersenne Twister and also the precise of four decimal places in the case of quasi-random numbers.

For the Pearson type II, in Table 37 (Congruential method), Table 44 (Mersenne Twister), and Table 51 (Sobol sequences), the target value of the skewness is 0.0, but its value of congruential method is 0.00012, its value of Mersenne Twister is −0.00005, and its value of quasi-random numbers is 0.00005. The precision of four decimal places in the case of congruential method is improved to the precision of five decimal places in the case of Mersenne Twister and also the precision of five decimal places in the case of quasi-random numbers. In the same table, the target value of the kurtosis is 2.5, but its value of congruential method is 2.49490, its value of Mersenne Twister is 2.49992, and its value of quasi-random numbers is 2.50014. The precision of three decimal places in the case of congruential method is improved to the precision of five decimal places in the case of Mersenne Twister and also the precision of four decimal places in the case of quasi-random numbers.

For the normal distribution, in Table 38 (Congruential method), Table 45 (Mersenne Twister), and Table 52 (Sobol sequences), the target value of the skewness is 0.0, buts it value of congruential method is 0.00439, its value of Mersenne Twister is 0.00023, and its value of quasi-random numbers is 0.00000. The precision of three decimal places in the case of congruential method is improved to the precision of four decimal places in the case of Mersenne Twister and also the precision of six decimal places in the case of quasi-random numbers. The target values of the kurtosis is 3.0, but its value of congruential method is 2.98130, its value of Mersenne Twister is 3.00018, and its value of quasi-random numbers is 3.00001. The precision of two decimal places in the case of congruential method is improved to the precision of four decimal places in the case of Mersenne Twister and also the precision of five decimal places in the case of quasi-random numbers.

For the Pearson type VII, in Table 39 (Congruential method), Table 46 (Mersenne Twister), and Table 53 (Sobol sequences), the target value of the skewness is 0.0, but its value of congruential method is 0.00282, its value of Mersenne Twister is 0.00062, and its value of quasi-random numbers is −0.0047. The precision of three decimal places in the case of congruential method is improved to the precision of four decimal places in the case of Mersenne Twister and also the precision of four decimal places in the case of quasi-random numbers. The target value of the kurtosis is 4.0, but its value of congruential method is 3.96639, its value of Mersenne Twister is 3.99690, and its value of quasi-random numbers is 3.99894. The precision of two decimal places in the case of congruential method is improved to the precision of three decimal places in the case of Mersenne Twister and also the precision of three decimal places in the case of quasi-random numbers.

For the Pearson type III, in Table 40 (Congruential method), Table 47 (Mersenne Twister), and Table 54 (Sobol sequences), the target value of the skewness is 1.0, but its value of congruential method is 1.00128, its value of Mersenne Twister is 0.99951, and its value of quasi-random numbers is 0.99996. The precision of three decimal places in the case of congruential method is improved to the precision of four decimal places in the case of Mersenne Twister and also the precision of five decimal places in the case of quasi-random numbers. The target value of the kurtosis is 4.5, but its value of congruential method of 4,45711, its value of Mersenne Twister is 4.49864, and its value of quasi-random numbers is 4.49978. The precision of two decimal places in the case of congruential method is improved to the precision of three decimal places in the case of Mersenne Twister and also the precision of four decimal places in the case of quasi-random numbers.

For the Pearson type V, in Table 41 (Congruential method), Table 48 (Mersenne Twister), and Table 55 (Sobol sequences), the target value of the skewness is 1.0, but its value of congruential method is 1.00456, its value of Mersenne Twister is 0.99842, and its value of quasi-random numbers is 0.99992. The precision of three decimal places in the case of congruential method is improved to the precision of three decimal places in the case of Mersenne Twister and also the precision of five decimal places in the case of quasi-random numbers. The target value of the kurtosis is 4.970, buts is value of congruential method is 5.15505, its value of Mersenne Twister is 4.95829, and its value of quasi-random numbers is 4.96925. The precision of one decimal places in the case of congruential method is improved to the precision of two decimal places in the case of Mersenne Twister and also the precision of four decimal places in the case of quasi-random numbers. Moreover, as for the above-distribution, the same as the Pearson type IV, in the case of Mersenne Twister and quasi-random numbers, increasing the number of random numbers makes them closer to their target values. This point is superior to congruential method. And this tendency is the most important characteristics of random numbers used for this invention.

TABLE 33

THE PROCEDURE FOR GENERATING RANDOM NUMBERS

| Type | Pearson IV | Pearson VI | Pearson I | Pearson II |
|---|---|---|---|---|
| Generator | Ref. 1.2 | X~Gamma (m)<br>Y~Gamma (β) | X~Gamma (p)<br>X~Gamma (q) | X~Gamma (p)<br>Y~Gamma (p) |
| Transformation Formula | | (Skewness > 0)<br>$Z = \alpha \frac{(X+Y)}{X} - \alpha + a$<br>(Skewness < 0)<br>$Z = \alpha \frac{(X+Y)}{X} + \alpha + a$ | $Z = b \frac{X}{(X+Y)} + a$ | $Z = b \frac{X}{(X+Y)} + a$ |

TABLE 34

THE PROCEDURE FOR GENERATING RANDOM NUMBERS

| Type | Gaussian | Pearson VII | Pearson III | Pearson V |
|---|---|---|---|---|
| Generator | X~Normal (0, 1) | X~Normal (0, 1)<br>$Y \sim \text{Gamma}\left(b - \frac{1}{2}\right)$ | X~Gamma (α) | X~Gamma (ν) |
| Transformation Formula | $Z = \sigma X + \mu$ | $Z = \tau \frac{X}{\sqrt{2Y}} + \mu$ | (Skewness > 0)<br>$Z = \beta X + \gamma$<br>(Skewness < 0)<br>$Z = -\beta X + \gamma$ | (Skewness > 0)<br>$Z = \frac{\lambda}{X} + a$<br>(Skewness < 0)<br>$Z = -\frac{\lambda}{X} + a$ |

TABLE 35

Random Numbers of Pearson VI (Congruential Method)

| Number | Mean = 0.0 | Variance = 1.0 | Skewness = 1.0 | Kurtosis = 4.8 |
|---|---|---|---|---|
| 100 | 0.00001 (0.10064) | 0.97860 (0.19006) | 0.88847 (0.36794) | 4.2000 (1.68566) |
| 500 | 0.00049 (0.04673) | 0.99590 (0.08564) | 0.97138 (0.20139) | 4.60766 (1.14569) |
| 1000 | −0.00319 (0.03267) | 0.99348 (0.06064) | 0.98421 (0.14944) | 4.68562 (0.87126) |
| 5000 | −0.00075 (0.01285) | 0.99769 (0.02580) | 0.99456 (0.07125) | 4.76267 (0.47022) |
| 10000 | −0.00064 (0.00965) | 0.99855 (0.01967) | 0.99777 (0.04989) | 4.77752 (0.33302) |
| 100000 | 0.00016 (0.00523) | 1.00184 (0.00117) | 0.99323 (0.01599) | 4.73386 (0.11934) |

TABLE 36

Random Numbers of Pearson I (Congruential Method)

| Number | Mean = 0.0 | Variance = 1.0 | Skewness = 1.0 | Kurtosis = 4.0 |
|---|---|---|---|---|
| 100 | 0.00527 (0.10249) | 0.98564 (0.16958) | 0.95205 (0.28134) | 3.82390 (1.11219) |
| 500 | 0.00069 (0.04655) | 0.99528 (0.07682) | 0.99188 (0.13914) | 3.98279 (0.58901) |
| 1000 | 0.00197 (0.03200) | 0.99585 (0.05375) | 1.00026 (0.09566) | 4.00867 (0.41776) |
| 5000 | 0.00275 (0.01312) | 0.99907 (0.02517) | 0.99624 (0.04543) | 3.99378 (0.19849) |
| 10000 | 0.00266 (0.00887) | 0.99992 (0.01786) | 1.00054 (0.02974) | 4.00094 (0.13056) |
| 100000 | −0.00073 (0.00579) | 1.00327 (0.00940) | 1.00610 (0.01573) | 4.00580 (0.04772) |

TABLE 37

Random Numbers of Pearson II (Congruential Method)

| Number | Mean = 0.0 | Variance = 1.0 | Skewness = 0.0 | Kurtosis = 2.5 |
|---|---|---|---|---|
| 100 | 0.00130 (0.10086) | 0.97703 (0.16958) | 0.01687 (0.18328) | 2.50352 (0.23910) |
| 500 | 0.00185 (0.04796) | 0.99614 (0.05331) | 0.00463 (0.07802) | 2.50311 (0.11438) |

TABLE 37-continued

Random Numbers of Pearson II (Congruential Method)

| Number | Mean = 0.0 | Variance = 1.0 | Skewness = 0.0 | Kurtosis = 2.5 |
|---|---|---|---|---|
| 1000 | 0.00522 (0.03158) | 0.99518 (0.03792) | 0.00202 (0.05500) | 2.50267 (0.07781) |
| 5000 | 0.00181 (0.01267) | 0.99828 (0.01777) | −0.00049 (0.02460) | 2.50059 (0.03493) |
| 10000 | 0.00161 (0.00949) | 0.99779 (0.01273) | 0.00028 (0.01753) | 2.50204 (0.02468) |
| 100000 | 0.00007 (0.00743) | 1.00259 (0.00872) | 0.00012 (0.00768) | 2.49490 (0.01367) |

TABLE 38

Random Numbers of Normal Distribution (Congruential Method)

| Number | Mean = 0.0 | Variance = 1.0 | Skewness = 0.0 | Kurtosis = 3.0 |
|---|---|---|---|---|
| 100 | 0.00237 (0.10207) | 0.99673 (0.14507) | 0.00501 (0.23511) | 2.91908 (0.44033) |
| 500 | 0.00131 (0.04475) | 0.99861 (0.10631) | −0.00037 (0.10631) | 2.97836 (0.20658) |
| 1000 | −0.00032 (0.03175) | 0.99811 (0.04372) | −0.00169 (0.07765) | 2.99223 (0.15311) |
| 5000 | −0.00127 (0.01427) | 1.00063 (0.01982) | 0.00042 (0.03462) | 2.99616 (0.06985) |
| 10000 | −0.00163 (0.01045) | 1.00183 (0.01366) | 0.00130 (0.02388) | 2.99833 (0.04810) |
| 100000 | −0.00104 (0.00611) | 0.99514 (0.01093) | 0.00439 (0.01136) | 2.98130 (0.01749) |

TABLE 39

Random Numbers of Pearson VII (Congruential Method)

| Number | Mean = 0.0 | Variance = 1.0 | Skewness = 0.0 | Kurtosis = 4.0 |
|---|---|---|---|---|
| 100 | 0.01694 (0.10496) | 0.98827 (0.15624) | −0.00580 (0.38137) | 3.72501 (1.13213) |
| 500 | 0.00002 (0.04507) | 0.99463 (0.07728) | −0.00567 (0.19799) | 3.89032 (0.73803) |
| 1000 | 0.00227 (0.03147) | 1.00282 (0.05330) | −0.00018 (0.15125) | 3.93028 (0.66168) |
| 5000 | 0.00266 (0.01349) | 0.99903 (0.02577) | 0.00327 (0.06799) | 3.99063 (0.33415) |
| 10000 | 0.00052 (0.00947) | 1.00145 (0.01836) | −0.00033 (0.04888) | 3.98632 (0.23031) |
| 100000 | −0.00085 (0.00217) | 0.99672 (0.01086) | 0.00282 (0.01500) | 3.96639 (0.06847) |

TABLE 40

Random Numbers of Pearson III (Congruential Method)

| Number | Mean = 0.0 | Variance = 1.0 | Skewness = 1.0 | Kurtosis = 4.5 |
|---|---|---|---|---|
| 100 | 0.00414 (0.09798) | 0.98453 (0.17852) | 0.90137 (0.32423) | 3.99997 (1.38370) |
| 500 | 0.00096 (0.04401) | 1.00042 (0.08255) | 0.98295 (0.16972) | 4.38840 (0.90674) |
| 1000 | 0.00009 (0.03150) | 1.00029 (0.05958) | 0.99504 (0.12540) | 4.45682 (0.67549) |
| 5000 | 0.00045 (0.01273) | 1.00138 (0.02705) | 1.00127 (0.05732) | 4.48445 (0.30912) |
| 10000 | 0.00045 (0.00879) | 1.00240 (0.02019) | 1.00503 (0.04356) | 4.50085 (0.24520) |
| 100000 | −0.00050 (0.00497) | 1.00416 (0.01309) | 1.00128 (0.03437) | 4.45711 (0.24604) |

TABLE 41

Random Numbers of Pearson V (Congruential Method)

| Number | Mean = 0.0 | Variance = 1.0 | Skewness = 1.0 | Kurtosis = 4.970 |
|---|---|---|---|---|
| 100 | −0.00219 (0.10042) | 0.99281 (0.20199) | 0.91379 (0.41793) | 4.35991 (2.20613) |
| 500 | 0.00018 (0.04467) | 1.00091 (0.09133) | 0.97969 (0.22306) | 4.80006 (1.32266) |
| 1000 | −0.00002 (0.03226) | 1.00032 (0.06391) | 0.99182 (0.16487) | 4.90793 (1.07744) |
| 5000 | 0.00022 (0.01414) | 1.00164 (0.03005) | 1.01257 (0.08734) | 5.09689 (0.72515) |
| 10000 | 0.00047 (0.01016) | 1.00164 (0.02223) | 1.01788 (0.06578) | 5.17025 (0.58763) |
| 100000 | 0.00017 (0.00663) | 1.00069 (0.01660) | 1.00456 (0.02389) | 5.15505 (0.30203) |

TABLE 42

Random Numbers of Pearson VI (Mersenne Twister)

| Number | Mean = 0.0 | Variance = 1.0 | Skewness = 1.0 | Kurtosis = 4.8 |
|---:|---|---|---|---|
| 100 | −0.00018 (0.09879) | 0.98711 (0.18354) | 0.90233 (0.37527) | 4.27137 (1.81922) |
| 500 | −0.00048 (0.04623) | 0.99992 (0.08475) | 0.96956 (0.21023) | 4.60847 (1.21503) |
| 1000 | −0.00116 (0.03232) | 0.99920 (0.06298) | 0.98784 (0.15464) | 4.72273 (1.01486) |
| 5000 | −0.00085 (0.01406) | 1.00078 (0.02813) | 1.00059 (0.07174) | 4.81162 (0.51455) |
| 10000 | 0.00017 (0.00999) | 0.99856 (0.02006) | 0.99589 (0.05192) | 4.77997 (0.36335) |
| 100000 | 0.00005 (0.00325) | 0.99987 (0.00644) | 0.99975 (0.01621) | 4.79863 (0.11470) |

TABLE 43

Random Numbers of Pearson I (Mersenne Twister)

| Number | Mean = 0.0 | Variance = 1.0 | Skewness = 1.0 | Kurtosis = 4.0 |
|---:|---|---|---|---|
| 100 | 0.00059 (0.09638) | 0.99223 (0.16869) | 0.94059 (0.27837) | 3.76409 (1.17794) |
| 500 | 0.00009 (0.04614) | 1.00090 (0.08024) | 0.99179 (0.12822) | 3.96226 (0.55761) |
| 1000 | 0.00150 (0.03087) | 1.00277 (0.05269) | 0.99914 (0.09175) | 3.99548 (0.40746) |
| 5000 | −0.00017 (0.01405) | 1.00000 (0.02454) | 1.00004 (0.04213) | 3.99918 (0.18879) |
| 10000 | 0.00007 (0.00953) | 0.99905 (0.01664) | 0.99871 (0.02864) | 3.99457 (0.12655) |
| 100000 | −0.00008 (0.00324) | 0.99980 (0.00535) | 0.99945 (0.00946) | 3.99737 (0.04178) |

TABLE 44

Random Numbers of Pearson II (Mersenne Twister)

| Number | Mean = 0.0 | Variance = 1.0 | Skewness = 0.0 | Kurtosis = 2.5 |
|---:|---|---|---|---|
| 100 | 0.00248 (0.09715) | 0.99018 (0.11964) | −0.00489 (0.17066) | 2.48836 (0.24738) |
| 500 | 0.00091 (0.04467) | 0.99815 (0.05485) | 0.00044 (0.07858) | 2.49379 (0.11304) |
| 1000 | −0.00082 (0.03221) | 0.99891 (0.03849) | 0.00332 (0.05400) | 2.50065 (0.07651) |
| 5000 | 0.00003 (0.01384) | 0.99984 (0.01733) | −0.00035 (0.02422) | 2.49887 (0.03386) |
| 10000 | 0.00024 (0.00984) | 0.99950 (0.01220) | 0.00034 (0.01742) | 2.49972 (0.02463) |
| 100000 | −0.00011 (0.00311) | 0.99998 (0.00388) | −0.00005 (0.00532) | 2.49992 (0.00771) |

TABLE 45

Random Numbers of Normal Distribution (Mersenne Twister)

| Number | Mean = 0.0 | Variance = 1.0 | Skewness = 0.0 | Kurtosis = 3.0 |
|---:|---|---|---|---|
| 100 | −0.00050 (0.09845) | 0.98515 (0.13809) | 0.00310 (0.24849) | 2.94875 (0.46343) |
| 500 | 0.00038 (0.04193) | 1.00094 (0.06223) | −0.00228 (0.11372) | 2.99912 (0.21161) |
| 1000 | 0.00183 (0.03138) | 0.99942 (0.04336) | −0.00136 (0.07880) | 2.99502 (0.14869) |
| 5000 | 0.00070 (0.01399) | 0.99880 (0.01991) | 0.00065 (0.03402) | 2.99488 (0.06619) |
| 10000 | −0.00015 (0.00999) | 0.99976 (0.01363) | 0.00101 (0.02456) | 2.99574 (0.04711) |
| 100000 | 0.00011 (0.00305) | 1.00010 (0.00458) | 0.00023 (0.00795) | 3.00018 (0.01560) |

TABLE 46

Random Numbers of Pearson VII (Mersenne Twister)

| Number | Mean = 0.0 | Variance = 1.0 | Skewness = 0.0 | Kurtosis = 4.0 |
|---:|---|---|---|---|
| 100 | 0.00087 (0.09776) | 0.99083 (0.18062) | 0.00081 (0.39434) | 3.67114 (1.13828) |
| 500 | 0.00168 (0.04368) | 0.99880 (0.07723) | 0.00378 (0.20693) | 3.93115 (0.80631) |
| 1000 | 0.00083 (0.03174) | 0.99977 (0.05388) | 0.00280 (0.15248) | 3.96275 (0.60237) |
| 5000 | −0.00007 (0.01357) | 1.00059 (0.02381) | 0.00024 (0.06929) | 3.99793 (0.30864) |
| 10000 | 0.00000 (0.00985) | 1.00049 (0.01655) | 0.00062 (0.04886) | 3.99386 (0.24299) |
| 100000 | 0.00001 (0.00320) | 0.99975 (0.00552) | 0.00062 (0.01556) | 3.99690 (0.07584) |

TABLE 47

Random Numbers of Pearson III (Mersenne Twister)

| Number | Mean = 0.0 | Variance = 1.0 | Skewness = 1.0 | Kurtosis = 4.5 |
|---|---|---|---|---|
| 100 | −0.00033 (0.09994) | 0.99378 (0.18040) | 0.93588 (0.33265) | 4.13383 (1.58727) |
| 500 | 0.00052 (0.04387) | 0.99619 (0.08217) | 0.97329 (0.16915) | 4.36109 (0.90226) |
| 1000 | −0.00147 (0.03129) | 0.99692 (0.05807) | 0.98419 (0.12545) | 4.41215 (0.68884) |
| 5000 | 0.00029 (0.01371) | 0.99992 (0.02616) | 0.99920 (0.05750) | 4.48941 (0.33185) |
| 10000 | 0.00062 (0.00985) | 1.00054 (0.01889) | 0.99904 (0.04122) | 4.49143 (0.24122) |
| 100000 | 0.00008 (0.00309) | 0.99985 (0.00585) | 0.99951 (0.01235) | 4.49864 (0.07321) |

TABLE 48

Random Numbers of Pearson V (Mersenne Twister)

| Number | Mean = 0.0 | Variance = 1.0 | Skewness = 1.0 | Kurtosis = 4.970 |
|---|---|---|---|---|
| 100 | 0.01345 (0.11063) | 1.00242 (0.20530) | 0.84570 (0.33907) | 4.13209 (1.41609) |
| 500 | −0.00132 (0.04389) | 0.99719 (0.08309) | 0.96697 (0.20833) | 4.71211 (1.22180) |
| 1000 | 0.00122 (0.03182) | 1.00493 (0.05774) | 0.98878 (0.16115) | 4.86347 (0.98632) |
| 5000 | −0.00054 (0.01421) | 0.99892 (0.02826) | 0.99460 (0.07871) | 4.94109 (0.55113) |
| 10000 | 0.00076 (0.01014) | 0.99997 (0.01723) | 0.99055 (0.04686) | 4.89021 (0.32060) |
| 100000 | −0.00051 (0.00296) | 1.00002 (0.00651) | 0.99842 (0.01766) | 4.95829 (0.12497) |

TABLE 49

Random Numbers of Pearson VI (Sobol Sequences)

| Number | Mean = 0.0 | Variance = 1.0 | Skewness = 1.0 | Kurtosis = 4.8 |
|---|---|---|---|---|
| 100 | −0.00050 (0.04148) | 0.99604 (0.16175) | 0.92942 (0.41555) | 4.42283 (2.37108) |
| 500 | −0.00034 (0.01480) | 1.00044 (0.06701) | 0.99373 (0.23058) | 4.78908 (1.74302) |
| 1000 | 0.00011 (0.00902) | 1.00282 (0.04942) | 1.00173 (0.15293) | 4.80524 (1.05747) |
| 5000 | −0.00013 (0.00346) | 0.99902 (0.02105) | 0.99788 (0.06486) | 4.78693 (0.46674) |
| 10000 | 0.00004 (0.00230) | 1.00025 (0.01423) | 0.99890 (0.04284) | 4.78511 (0.30285) |
| 100000 | 0.00001 (0.00063) | 1.00003 (0.00444) | 0.99968 (0.01438) | 4.79836 (0.10656) |

TABLE 50

Random Numbers of Pearson I (Sobol Sequences)

| Number | Mean = 0.0 | Variance = 1.0 | Skewness = 1.0 | Kurtosis = 4.0 |
|---|---|---|---|---|
| 100 | −0.00109 (0.03603) | 1.00084 (0.13095) | 0.97169 (0.24395) | 3.88692 (1.07591) |
| 500 | 0.00025 (0.01371) | 1.00263 (0.05368) | 0.99595 (0.10693) | 3.96943 (0.49029) |
| 1000 | 0.00008 (0.00917) | 1.00003 (0.03749) | 0.99626 (0.07501) | 3.98206 (0.35310) |
| 5000 | −0.00005 (0.00374) | 0.99962 (0.01697) | 0.99869 (0.03487) | 3.99234 (0.16667) |
| 10000 | −0.00001 (0.00244) | 1.00007 (0.01131) | 1.00030 (0.02505) | 4.00198 (0.11994) |
| 100000 | 0.00001 (0.00068) | 1.00002 (0.00352) | 1.00004 (0.00777) | 4.00037 (0.03725) |

TABLE 51

Random Numbers of Pearson II (Sobol Sequences)

| Number | Mean = 0.0 | Variance = 1.0 | Skewness = 0.0 | Kurtosis = 2.5 |
|---|---|---|---|---|
| 100 | 0.00201 (0.03507) | 1.00184 (0.09497) | −0.01363 (0.16949) | 2.49106 (0.27291) |
| 500 | −0.00008 (0.01118) | 1.00009 (0.04306) | 0.00129 (0.06666) | 2.49775 (0.12076) |
| 1000 | −0.00012 (0.00655) | 0.99869 (0.03037) | 0.00069 (0.05013) | 2.49765 (0.08596) |
| 5000 | −0.00000 (0.00241) | 0.99993 (0.01383) | −0.00029 (0.02128) | 2.49985 (0.03662) |
| 10000 | 0.00005 (0.00133) | 1.00088 (0.01072) | −0.00047 (0.01537) | 2.49887 (0.02765) |
| 100000 | 0.00001 (0.00033) | 0.99988 (0.00319) | 0.00005 (0.00486) | 2.50014 (0.00875) |

TABLE 52

Random Numbers of Pearson II (Sobol Sequences)

| Number | Mean = 0.0 | Variance = 1.0 | Skewness = 0.0 | Kurtosis = 2.5 |
|---|---|---|---|---|
| 100 | 0.00201 (0.03507) | 1.00184 (0.09497) | −0.01363 (0.16949) | 2.49106 (0.27291) |
| 500 | −0.00008 (0.01118) | 1.00009 (0.04306) | 0.00129 (0.06666) | 2.49775 (0.12076) |
| 1000 | −0.00012 (0.00655) | 0.99869 (0.03037) | 0.00069 (0.05013) | 2.49765 (0.08596) |
| 5000 | −0.00000 (0.00241) | 0.99993 (0.01383) | −0.00029 (0.02128) | 2.49985 (0.03662) |
| 10000 | 0.00005 (0.00133) | 1.00088 (0.01072) | −0.00047 (0.01537) | 2.49887 (0.02765) |
| 100000 | 0.00001 (0.00033) | 0.99988 (0.00319) | 0.00005 (0.00486) | 2.50014 (0.00875) |

TABLE 53

Random Numbers of Pearson VII (Sobol Sequences)

| Number | Mean = 0.0 | Variance = 1.0 | Skewness = 0.0 | Kurtosis = 4.0 |
|---|---|---|---|---|
| 100 | −0.00043 (0.05753) | 0.99473 (0.09621) | 0.00087 (0.40210) | 3.72194 (1.21623) |
| 500 | −0.00052 (0.01575) | 1.00044 (0.03977) | −0.01060 (0.18904) | 3.94529 (0.73305) |
| 1000 | −0.00033 (0.00991) | 1.00060 (0.02876) | −0.00863 (0.13569) | 3.99677 (0.59930) |
| 5000 | 0.00006 (0.00379) | 0.99971 (0.01224) | 0.00017 (0.06304) | 4.00761 (0.38316) |
| 10000 | −0.00016 (0.00263) | 1.00003 (0.00896) | −0.00225 (0.04358) | 4.00167 (0.24450) |
| 100000 | 0.00000 (0.00075) | 0.99997 (0.00256) | −0.00047 (0.01307) | 3.99894 (0.07550) |

TABLE 54

Random Numbers of Pearson III (Sobol sequences)

| Number | Mean = 0.0 | Variance = 1.0 | Skewness = 1.0 | Kurtosis = 4.5 |
|---|---|---|---|---|
| 100 | −0.00001 (0.03691) | 0.99946 (0.12802) | 0.93693 (0.30159) | 4.10909 (1.46006) |
| 500 | 0.00016 (0.01307) | 1.00025 (0.04573) | 0.99102 (0.13106) | 4.43112 (0.81675) |
| 1000 | −0.00002 (0.00821) | 0.99971 (0.03004) | 0.99459 (0.08860) | 4.45755 (0.56803) |
| 5000 | −0.00001 (0.00266) | 0.99993 (0.01015) | 0.99925 (0.03627) | 4.49428 (0.25746) |
| 10000 | 0.00001 (0.00129) | 1.00006 (0.00519) | 1.00013 (0.02089) | 4.50086 (0.15926) |
| 100000 | −0.00000 (0.00023) | 0.99999 (0.00097) | 0.99996 (0.00422) | 4.49978 (0.03473) |

TABLE 55

Random Numbers of Pearson V (Sobol Sequences)

| Number | Mean = 0.0 | Variance = 1.0 | Skewness = 1.0 | Kurtosis = 4.970 |
|---|---|---|---|---|
| 100 | −0.00015 (0.03460) | 0.99776 (0.13730) | 0.92371 (0.30994) | 4.39341 (1.66466) |
| 500 | 0.00001 (0.01078) | 0.99966 (0.04741) | 0.98458 (0.17522) | 4.82337 (1.26881) |
| 1000 | 0.00001 (0.00603) | 1.00006 (0.02812) | 0.99373 (0.11938) | 4.90007 (0.94126) |
| 5000 | −0.00001 (0.00198) | 0.99992 (0.00885) | 0.99895 (0.04632) | 4.95817 (0.44318) |
| 10000 | 0.00000 (0.00119) | 0.99999 (0.00552) | 0.99990 (0.03202) | 4.96957 (0.32868) |
| 100000 | −0.00000 (0.00023) | 0.99999 (0.00110) | 0.99992 (0.00720) | 4.96925 (0.08123) |

2. Generating Multivariate Non-normal Distributions by Using the Pearson Distribution System 2.1 Random Vector of Multivariate Non-normal Distribution According to Yuan and Bentler (1997), the method I that they called is the following. $\xi_1, \ldots, \xi_m$ are independent random variables with $E(\xi_j)=0$, $E(\xi_j^2)=1$, $E(\xi_j^3)=\zeta_j$, $E(\xi_j^4)=\kappa_j$ and $\xi=(\xi_1, \ldots, \xi_m)'$. $\nu$ is a random variable which is independent of $\xi$, $E(\nu)=0$, $E(\nu^2)=1$, $E(\nu^3)=\gamma$, $E(\nu^4)=\beta$. We remark that the distributions are represented by the probability density function of Pearson distribution system when $\nu$ is one. Furthermore, $T=(t_{ij})$ are a non-random p rows m columns matrix of rank p such that $TT'=\Sigma$ and $m \geq p$. Then the random vector given by the following formula (81), $$X = \nu T \xi \quad (81)$$

generally follow a nonelliptical distribution with $Cov(X)=\Sigma$. Herein, $Cov(\bullet)$ is the covariance matrix of vector $X=(x_1, \ldots, x_n)'$.

The marginal skewness and kurtosis of $x_i$ are given respectively by the following formula (82) and (83), $$\text{skew}(x_i) = \gamma \sum_{j=1}^{m} t_{ij}^3 \zeta_j / \sigma_{ii}^{3/2} \quad (82)$$

$$\text{kurt}(x_i) = \beta \left\{ \sum_{j=1}^{m} t_{ij}^4 (\kappa_j - 3) / \sigma_{ii}^2 + 3 \right\} \quad (83)$$

And the forth order moment matrix $\Gamma=\mathrm{var}(\mathrm{vech}(XX'))$ is given by the following formula (84), $$\Gamma = 2\beta D_n^+ (\Sigma \otimes \Sigma) D_n^{+\prime} + (\beta - 1) \mathrm{vech}(\Sigma) \mathrm{vech}'(\Sigma) + \beta \sum_{j=1}^{m} (\kappa_j - 3) \mathrm{vech}(t_j t_j') \mathrm{vech}'(t_j t_j') \quad (84)$$

with $t_j$ being the j column vector of $T=(t_{ij})$ and $\otimes$ is the Kronecker product. $D_p$ is p order Duplication matrix. $D_p^+$ being the Moore-Penrose generalized inverse of $D_p$.

From an aspect of statistical modeling, we need the third order moment matrix. We can obtain the following theorem about the third order moment matrix.

Theorem 3.1 [The Third Order Moment Matrix]

The third order moment matrix $\Lambda$ is given by the following formula (85), $$\Lambda = E(\mathrm{vech}(XX')X') = \gamma D_n^+ (T \otimes T) \left( \sum_{j=1}^{m} \zeta_j E_{ii} \otimes e_i \right) T' \quad (85)$$

with $e_i$ being the ith column unit, and $E_{ii}=e_i e_i'$. Proof.

The third order moment matrix $\Lambda$, where $Y=T\xi$, is the following formula (86), $$\Lambda = E(\mathrm{vech}(XX')X') \quad (86)$$
$$= E(v^3 \mathrm{vech}(YY')Y')$$
$$= E(v^3) E(\mathrm{vech}(YY')Y')$$
$$= \gamma E(\mathrm{vech}(YY')Y')$$

Since $YY'=T\xi\xi'T'$ and $\mathrm{vech}(YY')=D_p^+ \mathrm{vech}(YY')$, we have the following formula (87), $$\mathrm{vech}(YY')=D_p^+(T \otimes T)\mathrm{vec}(\xi\xi') \quad (87)$$

with $\otimes$ being the Kronecker product. The below ones are the same.

Therefore, we obtain the following formula (88), $$E(\mathrm{vech}(YY')Y') = E(D_p^+(T \otimes T)\mathrm{vec}(\xi\xi')(T\xi)') \quad (88)$$
$$= D_p^+(T \otimes T) E(\mathrm{vec}(\xi\xi')\xi') T'$$

And, the following formula (89) is clear.

$$E(\mathrm{vec}(\xi\xi')\xi') = \sum_{j=1}^{m} \zeta_j E_{ii} \otimes e_i \quad (89)$$

The theorem follows from (86), (88) and (89).

Q.E.D.

Yuan and Bentler (1999a, 1999b, 2000) studied the theory of test statistics. They suggested the following (90), $$\sqrt{n}[f\{\mathrm{vech}(S)\}-f\{\mathrm{vech}(\Sigma)\}] \rightarrow_{low} N(0,\Omega) \quad (90)$$

where $\Omega=\Pi\Gamma\Pi'$ and S is the sample covariance matrix with $\Pi=\partial f/\partial \mathrm{vech}'(\Sigma)$ being of rank s.

Furthermore, assumed that $\Pi \mathrm{vech}(t_j t_j')=0, j=1,\ldots,m$ in the previous suggestion, they suggested the following formula (91), $$\sqrt{n}[f\{\mathrm{vech}(S)\}-f\{\mathrm{vech}(\Sigma)\}] \rightarrow_{low} N(0,\Omega_n) \quad (91)$$

where $$\Omega_N 2\Pi D_p^{3 0}(\Sigma \otimes \Sigma) D_p^{+\prime} \Pi'. \quad (92)$$

In this embodiment, our objective is that we obtain random numbers from multivariate non-normal distributions with various third and fourth order moment matrix. By varying T, $\xi$, $v$, we obtain various multivariate non-normal distributions with different third and fourth order moment matrix. Firstly, we simulate the typical case that p=m=2 with $X_1$, $X_2$, $\xi_1$ and $\xi_2$. Next, we propose the procedure of fitting the third and fourth order moments to empirical data.

Herein, we will adopt the Johnson system and Lambda distribution which are represented by the fourth-order moments or less as $v$ and $\xi$, instead of the Pearson system.

2.2 Simulation

In this embodiment, we simulate the cases that p=m=2 with $x_1$, $x_2$, $\xi_1$ and $\xi_2$. In this simulation, the elements of the third order and fourth order moment matrix are the following.

[The Third Order Moments]

$$f_1=\gamma t_{11}^3 \zeta_1 + \gamma t_{12}^3 \zeta_2 \; f_2=\gamma t_{21}^3 \zeta_1 + \gamma t_{22}^3 \zeta_2 \; f_3=\gamma t_{11}^2 t_{21} \zeta_1 + \gamma t_{12}^2 t_{22} \zeta_2 \; f_4=\gamma t_{11} t_{21}^2 \zeta_1 + \gamma t_{21} t_{22}^2 \zeta_2 \quad (93)$$

when $f_1$, $f_2$, $f_3$, $f_4$ are the representation of each third order moments $E(x_1^3)$, $E(x_2^3)$, $E(x_1^2 x_2)$, and $E(x_1 x_2^2)$ of random vector $X=(x_1,x_2)'$ generated from $X=vT\xi$, respectively.

[The Fourth Order Moments]

$$f_5 = \beta[t_{11}^4(\kappa_1 - 3) + t_{21}^4(\kappa_2 - 3) + 3\sigma_{11}^2] \quad (94)$$
$$= \beta t_{11}^4 \kappa_1 + 6\beta t_{11}^2 t_{21}^2 + \beta t_{12}^4 \kappa_2$$
$$f_6 = \beta[t_{12}^4(\kappa_1 - 3) + t_{22}^4(\kappa_2 - 3) + 3\sigma_{22}^2]$$
$$= \beta t_{21}^4 \kappa_1 + 6\beta t_{22}^2 t_{12}^2 + \beta t_{22}^4 \kappa_2$$
$$f_7 = \beta[t_{11}^3 t_{21} \kappa_1 + 3(t_{11} t_{21}^3 + t_{11}^2 t_{22} t_{21}) + t_{21}^3 t_{22} \kappa_2]$$
$$f_8 = \beta[t_{11}^2 t_{21}^2 \kappa_1 + (t_{12}^4 + 4t_{11} t_{21}^2 t_{22} + t_{11}^2 t_{22}^2) + t_{21}^2 t_{22}^2 \kappa_2]$$
$$f_9 = \beta[t_{11} t_{21}^3 \kappa_1 + 3(t_{22} t_{12}^3 + t_{22}^2 t_{11} t_{21}) + t_{21} t_{21}^3 \kappa_2]$$

where $f_5$, $f_6$, $f_7$, $f_8$, $f_9$ are the representation of each fourth order moments $E(x_1^4)$, $E(x_2^4)$, $E(x_1^3 x_2)$, $E(x_1^2 x_2^2)$, and $E(x_1 x_2^3)$ of random vector $X=(x_1,x_2)'$ generated from $X=vT\xi$, respectively. And also $\sigma_{11}=\rho_{22}=1$, $t_{11}^2=t_{22}^2=1-t_{12}^2=1-t_{21}^2$ are given.

We adopt an example in Yuan and Bentler (2000) where $\rho=0.5$, and $t_{11}=t_{22}=0.2588$, $t_{12}=t_{21}=0.9659$. The results are shown in Table 58-82. After we obtain random numbers from each distribution $\xi_1$, $\xi_2$, $v$ with specific skewness and kurtosis, we standardize random numbers to ones of which average and variance equal to zero and one respectively. Next, we obtain random numbers $X_1$, $X_2$ of $x_1$ and $x_2$ by the formula, $X=vT\xi$. In each Table, $E(\bullet)$ are calculated by using these random numbers. The values in the parenthesis are the theoretical values calculated by using the formula of the third and fourth order moments matrix. According to these results, in the case of 10,000,000 and 1,000,000 points, random numbers generated by this method represent precisely the target distributions which have theoretical moments, e.g. variance-covariance matrix and the third and fourth order moments matrix.

We remark that it is easy to adopt the combinations of different types of Pearson system. For examples, financial risk, operational risk, insurance risk, catastrophic risk, and business risk are generally represented by different types of the Pearson system. According to this embodiment, the capability of the combinations of different types of the Pearson system integrates and manages the combinations of different risks. For an example, it makes it possible to calculate expected loss of portfolio which includes different asset classes and integrate them.

Moreover, in the finance area, extreme distribution (c.f. Gumbel distribution, Fresh distribution, Weibull distribution), generalized Pareto distribution, and log-normal distribution are used. These distributions are adopted as the distributions of ν and ξ by using the embodiment of this invention. This realizes to estimate the distribution which are multivariate distributions and the representing the data distributions precisely.

For the Pearson type IV, the examples by using the Pearson type IV for $\xi_1$, $\xi_2$, ν in the case of two dimension will be shown in Table 56 (congruential method), Table 65 (Mersenne Twister) and Table 74 (quasi-random numbers, Sobol sequences). Hereafter, $x_1$, $x_2$ are random variables and $X_1$, $X_2$ are random numbers.

First, our target values are $\xi_1$ (Skewness 0.75, Kurtosis 5.0), $\xi_2$ (Skewness 1.0, Kurtosis 5.5), ν (Skewness 0.50, Kurtosis 4.0). The theoretical target values of moments of generated multivariate non-normal distributions are the followings: $E(x_1^3)=0.45708$, $E(x_2^3)=0.34660$, $E(x_1^2x_2)=0.14499$, $E(x_1x_2^2)=0.12289$, $E(x_1^4)=20.73865$, $E(x_2^4)=19.00678$, $E(x_1^3x_2)=8.46515$, $E(x_1^2x_2^2)=7.12390$, $E(x_1x_2^3)=8.03221$.

For examples, in the case of 10,000,000 points, $\xi_1$ (Skewness 0.83082, Kurtosis 5.28928), $\xi_2$ (Skewness 1.05906, Kurtosis 6.19495), ν (Skewness 0.58807, Kurtosis 4.17774) are shown in Table 56 (congruential method). The calculated values of multivariate non-normal distributions by using this random numbers are the followings: $E(X_1^3)=0.57507$ (0.45708), $E(X_2^3)=0.45499$ (0.34660), $E(X_1^2X_2)=0.18715$ (0.14499), $E(X_1X_2^2)=0.16383$ (0.12289), $E(X_1^4)=24.14493$ (20.73865), $E(X_2^4)=20.94897$ (19.00678), $E(X_1^3X_2)=9.53054$ (8.46515), $E(X_1^2X_x^2)=7.71168$ (7.12390), $E(X_1X_2^3)=8.75500$ (8.03221).

The theorem values are shown in the parenthesis. Their parenthesis in tables are theoretical values calculated by using simulated skewness and kurtosis (for an above example, $\xi_1$ (Skewness 0.83082, Kurtosis 5.28928), $\xi_2$ (Skewness 1.05906, Kurtosis 6.19495), ν (Skewness 0.58807, Kurtosis 4.17774). Increasing the number of random numbers, the observed values are very closer to the values of the parenthesis in tables. But our practical target values are the above-calculated theoretical target values. In the case of congruential method, the difference between the theoretical target values and simulated values are large.

However, the case of simulating by Mersenne Twister, shown in Table 65, are $\xi_1$ (Skewness 0.75279, Kurtosis 5.02123), $\xi_2$ (Skewness 1.00004, Kurtosis 5.50831), ν (Skewness 0.50414, Kurtosis 4.00780). The calculated values of multivariate non-normal distributions by using this random numbers are the followings: $E(X_1^3)=0.45185$ (0.45708), $E(X_2^3)=0.35019$ (0.34660), $E(X_1^2X_2)=0.14202$ (0.14499), $E(X_1X_2^2)=0.12404$ (0.12289), $E(X_1^4)=20.03210$ (20.73865), $E(X_2^4)=19.16341$ (19.00678), $E(X_1^3X_2)=8.16249$ (8.46515), $E(X_1^2X_2^2)=7.02127$ (7.12390), $E(X_1X_2^3)=8.05117$ (8.03221). As this result, these values are very closer to our theoretical target values.

And, quasi-random numbers (Sobol sequences), shown in Table 74 (Sobol sequences), are $\xi_1$ (Skewness 0.74961, Kurtosis 4.99697), $\xi_2$ (Skewness 0.99989, Kurtosis 5.49716), ν (Skewness 0.49984, Kurstosis 3.99661). The calculated values of multivariate non-normal distributions by using this random numbers are the followings: $E(X_1^3)=0.46513$ (0.45708), $E(X_2^3)=0.34724$ (0.34660), $E(X_1^2X_2)=0.15195$ (0.14499), $E(X_1X_2^2)=0.13147$ (0.12289), $E(X_1^4)=20.96140$ (20.73865), $E(X_2^4)=18.96493$ (19.000678), $E(X_1^3X_2)=8.62444$ (8.46515), $E(X_1^2X_2^2)=7.23799$ (7.12390), $E(X_1X_2^3)=8.15866$ (8.03221). As this result, these values are very closer to our theoretical target values.

For the Pearson type VI, the examples by using the Pearson type VI for $\xi_1$, $\xi_2$, ν in the case of two dimension will be shown in Table 59 (congruential method), Table 68 (Mersenne Twister) and Table 77 (quasi-random numbers, Sobol sequences). First, our target values are $\xi_1$ (Skewness 1.0, Kurtosis 4.8), $\xi_2$ (Skewness 1.25, Kurtosis 5.5), ν (Skewness 0.75, Kursosis 4.0). The theoretical target values of moments of generated multivariate non-normal distributions are the followings: $E(x_1^3)=0.85783$, $E(x_2^3)=0.69211$, $E(x_1^2x_2)=0.27488$, $E(x_1x_2^2)=0.24174$, $E(x_1^4)=20.73506$, $E(x_2^4)=18.31045$, $E(x_1^3x_2)=8.45176$, $E(x_1^2x_2^2)=7.07391$, $E(x_1x_2^3)=7.84563$.

For examples, in the case of 10,000,000 points, $\xi_1$ (Skewness 0.99126, Kurtosis 4.64495), $\xi_2$ (Skewness 1.22615, Kurtosis 5.22386), ν (Skewness 0.75304, Kurtosis 3.92123) are shown in Table 59 (congruential method). The theoretical target values of moments of generated multivariate non-normal distributions are the followings: $E(X_1^3)=0.84302$ (0.85783), $E(X_2^3)=0.67342$ (0.69211), $E(X_1^2X_2)=0.26865$ (0.27488), $E(X_1X_2^2)=0.24025$ (0.24174), $E(X_1^4)=19.20021$ (20.73506), $E(X_2^4)=17.14705$ (18.31045), $E(X_1^3X_2)=7.96794$ (8.45176), $E(X_1^2X_2^2)=6.76215$ (7.07391), $E(X_1X_2^3)=7.41679$ (7.84563).

The theorem values are shown in the parenthesis. Their parenthesis in tables are theoretical values calculated by using simulated skewness and kurtosis (for an above example, $\xi_1$ (Skewness 0.99126, Kurtosis 4.64495), $\mu_2$ (Skewness 1.22615, Kurtosis 5.22386), ν (Skewness 0.75304, Kurtosis 3.92123)). Increasing the number of random numbers, the observed values are very closer to the values of the parenthesis in tables. But our practical target values are the above-calculated theoretical target values. In the case of congruential method, the difference between the theoretical target values and simulated values are existing.

However, the case of simulating by Mersenne Twister, shown in Table 68, are $\epsilon_1$ (Skewness 0.99968, Kurtosis 4.80062), $\xi_2$ (Skewness 1.25042, Kurtosis 5.49703), ν (Skewness 0.75022, Kurtosis 3.99877). The calculated values of multivariate non-normal distributions by using this random numbers are the followings: $E(X_1^3)=0.86185$ (0.85783), $E(X_2^3)=0.67746$ (0.69211), $E(X_1^2X_2)=0.27713$ (0.27488), $E(X_1X_2^2)=0.23868$ (0.24174), $E(X_1^4)=20.87668$ (20.73506), $E(X_2^4)=18.01464$ (18.31045), $E(X_1^3X_2)=8.59760$ (8.45176), $E(X_1^2X_2^2)=7.10837$ (7.07391), $E(X_1X_2^3)=7.75298$ (7.84563). As this result, these values are very closer to our theoretical target values. Especially, the fourth order moment is very closer.

And, quasi-random numbers (Sobol sequences), shown in Table 77 (Sobol sequences), are $\xi_1$ (Skewness 1.00025, Kurtosis 4.808032), $\xi_2$ (Skewness 1.24990, Kurtosis 5.49862), ν (Skewness 0.75052, Kurtosis 4.00533). The calculated values of multivariate non-normal distributions by using this random numbers are the followings: $E(X_1^3)=0.85834$ (0.85783), $E(X_2^3)=0.67586$ (0.69211), $E(X_1^2X_2)=0.26486$ (0.27488), $E(X_1X_2^2)=0.22957$ (0.24174), $E(X_1^4)=20.75111$ (20.73506), $E(X_2^4)$=18.35898 (18.31045), $E(X_1^3X_2)$= 8.34400 (8.45176), $E(X_1^2X_2^2)$=6.94143 (7.07391), $E(X_1X_2^3)$=7.70291 (7.84563). As this result, these values are very closer to our theoretical target values. Especially, the fourth order moment is very closer.

For the Pearson type I, the examples, by using the Pearson type I for $\xi_1$, $\xi_2$, $\nu$ in the case of two dimension will be shown in Table 62 (congruential method), Table 71 (Mersenne Twister) and Table 80 (quasi-random numbers, Sobol sequences). first, our target values are $\xi_1$ (Skewness 1.0, Kurtosis 4.0), $\xi_2$ (Skewness 1.25, Kurtosis 5.0), $\nu$ (Skewness 0.75, Kurtosis 3.0). The theoretical target values of moments of generated multivariate non-normal distributions are the followings: $E(x_1^3)$=0.85783, $E(x_2^3)$=0.69211, $E(x_1^2x_2)$= 0.27488, $E(x_1x_2^2)$=0.24174, $E(x_1^4)$=14.23490, $E(x_2^4)$= 11.63710, $E(x_1^3x_2)$=5.94881, $E(x_1^2x_2^2)$=5.06173, $E(x_1X_2^3)$= 5.29939.

For examples, in the case of 10,000,000 points, $\xi_1$ (Skewness 1.02802, Kurtosis 4.04760), $\xi_2$ (Skewness 1.29323, Kurtosis 5.15264), $\nu$ (Skewness 0.76208, Kurtosis 2.99871) are shown in Table 62 (congruential method). The calculated values of multivariate non-normal distributions by using this random numbers are the followings: $E(X_1^3)$=0.90491 (0.85783), $E(X_2^3)$=0.72634 (0.69211), $E(X_1^2X_2)$=0.29244 (0.27488), $E(X_1X_2^2)$=0.25642 (0.24174), $E(X_1^4)$=14.57587 (14.23490), $E(X_2^4)$=11.83105 (11.63710), $E(X_1^3X_2)$= 6.07564 (5.94881), $E(X_1^2X_2^2)$=5.12728 (5.06173), $E(X_1X_2^3)$=5.37784 (5.29939).

The theorem values are shown in the parenthesis. Their parenthesis in tables are theoretical values calculated by using simulated skewness and kurtosis (for an above example $\xi_1$ (Skewness 1.02802, Kurtosis 4.04760), $\xi_2$ (Skewness 1.29323, Kurtosis 5.15264), $\nu$ (Skewness 0.76208, Kurtosis 2.99871)). Increasing the number of random numbers, the observed values are very closer to the values of the parenthesis in tables. But our practical target values are the above-calculated theoretical target values. In the case of congruential method, the difference between the theoretical target values and simulated values are existing.

However, the case of simulating by Mersenne Twister, shown in Table 71, are $\xi_1$ (Skewness 1.00039, Kurtosis 4.00402), $\xi_2$ (Skewness 1.24914, Kurtosis 4.99567), $\nu$ (Skewness 0.75009, Kurtosis 3.00061). The calculated values of multivariate non-normal distributions by using this random numbers are the followings: $E(X_1^3)$=0.86215 (0.85783), $E(X_2^3)$=0.69791 (0.69211), $E(X_1^2X_2)$=0.27696 (0.27488), $E(X_1X_2^2)$=0.24381 (0.24174), $E(X_1^4)$=14.28128 (14.23490), $E(X_2^4)$=11.66910 (11.63710), $E(X_1^3X_2)$= 5.93199 (5.94881), $E(X_1^2X_2^2)$=5.05602 (5.06173), $E(X_1X_2^3)$=5.29916 (5.29939). As this result, these values are very closer to our theoretical target values.

And, quasi-random numbers (Sobol sequences), shown in Table 80 (Sobol sequences), and $\xi_1$ (Skewness 0.99973, Kurtosis 3.99878), $\xi_2$ (Skewness 1.25082, Kurtosis 5.00640), $\nu$ (Skewness 0.74954, Kurtosis 2.99766). The calculated values of multivariate non-normal distributions by using this random numbers are the followings: $E(X_1^3)$=0.85151 (0.85783), $E(X_2^3)$=0.69425 (0.69211), $E(X_1^2X_2)$=0.27271 (0.27488), $E(X_1X_2^2)$=0.24358 (0.24174), $E(X_1^4)$=14.12454 (14.23490), $E(X_2^4)$=11.63940 (11.63710), $E(X_1^3X_2)$= 5.87281 (5.94881), $E(X_1^2X_2^2)$=5.02381 (5.06173), $E(X_1X_2^3)$=5.28335 (5.29939). As this result, these values are very closer to our theoretical target values.

TABLE 56

Simulation of $\nu$~Pearson IV (Congruential Method)
(10,000,000 points: Skewness = 0.58807, Kurtosis = 4.17774)

| | $\xi_2$~Pearson IV (Skewness = 1.05906, Kurtosis = 6.19495) |
|---|---|
| $\xi_1$~Pearson IV (Skewness = 0.83082, Kurtosis = 5.28928) | $E(X_1X_2)$ = 0.50013 (0.50000)<br>$E(X_1^3)$ = 0.57507 (0.56971)<br>$E(X_2^3)$ = 0.45499 (0.45108)<br>$E(X_1^2X_2)$ = 0.18715 (0.18198)<br>$E(X_1X_2^2)$ = 0.16383 (0.15826)<br>$E(X_1^4)$ = 24.14493 (24.19270)<br>$E(X_2^4)$ = 20.94897 (20.91631)<br>$E(X_1^3X_2)$ = 9.53054 (9.53864)<br>$E(X_1^2X_2^2)$ = 7.71168 (7.69739)<br>$E(X_1X_2^3)$ = 8.75500 (8.71958) |

TABLE 57

Simulation of $\nu$~Pearson IV (Congruential Method)
(1,000,000 points: Skewness = 0.58805, Kurtosis = 4.17817)

| | $\xi_2$~Pearson IV (Skewness = 1.05882, Kurtosis = 6.19293) |
|---|---|
| $\xi_1$~Pearson IV (Skewness = 0.83048, Kurtosis = 5.28763) | $E(X_1X_2)$ = 0.50113 (0.50000)<br>$E(X_1^3)$ = 0.58996 (0.56955)<br>$E(X_2^3)$ = 0.46270 (0.45088)<br>$E(X_1^2X_2)$ = 0.19210 (0.18193)<br>$E(X_1X_2^2)$ = 0.17770 (0.15820)<br>$E(X_1^4)$ = 23.28743 (24.18781)<br>$E(X_2^4)$ = 21.16021 (20.91242)<br>$E(X_1^3X_2)$ = 9.43782 (9.53754)<br>$E(X_1^2X_2^2)$ = 7.80172 (7.69722)<br>$E(X_1X_2^3)$ = 8.96739 (8.71873) |

TABLE 58

Simulation of $\nu$~Pearson IV (Congruential Method)
(100,000 points: Skewness = 0.58787, Kurtosis = 4.18205)

| | $\xi_2$~Pearson IV (Skewness = 1.05679, Kurtosis = 6.17580) |
|---|---|
| $\xi_1$~Pearson IV (Skewness = 0.82665, Kurtosis = 5.26917) | $E(X_1X_2)$ = 0.50595 (0.50000)<br>$E(X_1^3)$ = 0.76241 (0.56827)<br>$E(X_2^3)$ = 0.48858 (0.44869)<br>$E(X_1^2X_2)$ = 0.20014 (0.18144)<br>$E(X_1X_2^2)$ = 0.17641 (0.15753)<br>$E(X_1^4)$ = 26.23377 (24.14757)<br>$E(X_2^4)$ = 21.08723 (20.86432)<br>$E(X_1^3X_2)$ = 10.54425 (9.52840)<br>$E(X_1^2X_2^2)$ = 7.89547 (7.69507)<br>$E(X_1X_2^3)$ = 8.59780 (8.70762) |

TABLE 59

Simulation of $\nu$~Pearson VI (Congruential Method)
(10,000,000 points: Skewness = 0.75304, Kurtosis = 3.92123)

| | $\xi_2$~Pearson VI (Skewness = 1.22615, Kurtosis = 5.22386) |
|---|---|
| $\xi_1$~Pearson VI (Skewness = 0.99126, Kurtosis = 4.64495) | $E(X_1X_2)$ = 0.49946 (0.50000)<br>$E(X_1^3)$ = 0.84302 (0.84602)<br>$E(X_2^3)$ = 0.67342 (0.68950)<br>$E(X_1^2X_2)$ = 0.26865 (0.27156)<br>$E(X_1X_2^2)$ = 0.24025 (0.23483)<br>$E(X_1^4)$ = 19.20021 (19.38151)<br>$E(X_2^4)$ = 17.14705 (17.41581)<br>$E(X_1^3X_2)$ = 7.96794 (8.02262)<br>$E(X_1^2X_2^2)$ = 6.76215 (6.82895)<br>$E(X_1X_2^3)$ = 7.41679 (7.53121) |

TABLE 60

Simulation of ν~Pearson VI (Congruential Method)
(1,000,000 points: Skewness = 0.75615, Kurtosis = 3.93762)

$\xi_2$~Pearson VI
(Skewness = 1.22651, Kurtosis = 5.23475)

| $\xi_1$~Pearson VI (Skewness = 0.99152, Kurtosis = 4.63712) | $E(X_1 X_2) = 0.49991\ (0.50000)$<br>$E(X_1^3) = 0.88164\ (0.84874)$<br>$E(X_2^3) = 0.73694\ (0.69170)$<br>$E(X_1^2 X_2) = 0.29265\ (0.27243)$<br>$E(X_1 X_2^2) = 0.26580\ (0.24102)$<br>$E(X_1^4) = 19.61316\ (19.49971)$<br>$E(X_2^4) = 17.89280\ (17.46196)$<br>$E(X_1^3 X_2) = 8.04223\ (8.06563)$<br>$E(X_1^2 X_2^2) = 6.80446\ (6.85825)$<br>$E(X_1 X_2^3) = 7.55531\ (7.55622)$ |
|---|---|

TABLE 61

Simulation of ν~Pearson VI (Congruential Method)
(100,000 points: Skewness = 0.75007, Kurtosis = 3.92867)

$\xi_2$~Pearson VI
(Skewness = 1.24045, Kurtosis = 5.37122)

| $\xi_1$~Pearson VI (Skewness = 1.00191, Kurtosis = 4.68426) | $E(X_1 X_2) = 0.50186\ (0.50000)$<br>$E(X_1^3) = 0.87093\ (0.85148)$<br>$E(X_2^3) = 0.78668\ (0.69334)$<br>$E(X_1^2 X_2) = 0.39193\ (0.27327)$<br>$E(X_1 X_2^2) = 0.37933\ (0.24164)$<br>$E(X_1^4) = 20.08018\ (19.92289)$<br>$E(X_2^4) = 18.46001\ (17.58587)$<br>$E(X_1^3 X_2) = 9.38301\ (8.17544)$<br>$E(X_1^2 X_2^2) = 8.14834\ (6.88773)$<br>$E(X_1 X_2^3) = 8.73370\ (7.59121)$ |
|---|---|

TABLE 62

Simulation of ν~Pearson I (Congruential Method)
(10,000,000 points: Skewness = 0.76208, Kurtosis = 2.99871)

$\xi_2$~Pearson I
(Skewness = 1.29323, Kurtosis = 5.15264)

| $\xi_1$~Pearson I (Skewness = 1.02802, Kurtosis = 4.04760) | $E(X_1 X_2) = 0.50041\ (0.50000)$<br>$E(X_1^3) = 0.90491\ (0.90170)$<br>$E(X_2^3) = 0.72634\ (0.72307)$<br>$E(X_1^2 X_2) = 0.29244\ (0.28864)$<br>$E(X_1 X_2^2) = 0.25642\ (0.25292)$<br>$E(X_1^4) = 14.57587\ (14.62783)$<br>$E(X_2^4) = 11.83105\ (11.75839)$<br>$E(X_1^3 X_2) = 6.07564\ (6.05539)$<br>$E(X_1^2 X_2^2) = 5.12728\ (5.09707)$<br>$E(X_1 X_2^3) = 5.37784\ (5.33806)$ |
|---|---|

TABLE 63

Simulation of ν~Pearson I (Congruential Method)
(1,000,000 points: Skewness = 0.76061, Kurtosis = 2.99158)

$\xi_2$~Pearson I
(Skewness = 1.29232, Kurtosis = 5.14806)

| $\xi_1$~Pearson I (Skewness = 1.02671, Kurtosis = 4.04069) | $E(X_1 X_2) = 0.50078\ (0.50000)$<br>$E(X_1^3) = 0.88730\ (0.89932)$<br>$E(X_2^3) = 0.75151\ (0.72077)$<br>$E(X_1^2 X_2) = 0.29341\ (0.28786)$<br>$E(X_1 X_2^2) = 0.26769\ (0.25215)$<br>$E(X_1^4) = 14.32061\ (14.58103)$<br>$E(X_2^4) = 11.85419\ (11.71238)$<br>$E(X_1^3 X_2) = 5.98814\ (6.03745)$ |
|---|---|

TABLE 63-continued

Simulation of ν~Pearson I (Congruential Method)
(1,000,000 points: Skewness = 0.76061, Kurtosis = 2.99158)

$\xi_2$~Pearson I
(Skewness = 1.29232, Kurtosis = 5.14806)

$E(X_1^2 X_2^2) = 5.10259\ (5.08281)$
$E(X_1 X_2^3) = 5.40339\ (5.32032)$

TABLE 64

Simulation of ν~Pearson I (Congruential Method)
(100,000 points: Skewness = 0.75113, Kurtosis = 2.97538)

$\xi_2$~Pearson I
(Skewness = 1.28287, Kurtosis = 5.09796)

| $\xi_1$~Pearson I (Skewness = 1.01219, Kurtosis = 3.99244) | $E(X_1 X_2) = 0.49711\ (0.50000)$<br>$E(X_1^3) = 0.75679\ (0.88153)$<br>$E(X_2^3) = 0.78461\ (0.70183)$<br>$E(X_1^2 X_2) = 0.25269\ (0.28185)$<br>$E(X_1 X_2^2) = 0.25125\ (0.24591)$<br>$E(X_1^4) = 13.28027\ (14.37168)$<br>$E(X_2^4) = 12.24368\ (11.52333)$<br>$E(X_1^3 X_2) = 5.81276\ (5.96759)$<br>$E(X_1^2 X_2^2) = 5.14623\ (5.03700)$<br>$E(X_1 X_2^3) = 5.48837\ (5.25553)$ |
|---|---|

TABLE 65

Simulation of ν~Pearson IV (Mersenne Twister)
(10,000,000 points: Skewness = 0.50414, Kurtosis = 4.00780)

$\xi_2$~Pearson IV
(Skewness = 1.00004, Kurtosis = 5.50831)

| $\xi_1$~Pearson IV (Skewness = 0.75279, Kurtosis = 5.02123) | $E(X_1 X_2) = 0.49897\ (0.50000)$<br>$E(X_1^3) = 0.45185\ (0.46090)$<br>$E(X_2^3) = 0.35019\ (0.35074)$<br>$E(X_1^2 X_2) = 0.14202\ (0.14628)$<br>$E(X_1 X_2^2) = 0.12404\ (0.12425)$<br>$E(X_1^4) = 20.03210\ (20.80846)$<br>$E(X_2^4) = 19.16341\ (19.11806)$<br>$E(X_1^3 X_2) = 8.16249\ (8.49085)$<br>$E(X_1^2 X_2^2) = 7.02127\ (7.14519)$<br>$E(X_1 X_2^3) = 8.05117\ (8.06827)$ |
|---|---|

TABLE 66

Simulation of ν~Pearson IV (Mersenne Twister)
(1,000,000 points: Skewness = 0.50711, Kurtosis = 4.01915)

$\xi_2$~Pearson IV
(Skewness = 1.01733, Kurtosis = 5.74753)

| $\xi_1$~Pearson IV (Skewness = 0.75611, Kurtosis = 5.06837) | $E(X_1 X_2) = 0.50126\ (0.50000)$<br>$E(X_1^3) = 0.47691\ (0.47155)$<br>$E(X_2^3) = 0.31734\ (0.35447)$<br>$E(X_1^2 X_2) = 0.13268\ (0.14937)$<br>$E(X_1 X_2^2) = 0.10990\ (0.12596)$<br>$E(X_1^4) = 23.01456\ (21.70511)$<br>$E(X_2^4) = 18.62912\ (19.34142)$<br>$E(X_1^3 X_2) = 8.48422\ (8.74230)$<br>$E(X_1^2 X_2^2) = 7.05754\ (7.23734)$<br>$E(X_1 X_2^3) = 8.04637\ (8.15140)$ |
|---|---|

TABLE 67

Simulation of v~Pearson IV (Mersenne Twister)
(100,000 points: Skewness = 0.50092, Kurtosis = 4.06969)

$\xi_2$~Pearson IV
(Skewness = 1.02257, Kurtosis = 5.63434)

| $\xi_1$~Pearson IV (Skewness = 0.73538, Kurtosis = 4.74148) | $E(X_1 X_2) = 0.49612\ (0.50000)$<br>$E(X_1^3) = 0.46974\ (0.46798)$<br>$E(X_2^3) = 0.43109\ (0.34083)$<br>$E(X_1^2 X_2) = 0.15959\ (0.14751)$<br>$E(X_1 X_2^2) = 0.14756\ (0.12208)$<br>$E(X_1^4) = 17.96903\ (21.57113)$<br>$E(X_2^4) = 19.83827\ (18.42462)$<br>$E(X_1^3 X_2) = 7.17791\ (8.72253)$<br>$E(X_1^2 X_2^2) = 6.58308\ (7.21643)$<br>$E(X_1 X_2^3) = 7.48003\ (7.93593)$ |
|---|---|

TABLE 68

Simulation of v~Pearson VI (Mersenne Twister)
(10,000,000 points: Skewness = 0.75022, Kurtosis = 3.99877)

$\xi_2$~Pearson VI
(Skewness = 1.25042, Kurtosis = 5.49703)

| $\xi_1$~Pearson VI (Skewness = 0.99968, Kurtosis = 4.80062) | $E(X_1 X_2) = 0.50011\ (0.50000)$<br>$E(X_1^3) = 0.86185\ (0.85836)$<br>$E(X_2^3) = 0.67746\ (0.69210)$<br>$E(X_1^2 X_2) = 0.27713\ (0.27502)$<br>$E(X_1 X_2^2) = 0.23868\ (0.24177)$<br>$E(X_1^4) = 20.87668\ (20.71836)$<br>$E(X_2^4) = 18.01464\ (18.30692)$<br>$E(X_1^3 X_2) = 8.59760\ (8.44643)$<br>$E(X_1^2 X_2^2) = 7.10837\ (7.07114)$<br>$E(X_1 X_2^3) = 7.75298\ (7.84360)$ |
|---|---|

TABLE 69

Simulation of v~Pearson VI (Mersenne Twister)
(1,000,000 points: Skewness = 0.75144, Kurtosis = 4.00265)

$\xi_2$~Pearson VI
(Skewness = 1.25784, Kurtosis = 5.57203)

| $\xi_1$~Pearson VI (Skewness = 0.99789, Kurtosis = 4.79423) | $E(X_1 X_2) = 0.50380\ (0.50000)$<br>$E(X_1^3) = 0.89911\ (0.86476)$<br>$E(X_2^3) = 0.74043\ (0.69211)$<br>$E(X_1^2 X_2) = 0.31646\ (0.27673)$<br>$E(X_1 X_2^2) = 0.29097\ (0.24220)$<br>$E(X_1^4) = 22.89599\ (20.99965)$<br>$E(X_2^4) = 19.86101\ (18.30377)$<br>$E(X_1^3 X_2) = 10.16074\ (8.52421)$<br>$E(X_1^2 X_2^2) = 8.82111\ (7.09516)$<br>$E(X_1 X_2^3) = 9.74689\ (7.85027)$ |
|---|---|

TABLE 70

Simulation of v~Pearson VI (Mersenne Twister)
(100,000 points: Skewness = 0.73814, Kurtosis = 3.95094)

$\xi_2$~Pearson VI
(Skewness = 1.23655, Kurtosis = 5.44739)

| $\xi_1$~Pearson VI (Skewness = 1.00607, Kurtosis = 4.84439) | $E(X_1 X_2) = 0.50700\ (0.50000)$<br>$E(X_1^3) = 0.65099\ (0.83539)$<br>$E(X_2^3) = 0.61926\ (0.68503)$<br>$E(X_1^2 X_2) = 0.19285\ (0.26843)$<br>$E(X_1 X_2^2) = 0.18009\ (0.23836)$<br>$E(X_1^4) = 18.47777\ (20.30061)$<br>$E(X_2^4) = 19.66255\ (18.23759)$<br>$E(X_1^3 X_2) = 7.89355\ (8.30256)$ |
|---|---|

TABLE 70-continued

Simulation of v~Pearson VI (Mersenne Twister)
(100,000 points: Skewness = 0.73814, Kurtosis = 3.95094)

$\xi_2$~Pearson VI
(Skewness = 1.23655, Kurtosis = 5.44739)

$E(X_1^2 X_2^2) = 7.00530\ (6.98511)$
$E(X_1 X_2^3) = 8.47200\ (7.78683)$

TABLE 71

Simulation of v~Pearson I (Mersenne Twister)
(10,000,000 points: Skewness = 0.75009, Kurtosis = 3.00061)

$\xi_2$~Pearson I
(Skewness = 1.24914, Kurtosis = 4.99567)

| $\xi_1$~Pearson I (Skewness = 1.00039, Kurtosis = 4.00402) | $E(X_1 X_2) = 0.49989\ (0.50000)$<br>$E(X_1^3) = 0.86215\ (0.85735)$<br>$E(X_2^3) = 0.69791\ (0.69245)$<br>$E(X_1^2 X_2) = 0.27696\ (0.27478)$<br>$E(X_1 X_2^2) = 0.24381\ (0.24180)$<br>$E(X_1^4) = 14.28128\ (14.22654)$<br>$E(X_2^4) = 11.66910\ (11.64991)$<br>$E(X_1^3 X_2) = 5.93199\ (5.94719)$<br>$E(X_1^2 X_2^2) = 5.05602\ (5.06270)$<br>$E(X_1 X_2^3) = 5.29916\ (5.30306)$ |
|---|---|

TABLE 72

Simulation of v~Pearson I (Mersenne Twister)
(1,000,000 points: Skewness = 0.75120, Kurtosis = 3.00540)

$\xi_2$~Pearson I
(Skewness = 1.24907, Kurtosis = 4.98171)

| $\xi_1$~Pearson I (Skewness = 1.00109, Kurtosis = 4.00604) | $E(X_1 X_2) = 0.49930\ (0.50000)$<br>$E(X_1^3) = 0.89533\ (0.85858)$<br>$E(X_2^3) = 0.68324\ (0.69395)$<br>$E(X_1^2 X_2) = 0.28838\ (0.27520)$<br>$E(X_1 X_2^2) = 0.24667\ (0.24228)$<br>$E(X_1^4) = 14.53364\ (14.21276)$<br>$E(X_2^4) = 11.39707\ (11.67360)$<br>$E(X_1^3 X_2) = 6.00067\ (5.94700)$<br>$E(X_1^2 X_2^2) = 5.04246\ (5.06854)$<br>$E(X_1 X_2^3) = 5.20006\ (5.31224)$ |
|---|---|

TABLE 73

Simulation of v~Pearson I (Mersenne Twister)
(100,000 points: Skewness = 0.75497, Kurtosis = 3.00920)

$\xi_2$~Pearson I
(Skewness = 1.26254, Kurtosis = 5.06704)

| $\xi_1$~Pearson I (Skewness = 1.00499, Kurtosis = 4.02081) | $E(X_1 X_2) = 0.49628\ (0.50000)$<br>$E(X_1^3) = 0.91503\ (0.87211)$<br>$E(X_2^3) = 0.81354\ (0.70026)$<br>$E(X_1^2 X_2) = 0.31665\ (0.27923)$<br>$E(X_1 X_2^2) = 0.28333\ (0.24486)$<br>$E(X_1^4) = 14.76837\ (14.45443)$<br>$E(X_2^4) = 12.68609\ (11.72820)$<br>$E(X_1^3 X_2) = 6.42464\ (6.01515)$<br>$E(X_1^2 X_2^2) = 5.49943\ (5.09377)$<br>$E(X_1 X_2^3) = 5.62484\ (5.33362)$ |
|---|---|

TABLE 74

Simulation of ν~Pearson IV (Sobol Sequences)
(10,000,000 points: Skewness = 0.49984, Kurtosis = 3.99661)

$\xi_2$~Pearson IV
(Skewness = 0.99989, Kurtosis = 5.49716)

$\xi_1$~Pearson IV
(Skewness = 0.74961,
Kurtosis = 4.99697)

$E(X_1X_2) = 0.50065 \ (0.50000)$
$E(X_1^3) = 0.46513 \ (0.45688)$
$E(X_2^3) = 0.34724 \ (0.34631)$
$E(X_1^2X_2) = 0.15195 \ (0.14491)$
$E(X_1X_2^2) = 0.13147 \ (0.12280)$
$E(X_1^4) = 20.96140 \ (20.71114)$
$E(X_2^4) = 18.96493 \ (18.98008)$
$E(X_1^3X_2) = 8.62444 \ (8.45513)$
$E(X_1^2X_2^2) = 7.23779 \ (7.11639)$
$E(X_1X_2^3) = 8.15866 \ (8.02238)$

TABLE 75

Simulation of ν~Pearson IV (Sobol Sequences)
(1,000,000 points: Skewness = 0.50156, Kurtosis = 4.01302)

$\xi_2$~Pearson IV
(Skewness = 1.00505, Kurtosis = 5.56851)

$\xi_1$~Pearson IV
(Skewness = 0.75378,
Kurtosis = 5.06880)

$E(X_1X_2) = 0.50027 \ (0.50000)$
$E(X_1^3) = 0.51271 \ (0.46082)$
$E(X_2^3) = 0.29355 \ (0.34943)$
$E(X_1^2X_2) = 0.18042 \ (0.14617)$
$E(X_1X_2^2) = 0.14123 \ (0.12390)$
$E(X_1^4) = 21.75205 \ (21.04670)$
$E(X_2^4) = 17.87369 \ (19.31020)$
$E(X_1^3X_2) = 9.08039 \ (8.56145)$
$E(X_1^2X_2^2) = 7.40708 \ (7.18152)$
$E(X_1X_2^3) = 7.91876 \ (8.12734)$

TABLE 76

Simulation of ν~Pearson IV (Sobol Sequences)
(100,000 points: Skewness = 0.49485, Kurtosis = 3.93967)

$\xi_2$~Pearson IV
(Skewness = 0.97755, Kurtosis = 5.25878)

$\xi_1$~Pearson IV
(Skewness = 0.74392,
Kurtosis = 4.91538)

$E(X_1X_2) = 0.51597 \ (0.50000)$
$E(X_1^3) = 0.58669 \ (0.44230)$
$E(X_2^3) = 0.22209 \ (0.34012)$
$E(X_1^2X_2) = 0.18530 \ (0.14062)$
$E(X_1X_2^2) = 0.11556 \ (0.12018)$
$E(X_1^4) = 18.90286 \ (19.59718)$
$E(X_2^4) = 19.46098 \ (18.42567)$
$E(X_1^3X_2) = 8.47852 \ (8.11026)$
$E(X_1^2X_2^2) = 7.35375 \ (6.93623)$
$E(X_1X_2^3) = 8.77310 \ (7.81740)$

TABLE 77

Simulation of ν~Pearson VI (Sobol Sequences)
(10,000,000 points: Skewness = 0.75052, Kurtosis = 4.00533)

$\xi_2$~Pearson VI
(Skewness = 1.24990, Kurtosis = 5.49862)

$\xi_1$~Pearson VI
(Skewness = 1.00025,
Kurtosis = 4.80832)

$E(X_1X_2) = 0.49890 \ (0.50000)$
$E(X_1^3) = 0.85834 \ (0.85836)$
$E(X_2^3) = 0.67586 \ (0.69276)$
$E(X_1^2X_2) = 0.26486 \ (0.27507)$
$E(X_1X_2^2) = 0.22957 \ (0.24195)$
$E(X_1^4) = 20.75111 \ (20.75803)$
$E(X_2^4) = 18.35898 \ (18.36383)$
$E(X_1^3X_2) = 8.34400 \ (8.46229)$

TABLE 77-continued

Simulation of ν~Pearson VI (Sobol Sequences)
(10,000,000 points: Skewness = 0.75052, Kurtosis = 4.00533)

$\xi_2$~Pearson VI
(Skewness = 1.24990, Kurtosis = 5.49862)

$E(X_1^2X_2^2) = 6.94143 \ (7.08507)$
$E(X_1X_2^3) = 7.70291 \ (7.86377)$

TABLE 78

Simulation of ν~Pearson VI (Sobol Sequences)
(1,000,000 points: Skewness = 0.74714, Kurtosis = 3.98703)

$\xi_2$~Pearson VI
(Skewness = 1.25535, Kurtosis = 5.54128)

$\xi_1$~Pearson VI
(Skewness = 0.99763,
Kurtosis = 4.76410)

$E(X_1X_2) = 0.50279 \ (0.50000)$
$E(X_1^3) = 0.85332 \ (0.85813)$
$E(X_2^3) = 0.71108 \ (0.68795)$
$E(X_1^2X_2) = 0.27928 \ (0.27468)$
$E(X_1X_2^2) = 0.24924 \ (0.24065)$
$E(X_1^4) = 20.75610 \ (20.81044)$
$E(X_2^4) = 18.67477 \ (18.12723)$
$E(X_1^3X_2) = 8.58782 \ (8.46034)$
$E(X_1^2X_2^2) = 7.27662 \ (7.05231)$
$E(X_1X_2^3) = 8.11161 \ (7.78957)$

TABLE 79

Simulation of ν~Pearson VI (Sobol Sequences)
(100,000 points: Skewness = 0.74525, Kurtosis = 4.00908)

$\xi_2$~Pearson VI
(Skewness = 1.24858, Kurtosis = 5.45370)

$\xi_1$~Pearson VI
(Skewness = 0.97541,
Kurtosis = 4.65604)

$E(X_1X_2) = 0.50149 \ (0.50000)$
$E(X_1^3) = 0.84414 \ (0.85112)$
$E(X_2^3) = 0.74001 \ (0.67120)$
$E(X_1^2X_2) = 0.25369 \ (0.27170)$
$E(X_1X_2^2) = 0.24449 \ (0.23571)$
$E(X_1^4) = 20.21269 \ (20.61797)$
$E(X_2^4) = 18.14619 \ (17.84882)$
$E(X_1^3X_2) = 8.13209 \ (8.41799)$
$E(X_1^2X_2^2) = 7.02215 \ (7.04230)$
$E(X_1X_2^3) = 7.87597 \ (7.72573)$

TABLE 80

Simulation of ν~Pearson I (Sobol Sequences)
(10,000,000 points: Skewness = 0.74954, Kurtosis = 2.99766)

$\xi_2$~Pearson I
(Skewness = 1.25082, Kurtosis = 5.00640)

$\xi_1$~Pearson I
(Skewness = 0.99973,
Kurtosis = 3.99878)

$E(X_1X_2) = 0.49891 \ (0.50000)$
$E(X_1^3) = 0.85151 \ (0.85785)$
$E(X_2^3) = 0.69425 \ (0.69152)$
$E(X_1^2X_2) = 0.27271 \ (0.27485)$
$E(X_1X_2^2) = 0.24358 \ (0.24158)$
$E(X_1^4) = 14.12454 \ (14.24048)$
$E(X_2^4) = 11.63940 \ (11.62493)$
$E(X_1^3X_2) = 5.87281 \ (5.94859)$
$E(X_1^2X_2^2) = 5.02381 \ (5.05875)$
$E(X_1X_2^3) = 5.28335 \ (5.29472)$

TABLE 81

Simulation of ν~Pearson I (Sobol Sequences)
(1,000,000 points: Skewness = 0.75010, Kurtosis = 2.99854)

|  | $\xi_2$~Pearson I (Skewness = 1.24795, Kurtosis = 4.98565) |
|---|---|
| $\xi_1$~Pearson I (Skewness = 1.00175, Kurtosis = 4.00950) | $E(X_1 X_2) = 0.49930\ (0.50000)$ |
| | $E(X_1^3) = 0.84747\ (0.85658)$ |
| | $E(X_2^3) = 0.69495\ (0.69336)$ |
| | $E(X_1^2 X_2) = 0.27654\ (0.27463)$ |
| | $E(X_1 X_2^2) = 0.24869\ (0.24199)$ |
| | $E(X_1^4) = 14.00369\ (14.19065)$ |
| | $E(X_2^4) = 11.79774\ (11.65604)$ |
| | $E(X_1^3 X_2) = 5.89595\ (5.93636)$ |
| | $E(X_1^2 X_2^2) = 5.07337\ (5.05836)$ |
| | $E(X_1 X_2^3) = 5.39308\ (5.30273)$ |

TABLE 82

Simulation of ν~Pearson I (Sobol Sequences)
(100,000 points: Skewness = 0.75172, Kurtosis = 3.00686)

|  | $\xi_2$~Pearson I (Skewness = 1.24433, Kurtosis = 4.97196) |
|---|---|
| $\xi_1$~Pearson I (Skewness = 0.99401, Kurtosis = 3.96379) | $E(X_1 X_2) = 0.50653\ (0.50000)$ |
| | $E(X_1^3) = 0.86361\ (0.85588)$ |
| | $E(X_2^3) = 0.75411\ (0.68957)$ |
| | $E(X_1^2 X_2) = 0.30883\ (0.27419)$ |
| | $E(X_1 X_2^2) = 0.27926\ (0.24093)$ |
| | $E(X_1^4) = 14.15670\ (14.19358)$ |
| | $E(X_2^4) = 12.14498\ (11.56856)$ |
| | $E(X_1^3 X_2) = 6.48552\ (5.94093)$ |
| | $E(X_1^2 X_2^2) = 5.65552\ (5.06123)$ |
| | $E(X_1 X_2^3) = 5.90995\ (5.28470)$ |

2.3 Procedure for Fitting in Applications

From an aspect of statistical modeling, we need a procedure of fitting the third and fourth order moment matrix to ones of empirical distributions. We propose a procedure of calculating T, ζ, γ, κ and β by minimizing the sum of squares of bias between the formula of each elements and samples' moments. Namely, under the conditions that $TT' = \Sigma$, we will obtain the adequate T, ζ, γ, ε and β by minimizing the function defined by the following formula (95).

Herein, when m=p, T is fixed because that $T = \Sigma^{1/2}$ (square root of matrix). The calculation of the square root of matrix is reduced to the eigenvalue problem of real symmetric matrix. The typical methods are Yacobi method, Householder method, two divide method, inverse iteration method, two divide and inverse iteration method, QL method, Divide and Conquer method.

$$\sum_{i=1}^{9} w_i (f_i(T, \zeta, \gamma, \kappa, \beta) - m_i)^2 \quad (95)$$

Where $f_i$ is the formula of each element of the third and fourth order moments, for examples, $f_1 = E(x_1^3) = \gamma t_{11}^3 \zeta_1 + \gamma t_{12}^3 \zeta_2$, k=9 for p=2, and $m_i$ is the moments of sample distributions. When p=m=2, T is fixed (Yuan and Bentler (2000)). For an example, sample moments $m_i$ are shown in Table 83. We obtain the parameters, $\zeta_1 = 0.65967$, $\zeta_2 = 1.03624$, $\gamma = 0.63553$, $\kappa_1 5.27475$, $\kappa_2 = 6.69176$, $\beta = 4.02680$ by minimizing the formula (95). Elements of matrix obtained by these parameters are also shown in Table 83. Herein, $w_i$ is the weight.

TABLE 83

THE RESULT OF MINIMIZATION

| Assumed Moments | Matrix Elements Derived from Formula |
|---|---|
| $m_1 = 0.6$ | $f_1 = E(X_1^3) = 0.60073$ |
| $m_2 = 0.4$ | $f_2 = E(X_2^3) = 0.38923$ |
| $m_3 = 0.2$ | $f_3 = E(X_1^2 X_2) = 0.18623$ |
| $m_4 = 0.1$ | $f_4 = E(X_1 X_2^2) = 0.14391$ |
| $m_5 = 25$ | $f_5 = E(X_1^4) = 25.06116$ |
| $m_6 = 20$ | $f_6 = E(X_2^4) = 20.12018$ |
| $m_7 = 10$ | $f_7 = E(X_1^3 X_2) = 9.66439$ |
| $m_8 = 7$ | $f_8 = E(X_1^2 X_2^2) = 7.54424$ |
| $m_9 = 9$ | $f_9 = E(X_1 X_2^3) = 8.42872$ |

3. Maximum Likelihood Method

The other method than the previous method of moments is the maximum likelihood method. Method of moments for higher moments, the third and fourth moments, is sometimes unstable. The maximum likelihood method can improve this tendency.

In the case of the maximum likelihood method, the density functions are approximated by random numbers which are generated by our method. For an example, we simulate specific multivariate non-normal distributions by 10,000,000 points of random numbers very precisely. Procedure of the maximum likelihood method is the followings:

(1) We adopt the values obtained by method of moments as the initial values for the parameters.

(2) We obtain, for an example, 10,000,000 points of random numbers from its multivariate non-normal distributions.

(3) We segment each dimension of n-dimensional space of n-dimensional random vector by a step, Δh. We calculate a number of points within each hyper-cube and divide the number by the number of all points.

(4) We calculated log-likelihood by the following method.

The $\{X_1, \ldots, X_N\}$ denotes n-dimensional data ($X_i$ is n-dimensional data vector). The probability of the hyper-cube which $X_i$ with the parameters θ of specific multivariate non-normal distribution belong to, $P_i(\theta)$ is defined by the following formula (101).

$$P_i(\theta) = \frac{\text{Number of points belonging hyper-cube of } Xi}{\text{Number of all the points}} \quad (101)$$

Therefore, the approximated likelihood $f_i(\theta)$ with the parameters θ is defined by the following formula (102).

$$f_i(\theta) = \frac{P_i(\theta)}{(\Delta h)^n} \quad (102)$$

The sum of log-likelihood is calculated by the following formula (103).

$$\text{The sum of log-likelihood} = \sum_{i=1}^{N} \log f_i(\theta) \quad (103)$$

Finally, we obtain the maximum likelihood estimator $\hat{\theta}$ by maximizing this log-likelihood. In this way, we obtain the maximum likelihood estimated parameters. Herein, it is the same way to maximize the products of likelihood.

We estimate the estimator $\hat{\theta}$ of multivariate non-normal distributions by maximizing log-likelihood. Because that we apply our method to expected loss in finance area, we adopt 250 points which number means one year trading days. The moments of 250 points are shown in Table 84, and the moments of estimated distributions by maximum likelihood method are shown in Table 85-87.

The example of 250 points is random numbers by using typical congruential generators for the target values which are $\xi_1$ (skewness 0.75, kurtosis 5.0), $\xi_2$ (skewness 1.00, kurtosis 5.5), $\nu$ (skewness 0.5, kurtosis 4.0) (these values is the same as the previous multivariate simulation of the Pearson type IV distribution). The observed characteristics of distribution of 250 points is shown in Table 84. These are quite different with our target values.

Next, the result of maximum likelihood method by using the large number of random numbers (in this case, that is 10,000,000 points) is shown. Herein, because that we like to set only covariance to the same of empirical covariance 0.41819, we set $t_{11}=0.2148$, $t_{12}=0.9767$. Firstly, according to the result of typical congruential generators in Table 85, the estimates of maximum likelihood method are closer to the characteristics (in Table 56) of our target distributions than that of method of moments. This indicates that maximum likelihood method is superior to method of moments in the case of small samples. In the result, maximum log-likelihood is −562.73. Especially, you had better use maximum likelihood method in order to estimate precisely by using the multivariate non-normal distributions because that the one year data is 250 points in the risk management of finance area.

Furthermore, Table 86 (Mersenne Twister) and Table 87 (quasi random numbers, Sobol sequences) are shown. According to the result of the previous simulation using random numbers from multivariate non-normal distributions, it is understood that these methods generate random numbers which are very closer to our target distributions than the method of using the congruential generators. These tendency is very important for executing the maximum likelihood method. The result of both methods shows us that estimates are closer to the target values. Herein, maximum log-likelihood of Mersenne Twister is −561.36, and maximum log-likelihood of Sobol sequences is −560.36.

In this invention, we mainly mention the direct calculation of the density in the case of the continuous random variables, but we adopt the probability functions which are alternative to the density in the case of the discrete random variables. And we can adopt the method of representing the distribution function which is integral of the density or the probability function.

In this embodiment, without loss of generality, the condition that we adopt normalized mean 0, variance 1 ($E[x_i]=0$, $Var[x_i]=\sigma_{ii}=1$ ($E[x_i^2]=\sigma_{ii}=1$), $1 \leq i \leq n$), but in general, it is easy to expand this condition by the inverse transformation of the normalization. Moreover, by the maximum likelihood method, we will easily estimate directly the distribution by raw data (which means no pre-procedure like normalization) assuming the mean and standard deviation for the normalization as parameters.

TABLE 84

Simulation of $\nu$~Pearson IV (Congruential Method)
(250 points: Skewness = 0.67192, Kurtosis = 3.43229)

| | $\xi_2$~Pearson IV (Skewness = 0.93162, Kurtosis = 4.59551) |
|---|---|
| $\xi_1$~Pearson IV (Skewness = 0.32015, Kurtosis = 3.23438) | $E(X_1X_2) = 0.41819$ <br> $E(X_1^3) = -1.07342$ <br> $E(X_2^3) = -0.01951$ <br> $E(X_1^2X_2) = -0.26409$ <br> $E(X_1X_2^2) = 0.22859$ <br> $E(X_1^4) = 11.81879$ <br> $E(X_2^4) = 5.30847$ <br> $E(X_1^3X_2) = 4.18794$ <br> $E(X_1^2X_2^2) = 2.60629$ <br> $E(X_1X_2^3) = 1.87019$ |

TABLE 85

Simulation of $\nu$~Pearson IV (Congruential Method)
(10,000,000 points: Skewness = 0.29142, Kurtosis = 4.55658)

| | $\xi_2$~Pearson IV (Skewness = 1.17702, Kurtosis = 5.93076) |
|---|---|
| $\xi_1$~Pearson IV (Skewness = 0.83706, Kurtosis = 4.22038) | $E(X_1X_2) = 0.41967$ <br> $E(X_1^3) = 0.33064$ <br> $E(X_2^3) = 0.22749$ <br> $E(X_1^2X_2) = 0.08723$ <br> $E(X_1X_2^2) = 0.06480$ <br> $E(X_1^4) = 26.02023$ <br> $E(X_2^4) = 18.79541$ <br> $E(X_1^3X_2) = 8.50893$ <br> $E(X_1^2X_2^2) = 6.95577$ <br> $E(X_1X_2^3) = 6.91646$ |

TABLE 86

Simulation of $\nu$~Pearson IV (Mersenne Twister)
(10,000,000 points: Skewness = 0.70028, Kurtosis = 4.19914)

| | $\xi_2$~Pearson IV (Skewness = 1.00006, Kurtosis = 5.99739) |
|---|---|
| $\xi_1$~Pearson IV (Skewness = 0.80188, Kurtosis = 4.61365) | $E(X_1X_2) = 0.41805$ <br> $E(X_1^3) = 0.59633$ <br> $E(X_2^3) = 0.54355$ <br> $E(X_1^2X_2) = 0.14469$ <br> $E(X_1X_2^2) = 0.13599$ <br> $E(X_1^4) = 22.84608$ <br> $E(X_2^4) = 19.14545$ <br> $E(X_1^3X_2) = 7.38309$ <br> $E(X_1^2X_2^2) = 6.31882$ <br> $E(X_1X_2^3) = 6.67268$ |

TABLE 87

Simulation of $\nu$~Pearson IV (Sobol Sequences)
(10,000,000 points: Skewness = 0.69959, Kurtosis = 4.19641)

| | $\xi_2$~Pearson IV (Skewness = 1.00085, Kurtosis = 6.05384) |
|---|---|
| $\xi_1$~Pearson IV (Skewness = 0.80041, Kurtosis = 4.60588) | $E(X_1X_2) = 0.41900$ <br> $E(X_1^3) = 0.63499$ <br> $E(X_2^3) = 0.51414$ <br> $E(X_1^2X_2) = 0.15928$ <br> $E(X_1X_2^2) = 0.13940$ <br> $E(X_1^4) = 23.69659$ <br> $E(X_2^4) = 18.35414$ <br> $E(X_1^3X_2) = 7.79975$ |

TABLE 87-continued

Simulation of ν~Pearson IV (Sobol Sequences)
(10,000,000 points: Skewness = 0.69959, Kurtosis = 4.19641)

ξ$_2$~Pearson IV
(Skewness = 1.00085, Kurtosis = 6.05384)

$E(X_1^2X_2^2) = 6.53155$
$E(X_1X_2^3) = 6.65014$

Moreover, in the case that either part of or all of the moments from first order to fourth order are not easy to solve analytically or are not existing because of its divergence etc., or in the case that the distributions are not defined by the density function but defined by the characteristic function, such distributions are adopted to the distribution, ν and ξ of this invention by using the method of calculating its moments by random numbers generated from its distributions (possible to calculate for any cases if random numbers are obtained), or by using the method of calculating likelihood widely in use of random numbers from its distributions by substituting adequate values at adequate intervals for parameters which characterize its distributions or other parameters (θ denotes both of them). In general, for an example, stable distributions whose second moment is divergent and which are not defined by the closed form of the density functions but defined by the characteristic functions, are such distributions. Therefore, maximum likelihood of this invention is able to adopt such distributions that either part of all of the moments from first order to fourth order as ν and ξ, and also is the extension from Yuan and Bentler method.

4. Embodiments

FIG. 1 is the flowchart of calculating expected loss as an example of two dimensions case. Herein, the rate of returns of Japanese stock and foreign stock are adopted as variables of two dimensions. The procedure of calculating expected loss is realized by executing specific computer programs in computer.

By the step S1, Japanese stock returns $X_1'$ and foreign stock returns $X_2'$ are normalized.

Normalizing in the way that the mean and variance of empirical distributions are set to zero and one, respectively. $E(X_1')$, $E(X_2')$ and $V(X_1')$, $V(X_2')$ denote the mean and the variance of random variables $X_1'$ and $X_2'$ which has realized values of Japanese stock returns and foreign stock returns, respectively. Then the normalized Japanese stock returns $X_1$ and normlized foreign stock returns $X_2$ are given by the following formula, (104) and (105).

$$X_1 = \frac{X_1' - E(X_1')}{\sqrt{V(X_1')}} \qquad (104)$$

$$X_2 = \frac{X_2' - E(X_2')}{\sqrt{V(X_2')}} \qquad (105)$$

By the step S2, covariance matrix Σ is calculated by using normalized Japanese stock returns $X_1$ and normalized foreign stock returns $X_2$.

By the step S3, the third order moments of normalized Japanese stock returns and normalized foreign stock returns are calculated. The third order moments are four from $m_1$ to $m_4$ indicated by formula (106). Specifically, E(•) is calculated by data (realized values) of $X_1$, $X_2$.

$m_1 = E(X_1^3)$ $m_2 = E(X_2^3)$ $m_3 = E(X_1^2X_2)$ $m_4 = E(X_1X_2^2)$ (106)

By the step S4, the fourth order moments of normalized Japanese stock returns and normalized foreign stock returns are calculated. The fourth order moments are five from $m_5$ to $m_9$ indicated by formula (107).

$m_5 = E(X_1^4)$ $m_6 = E(X_2^4)$ $m_7 = E(X_1^3X_2)$ $m_8 = E(X_1^2X_2^2)$ $m_9 = E(X_1X_2^3)$ (107)

By the step 5, such $T = (t_{ij})$ that $\Sigma = TT'$ is calculated when Σ is covariance matrix calculated by step S2. Since the dimension of ξ and $X_i$ are two, matrix T is fixed because that $T = \Sigma^{1/2}$ (square root of matrix).

Specifically, we decide the adequate $\zeta = (\zeta_1, \zeta_2)$, γ, $\nu = (\nu_1, \nu_2)$, β by minimizing the following formula (108).

$$\sum_{i=1}^{9} w_i(f_i(T, \zeta, \gamma, \kappa, \beta) - m_i)^2 \qquad (108)$$

Herein, the weight of i, $w_i$ can weight the assessment of the moments. In this example of this embodiment, $w_i$ equals to 1 for the simplicity.

In the formula (108), the following (109) and (110) are used as the representation of the elements of the third order and fourth order moments. Since matrix T is calculated to $T = \Sigma^{1/2}$ (square root of matrix), the parameters, $\zeta = (\zeta_1, \zeta_2)$, γ, $\nu = (\nu_1, \nu_2)$, β are decided by minimizing the formula (108).

[The Third Order Moments]

$f_1 = \gamma t_{11}^3 \zeta_1 + \gamma t_{12}^3 \zeta_2$ $f_2 = \gamma t_{21}^3 \zeta_1 + \gamma t_{22}^3 \zeta_2$ $f_3 = \gamma t_{11}^2 t_{21} \zeta_1 + \gamma t_{12}^2 t_{22} \zeta_2$ $f_4 = \gamma t_{11} t_{21}^2 \zeta_1 + \gamma t_{21} t_{22}^2 \zeta_2$ (109)

when $f_1$, $f_2$, $f_3$, $f_4$ are the representation of each third order moments $E(x_1^3)$, $E(x_2^3)$, $E(x_1^2x_2)$ and $E(X_1x_2^2)$ of random vector $X = (x_1, x_2)'$ generated from $X = \nu T\xi$, respectively.

[The Forth Order Moments]

$f_5 = \beta[t_{11}^4(\kappa_1 - 3) + t_{21}^4(\kappa_2 - 3) + 3\sigma_{11}^2]$ (110)

$\quad = \beta t_{11}^4 \kappa_1 + 6\beta t_{11}^2 t_{21}^2 + \beta t_{12}^4 \kappa_2$ $f_6 = \beta[t_{12}^4(\kappa_1 - 3) + t_{22}^4(\kappa_2 - 3) + 3\sigma_{22}^2]$ $\quad = \beta t_{21}^4 \kappa_1 + 6\beta t_{22}^2 t_{12}^2 + \beta t_{22}^4 \kappa_2$ $f_7 = \beta[t_{11}^3 t_{21} \kappa_1 + 3(t_{11} t_{21}^3 + t_{11}^2 t_{22} t_{21}) + t_{21}^3 t_{22} \kappa_2]$ -continued $$f_8 = \beta[t_{11}^2 t_{21}^2 \kappa_1 + (t_{12}^4 + 4t_{11}t_{21}^2 t_{22} + t_{11}^2 t_{22}^2) + t_{21}^2 t_{22}^2 \kappa_2]$$

$$f_9 = \beta[t_{11} t_{21}^3 \kappa_1 + 3(t_{22}t_{12}^3 + t_{22}^2 t_{11}t_{21}) + t_{21} t_{21}^3 \kappa_2]$$

when $f_5, f_6, f_7, f_8, f_9$ are the representation of each fourth order moments of $E(x_1^4)$, $E(x_2^4)$, $E(x_1^3 x_2)$, $E(x_1^2 x_2^2)$ and $E(x_1 x_2^3)$ of random vector $X=(x_1,x_2)'$ generated from $X=\nu T\xi$, respectively. And also, $\sigma_{11}=\sigma_{22}=1$, $t_{11}^2 = t_{22}^2 = 1 - t_{12}^2 = 1 - t_{21}^2$ are given.

At the step S6, we decide the type of the Pearson system which each random variables $\xi_1, \xi_2, \nu$ belongs to. Random variable $\xi_1$ is sufficient with $E(\xi_1)=0$, $E(\xi_1^2)=1$, $E(\xi_1^3)=\zeta_1$, $E(\xi_1^4)=\kappa_1$. And also random variable $\xi_2$ is sufficient with $E(\xi_2)=0$, $E(\xi_2^2)=1$, $E(\xi_2^3)=\zeta_2$, $E(\xi_2^4)=\kappa_2$. Random variable is sufficient with $E(\nu)=0$, $E(\nu^2)=1$, $E(\nu^3)=\gamma$, $E(\nu^4)=\beta$. The skewness of the normalized random numbers $\xi_1, \xi_2, \nu$ are $\zeta_1, \zeta_2, \gamma$, respectively. And the kurtosis of the normalized random numbers $\xi_1, \xi_2, \nu$ are $\kappa_1, \kappa_2, \beta$, respectively.

Herein, by using the following formula (111) and table 88, we decide the type of the Pearson system which random variables $\xi_1, \xi_2, \nu$ belongs to. $\beta_1$ and $\beta_2$ of the formula (111) are squared skewness and kurtosis, respectively.

TABLE 88

$$\kappa = \frac{\beta_1(\beta_2+3)^2}{4(2\beta_2 - 3\beta_1 - 6)(4\beta_2 - 3\beta_1)} \quad (111)$$

| | |
|---|---|
| $0 < \kappa < 1$ | Pearson IV Type |
| $\kappa > 1$ | Pearson VI Type (Beta II Type) |
| $\kappa < 0$ | Pearson I Type (Beta I Type) |
| $\kappa = 0, \beta_1 = 0, \beta_2 < 3$ | Pearson II Type (Beta I Type) |
| $\kappa = 0, \beta_1 = 0, \beta_2 = 3$ | Normal |
| $\kappa = 0, \beta_1 = 0, \beta_2 > 3$ | Pearson VII Type |
| $\kappa = \pm\infty, 2\beta_2 - 3\beta_1 - 6 = 0$ | Pearson III Type (Gamma) |
| $\kappa = 1$ | Pearson V Type |

At the step S7, as for random numbers, $\xi_1, \xi_2, \nu$, each random number is generated from its type which is decided in the step S6.

Specifically, in the case except the type IV distribution, random numbers are generated by the procedure shown in Table 89 and 90. Herein, we adopt pseudo-random numbers including additive generator method, M-sequence, Generalized Feedback Shift-Register method and Mersenne Twister except congruential method, quasi-random numbers, low discrepancy sequences, and physical random numbers as random seeds.

TABLE 89

| Type | Pearson VI | Pearson I | Pearson II |
|---|---|---|---|
| Generator | X~Gamma (m)<br>Y~Gamma ($\beta$) | X~Gamma (p)<br>X~Gamma (q) | X~Gamma (p)<br>Y~Gamma (p) |
| Random Numbers | (Skewness > 0)<br>$Z = \alpha \dfrac{(X+Y)}{X} - \alpha + a$<br>(Skewness < 0)<br>$Z = \alpha \dfrac{(X+Y)}{X} + \alpha + a$ | $Z = b\dfrac{X}{(X+Y)} + a$ | $Z = b\dfrac{X}{(X+Y)} + a$ |
| Transformation formula | $r = \dfrac{6(\text{Kurtosis} - (\text{Skewness})^2 - 1)}{6 + 3 \times (\text{Skewness})^2 - 2 \times \text{Kurtosis}} (<0)$ | $r = \dfrac{6(\text{Kurtosis} - (\text{Skewness})^2 - 1)}{6 + 3 \times (\text{Skewness})^2 - 2 \times \text{Kurtosis}} (<0)$ | $p = \dfrac{3 - 3 \times \text{Kurtosis}}{2 \times \text{Kurtosis} - 6}$ |
| | $r_1 = \dfrac{1}{2}(r-2) +$<br>$\dfrac{1}{2}r(r+2)\sqrt{\dfrac{(\text{Skewness})^2}{(\text{Skewness})^2(r+2)^2 + 16(r+1)}}$ | $r_3 = \dfrac{1}{2}r +$<br>$\dfrac{1}{2}r(r+2)\sqrt{\dfrac{(\text{Skewness})^2}{(\text{Skewness})^2(r+2)^2 + 16(r+1)}}$ | $b = \sqrt{4(2p+1)\text{Var}}$ |
| | $r_2 = \dfrac{1}{2}(r-2) -$<br>$\dfrac{1}{2}r(r+2)\sqrt{\dfrac{(\text{Skewness})^2}{(\text{Skewness})^2(r+2)^2 + 16(r+1)}}$ | $r_4 = \dfrac{1}{2}r -$<br>$\dfrac{1}{2}r(r+2)\sqrt{\dfrac{(\text{Skewness})^2}{(\text{Skewness})^2(r+2)^2 + 16(r+1)}}$ | $a = \text{Mean} - \dfrac{b}{2}$ |
| | $\beta = \text{Max}[r_1, r_2] + 1$<br>$m = -\text{Min}[r_1, r_2] - \beta$ | $q = \text{Max}[r_3, r_4]$ (Skewness > 0)<br>$\text{Min}[r_3, r_4]$ (Skewness < 0) | |
| | $\alpha = \sqrt{\dfrac{\text{Var} \times (m-1)^2(m-2)}{(m+\beta-1)\beta}}$ | $p = \text{Max}[r_3, r_4]$ (Skewness > 0)<br>$\text{Min}[r_3, r_4]$ (Skewness < 0) | |
| | $a = \text{Mean} - \dfrac{\alpha\beta}{m-1}$ (Skewness > 0)<br>$\text{Mean} + \dfrac{\alpha\beta}{m-1}$ (Skewness < 0) | $b = (p+q)\sqrt{\dfrac{\text{Var} \times (p+q+1)}{pq}}$<br>$a = \text{Mean} - \dfrac{bp}{p+q}$ | |

TABLE 90

| Type | Gaussian | Pearson VII | Pearson III | Pearson V |
|---|---|---|---|---|
| Generator | $X \sim$ Normal $(0, 1)$ | $X \sim$ Normal $(0, 1)$<br>$Y \sim$ Gamma $\left(b - \frac{1}{2}\right)$ | $X \sim$ Gamma $(\alpha)$ | $X \sim$ Gamma $(\nu)$ |
| Random Numbers | $Z = \sigma X + \mu$ | $Z = \tau \dfrac{X}{\sqrt{2Y}} + \mu$ | (Skewness > 0)<br>$Z = \beta X + \gamma$<br>(Skewness < 0)<br>$Z = -\beta X + \gamma$ | (Skewness > 0)<br>$Z = \dfrac{\lambda}{X} + a$<br>(Skewness < 0)<br>$Z = -\dfrac{\lambda}{X} + a$ |
| Transformation Formula | $\mu =$ Mean<br>$\sigma = \sqrt{\text{Var}}$ | $b = \dfrac{5 \times \text{Kurtosis} - 9}{2 \times \text{Kurtosis} - 6}$<br>$\tau = \sqrt{(2b - 3) \times \text{Var}}$<br>$\mu =$ Mean | $\alpha = \dfrac{4}{(\text{Skewness})^2}$<br>$\beta = \sqrt{\dfrac{\text{Var}}{\alpha}}$<br>$\gamma =$ Mean $- \alpha\beta$ (Skewness > 0)<br>Mean $+ \alpha\beta$ (Skewness < 0) | $\nu = \dfrac{16 + 6 \times (\text{Skewness})^2 + 8 \times \sqrt{4 + (\text{Skewness})^2}}{2 \times (\text{Skewness})^2}$<br>$\lambda = (\nu - 1)\sqrt{\text{Var} \times (\nu - 2)}$<br>$a =$ Mean $- \dfrac{\lambda}{\nu - 1}$ (Skewness > 0)<br>Mean $+ \dfrac{\lambda}{\nu - 1}$ (Skewness < 0) |

In the case of Pearson type IV, random numbers are generated by the following algorithm.

[Algorithm]

(Set up)

Step 0

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2}$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2}$$

(112)

$M \leftarrow \arctan\left(\dfrac{b\delta}{b-1}\right)$ $L \leftarrow C \times \cos^{2(b-1)}(M)\exp(2b\delta M)$ $R = \log(L)$ Generator (Routine for Generating Random Numbers)

Repeat

Step 1

Generate U~Uniform (0, 2)

Generate E~Exponential Distribution

If $U \leq 1$ then $(Y, T) \leftarrow (U, -E)$

Else $(Y, T) \leftarrow (1 + E*, -E - E*)$ ($E* \sim$ New Exponential Distribution)

-continued

Step 2

Generation W~Uniform (0, 1)

If $W \leq 0.5$ then $Y \leftarrow -Y$ $Y \leftarrow M + \dfrac{Y}{L}$

If $Y \geq \dfrac{\pi}{2}$ then go to Step 1

If $Y \leq \log g(Y) - R$ then $X = \arctan(Y)$ else go to Step 1

(Transformation)

$X = \tau X + \mu$

This algorithm includes the step of using the analytical solution of the normalizing constant or the step of its expansion (formula (112)), and also includes the step of generating random numbers by using the rejection algorithm.

At the step S8, by the following formula (113), random numbers, $\xi_1$, $\xi_2$, $\nu$ which are generated in the step S7, are transformed to random numbers, $x_1$, which belongs to the normalized Japanese stock returns and random numbers, $x_2$ which belongs to the foreign stock returns.

$$\begin{pmatrix} x_1 \\ x_2 \end{pmatrix} = \nu T \begin{pmatrix} \xi_1 \\ \xi_2 \end{pmatrix} \tag{113}$$

At the step S9, by the following formula (114) and (115), random numbers, $x_1$, $x_2$ which are generated in the step S8, are transformed to random numbers, $x_1'$ which belongs to the pre-normalized Japanese stock returns and random numbers, $x_2'$ which belongs to pre-normalized foreign stock returns, respectively. Herein, we use the values which are normalized in the step S1 as the variance V(•) and the mean E(•).

$$x_1' = \sqrt{V(X_1')}x_1 + E(X_1') \tag{114}$$

$$x_2' = \sqrt{V(X_2')}x_2 + E(X_2') \tag{115}$$

At the step S10, by using random numbers $x_1'$ and $x_2'$ which are obtained in the step S9, the expected maximum loss (VAR) is calculated.

When the amount of assets of Japanese stock and foreign stock are $A_1, A_2$, respectively, random numbers which belong to the combined returns of Japanese stock and foreign stock are obtained. The weight of Japanese stock and foreign stock are shown in the formula (116) and (117), respectively. And random numbers W, which belongs to the combined returns of Japanese stock returns and foreign returns are shown in the formula (118).

$$w_1 = \frac{A_1}{A_1 + A_2} \tag{116}$$

$$w_2 = \frac{A_2}{A_1 + A_2} \tag{117}$$

$$W = w_1 x_1' + w_2 x_2' \tag{118}$$

By the Monte Carlo simulation using random numbers W, we obtain such specific return that the region integrated from minus infinity of the returns distribution which are combined of Japanese stock returns and foreign stock returns, is the one percent of total region. The absolute value of that return (typically, this value is minus) multiplied by the amount of asset is the standard expected maximum loss.

Specifically, by generating random numbers W, which belongs to the combined returns distribution of the Japanese stock and the foreign stock, and we obtain certain return which is one percentile of returns (typically, regulation for banking uses this rule). herein, we can use not only one percentile but also any percentile.

In this embodiment, we explained two dimensions case that there are two assets of Japanese stock and foreign stock. Moreover, it is easy to expand this method to n-dimensions case that there are n-assets. The above method can be applied to the risk management by using the distribution of loss amount itself.

At the step S5, in the formula (119), $f_{ijk}(T, \zeta, \gamma, \nu, \beta)$ and $f_{ijkl}(T, \zeta, \gamma, \nu, \beta)$ use the relation of the formula (120) and (121) as the representation of the third and fourth order moments. And $m_{ijk}$ and $m_{ijkl}$ are defined by the formula (122) and (123). Specifically, E(•) is calculated by the data of $X_i$.

$$\sum_{i \leq j \leq k} w_{ijk}(f_{ijk}(T, \zeta, \gamma, \kappa, \beta) - m_{ijk})^2 + \tag{119}$$

$$\sum_{i \leq j \leq k \leq l} w_{ijkl}(f_{ijkl}(T, \zeta, \gamma, \kappa, \beta) - m_{ijkl})^2$$

$$E(vech(XX')X') = \gamma D_n^+ (T \otimes T)\left(\sum_{j=1}^m \zeta_j E_{ii} \otimes e_i\right)T' \tag{120}$$

$$var(vech(XX')) = 2\beta D_n^+(\Sigma \otimes \Sigma)D_n^{+'} + \tag{121}$$

$$(\beta - 1)vech(\Sigma)vech'(\Sigma) + \beta \sum_{j=1}^m (\kappa_j - 3)vech(t_j t_j')vech'(t_j t_j')$$

$$m_{ijk} = E(X_i X_j X_k) \tag{122}$$

$$m_{ijkl} = E(X_i X_j X_k X_l) \tag{123}$$

Furthermore, we obtain the parameters, $\zeta=(\zeta_1, \ldots, \zeta_m), \gamma, \nu=(\nu_1, \ldots, \nu_m), \beta$ which minimize the formula (119).

At the step S6, according to these parameters, we decide the type of the Pearson system which each random variables, $\nu, \xi_1 \sim \xi_m$ belong to. At the step S7, random numbers are generated from its type. At the step S8, random numbers generated in the step S7 are transformed to random numbers $x_1, x_2, \ldots, x_n$. furthermore, at the step S9, these random numbers are transformed to random numbers $x_1', x_2', \ldots, x_n'$.

At the step S10, when the amount of n assets are $A_1, A_2, \ldots, A_n$, we obtain random numbers which belong to the combined returns of n assets multiplied by these weights. The weights of i asset is shown in the formula (124). Random numbers, W, which belongs to the combined return distribution of n-assets are shown in the formula (125).

$$w_j = \frac{A_j}{A_1 + \ldots + A_n} \tag{124}$$

$$W = w_1 x_1' + \ldots + w_n x_n' \tag{125}$$

By Monte Carlo simulation using such random numbers W, in the case of n assets, we can calculate the expected loss in the same way of two dimensions. After setting the generated random numbers in order, we pick up return which is the one percentile of total region. And the total amount of n-assets multiplied by the absolute value of this return is the expected loss.

Moreover, this embodiment can calculate the expected loss by using the parameters estimated by the maximum likelihood method alternative to the moment method. Previously mentioned, in the case of the stock returns, the number of one year trading days is very small, 250 days. Maximum likelihood method estimates the parameters precisely although such a small sample size as 250 points.

Figure 2:
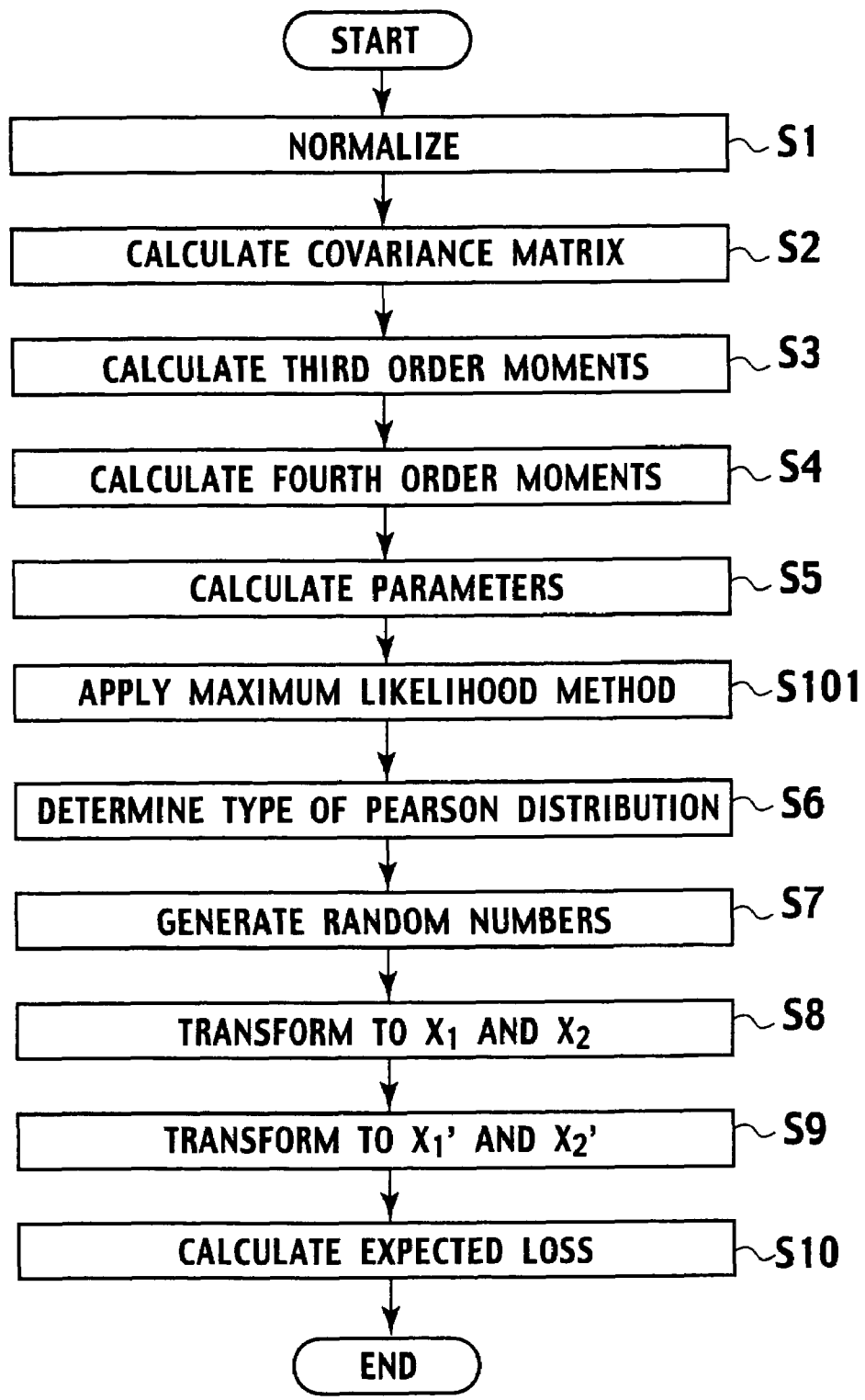
FIG. 2 is the flowchart of the procedure to calculate the expected loss by maximum likelihood method.

FIG. 2 is the flowchart which shows the procedure of calculating the expected loss by using maximum likelihood method. In these procedure, besides adding the step S101 between the step S5 and the step S6, these are the same as the procedure which are shown in the FIG. 1. Therefore, we omit the explanation besides the step S101.

At the step S101, we adopt initial values for the parameters which are calculated by the moments method in the step S5. And we calculate the estimated values of $\zeta_1, \zeta_2, \gamma, \nu_1, \nu_2, \beta$ by maximum likelihood method.

Specifically, at the step S101, the estimated values of the parameters are calculated by the following procedure. Herein, in this step S101, θ denotes one the less of the parameters, T, $\zeta_1, \zeta_2, \gamma, \nu_1 \nu_2, \beta$.

(1) We adopt the values of the parameters obtained by method of moments in the step S5 as their initial values.

(2) We obtain, for an example, 10,000,000 points of random numbers from its multivariate non-normal distributions. Its random numbers are generated in the same way of the step S6 and S7.

(3) We segment each dimension of n-dimensional space of n-dimensional random vector by a step, Δh. We calculate a number of points within each hyper-cube and divide the number by the number of all points.

(4) We calculate log-likelihood by the following method.

The $\{X_1, \ldots, X_N\}$ denotes n-dimensional data ($X_1$ is n-dimensional data vector). The probability of the hyper-cube which $X_i$ with the parameters θ of specific multivariate non-normal distributions belong to, $P_i(θ)$ is defined by the following formula (126).

$$P_i(θ) = \frac{\text{Number of points belonging to hyper-cube of } Xi}{\text{Number of all points}}, \quad (126)$$

Herein parameter θ represents at least one of the parameters T, $ζ=(ζ_1,\ldots,ζ_m), γ, ν=(ν_1,\ldots,ν_m)$ and β, which are used in the Yuan and Bentler method 1.

Therefore, the approximated likelihood $f_i(θ)$ with the parameters $\hat{θ}$ is defined by the following formula (127), $$f_i(θ) = \frac{P_i(θ)}{(\Delta h)^n} \quad (127)$$

The sum of log-likelihood is calculated by the following formula (128).

$$\text{The sum of log-likelihood} = \sum_{i=1}^{N} \log f_i(θ) \quad (128)$$

Finally, we obtain the maximum likelihood estimator $\hat{θ}$ by maximizing this log-likelihood. We adopt these estimators as the parameters. Herein, it is the same way to maximize the products of likelihood.

This embodiment will not only measure the typical risk more precisely but also manage the risks of the portfolio which includes the skewed return distributions of real estate and alternative fund. And we will measure the distribution of asset amount itself directly, besides the typical return (rate of returns)-based distribution. We will manage the portfolio which includes not only underlying assets but also various derivatives like options. And, we will also manage the integrated risk of various risk (financial risk, operational risk, insurance risk, catastrophic risk, enterprise risk, etc.) like insurance, weather, earthquake. Herein, the profit-loss distributions are totally defined by the distribution for assessment which are the amount of loss itself or the return distribution measuring the risk.

In this embodiment, the parameters $ζ, γ, ν, β$ are obtained in the step S5 by using the third and fourth order moments, $m_1 \sim m_0$ obtained in the steps S2, S3 and S4. At the step parameters around these values which indicate the maximum log likelihood are obtained. Although, we will omit the part of or all of the steps S2~S5 which decide the initial values of the parameters. In this case, when the initial values of the parameters are unknown, in the step S101, the log-likelihood are calculated at the discrete grid points of the parameters space in the wide area. After that, the values of the parameters which indicate the maximum log-likelihood (or the maximum likelihood) are obtained. This method is called the Grid-Search method.

By this method, we will adopt such distributions that eight part of or all of the moments from first order to fourth order are not existing as the distribution, ξ and ν, if random numbers are generated. In this case, the parameters of the characteristics of distributions and all of necessary parameters for maximum likelihood method are widely denoted by θ.

5. Modifications 5.1 Simulation Method for Financial Instruments

Next, simulation method for financial instruments, which uses the characteristics of multivariate non-normal distribution by using random numbers of this embodiment, will be explained as the first modification of this embodiment.

By this method, monte carlo simulation of using random numbers generated from the Pearson type IV distribution by the next algorithm can be used. This algorithm includes the step of analytical solution of the normalizing constant of the Pearson type IV distribution or calculating this expansion (formula (129)), and the step of generating random numbers by using rejection method.

[Algorithm]
(Set up)
Step 0

$$C = \frac{1}{B\left(b - \frac{1}{2}, \frac{1}{2}\right)} \times \frac{\Gamma(b + bδi)\Gamma(b - bδi)}{\{\Gamma(b)\}^2} \quad (129)$$

$$= \frac{1}{B\left(b - \frac{1}{2}, \frac{1}{2}\right)} \times \prod_{k=0}^{\infty} \frac{1}{1 + \left(\frac{bδ}{b+k}\right)^2}$$

$$\approx \frac{1}{B\left(b - \frac{1}{2}, \frac{1}{2}\right)} \times \prod_{k=0}^{n} \frac{1}{1 + \left(\frac{bδ}{b+k}\right)^2}$$

$M \leftarrow \arctan\left(\frac{bδ}{b-1}\right)$ $L \leftarrow C \times \cos^{2(b-1)}(M) \exp(2bδM)$ $R = \log(L)$ Generator (Routine for Generating Random Numbers)
Repeat
Step 1
    Generate U~Uniform (0, 2)
    Generate E~Exponential Distribution
If U ≦ 1 then (Y, T) ← (U, −E)

Else (Y, T) ← (1 + E∗, −E − E∗) (E∗ ~ New Exponential Distribution)

Step 2
    Generation W~Uniform (0, 1)

If W ≦ 0.5 then Y ← −Y $Y \leftarrow M + \frac{Y}{L}$

If $Y \geq \frac{\pi}{2}$ then go to Step 1

If $Y \leq \log g(Y) - R$ then $X = \arctan(Y)$ else go to Step 1
(Transformation)
$X = τX + μ$ By this method, we will generate returns which represent the characteristics of the real market precisely by generating random numbers considering the higher order cross correlation of many assets. For an example, it will be used for the performance analysis of financial instruments.

By this method, we will reproduce so-called "fat-tailed", which is the characteristic of distribution of financial area by using the multivariate non-normal distributions of this embodiment (not only use of the Pearson system as ξ, ν but also use of any probability distributions). By the method of this embodiment (not only multivariate case but also univariate case as special case) to apply the precious probability distributions (including the usage of not only the Pearson system but also general probability distributions as $\xi$, $v$) to the objective data of various derivatives, we can calculate the price of derivatives by Monte Carlo simulation using random numbers from its distributions. In order to design the derivatives, the correlation between the weather data of many points and various index are needed. This is applied to analyze this case.

For examples, this embodiment is applied to price or design the insurance and weather derivatives and real options. Especially, as an example using multivariate non-normal distributions for pricing, there are such compound options and plural place options as correlating trigger option writer can select and execute its best option at the expiration date.

5.2 Ion Implantation to Semiconductor Materials

Next, the application for ion implantation to semiconductor materials is explained as a second modification of this embodiment. In the case of the application for ion implantation, the distribution of implanted ion is simulated by Monte Carlo method.

The space distribution and the electrical profile of ion are generally multivariate non-normal distribution. These distributions can be precisely represented by the method of using random numbers which are generated from multivariate non-normal distribution including the Pearson distribution system.

In this way, applying the multivariate non-normal distribution of this embodiment will improve typical analytical model into the precise model which is closer to the real distribution by using random numbers from the multivariate non-normal distribution of this invention.

Furthermore, though Monte Carlo simulation of physical model currently takes very long time, this invention will shorten the time of Monte Carlo simulation because of estimating the whole distribution precisely and shortly from the result of the smaller number of physical simulation by using random numbers and the method of estimating the parameters of the multivariate non-normal distributions of this embodiment.

5.3 Asset Allocation

By the embodiment of this invention, asset allocation among assets represented by multivariate non-normal distributions will be executed by combining not only traditional mean-variance optimization but also optimization of considering the skewness. The references for this optimization of considering the skewness are the followings: Konno, H. (1998) "Rizai Kougaku II", Nikka Giren, Konno, H and Suzuki, T. and Kobayashi, D. (1998) "A Branch and Bound Algorithm for Solving Mean-Risk-Skewness PortfolioModels)", Optimization Methods and Software, Vol. 10, 297-317 pp; Konno, H., Shirakawa, H., and Yamazaki, H. (1993) "A Mean-Absolute Deviation Skewness Portfolio Optimization Model)", Annals of Operations Research, Vol. 45, 205-220; Konno, H and Suzuki, K. (1995) "A Mean-Variance-Skewness Portfolio Optimization Model", Journal of the Operations Research Society of Japan, Vol. 38, 173-187 pp. Moreover, by using the optimization of considering the kurtosis, it will be easy to expand this embodiment.

Specifically, by the embodiment of this invention, the probability distributions of the returns and prices of assets are estimated and calculated with mean, variance, skewness and kurtosis as portfolio. Optimized asset allocation will be calculated by the optimization method of considering not only mean and variance but also the skewness. Moreover, we can optimize the asset allocation by using the optimization method of considering not only the skewness but also kurtosis.

This method will execute the precise and effective asset allocation including real estates and alternative investment which are difficult to approximate by typical normal distributions. And, for Pension fund consultation and asset management, the performance of asset allocation and construct the asset models of multivariate non-normal distributions will be executed.

5.4 Assessment of Human Ability

For an example, it is well-known that the distribution of abilities like IQ-tests is not the normal distribution. For IQ-tests, in the one dimension case, the Pearson distribution is used. The statistical analysis for assessment of ability is referred to the paper, (Burt, C. (1963) "Is Intelligence Distributed Normally?", The British Journal of Statistical Psychology, Vol. 16 (XVI), No. 2.

This embodiment of this invention can execute the precise measurement of ability by estimating the precise multivariate non-normal distributions. Therefore, the judgment of entrance examinations and the assessment of employee's performance (settlement of selection criterion or tests of effective of selection) can be precisely done. Moreover, we can define the total ability by using the criterion of percentile.

Furthermore, in the case that a part of marginal distribution has large data, for examples the result of entrance examinations and the score of at graduation in university, the result of employee's entrance examination and the employee's performance in a company, this embodiment of this invention can estimate the distribution of another small data by maximum likelihood method.

Industrial Applicability

This invention by using random numbers from the Pearson distribution system or general probability distribution provides the method of generating random numbers from multivariate non-normal distributions which approximates empirical distribution, the method of estimating the multivariate non-normal distributions, and the medium of including these procedure.

Concretely, the method of generating random numbers from multivariate non-normal distributions and the method of estimating the parameters of the multivariate non-normal distributions are effective for statistical modeling of various area. For examples, this invention is effective for the software package of statistical methods the application of calculating expected loss in the area of the risk management, the simulation of financial instruments, the application to asset allocation, the pricing and the design of the weather, insurance derivatives and real options, simulation for ion implantation of semiconductor materials, the assessment of education and employee's performance.

The invention claimed is:

1. A method for generating random numbers on a computer in accordance with multivariate non-normal distributions based on the Yuan and Bentler method I, comprising:
  fitting, using a computer, n-dimensional multivariate non-normal distributions for n-dimensional empirical distributions;
  generating, using a computer, the random numbers including pseudo-random numbers by at least one of an additive generator method, an M-sequence method, a generalized feedback shift-register method, and a Mersenne Twister method, and excluding a congruential method, quasi-random numbers, low discrepancy sequences, and physical random numbers;

wherein the fitting employs the following formulae (a) and (b) for an application with respect to third and fourth order moments of the empirical distributions:

$$E(vech(XX')X') = \gamma D_n^+(T \otimes T)\left(\sum_{j=1}^{m} \zeta_j E_{ii} \otimes e_i\right)T' \quad (a)$$

$$\text{var}(vech(XX')) = 2\beta D_n^+(\Sigma \otimes \Sigma)D_n^{+'} + \quad (b)$$
$$(\beta - 1)vech(\Sigma)vech'(\Sigma) +$$
$$\beta \sum_{j=1}^{m}(\kappa_j - 3)vech(t_j t_j')vech'(t_j t_j')$$

where E (•) is an expectation, vech (•) is a vector consisting of matrix elements not duplicated in symmetrical matrix, $D_n$ is an n-order duplication matrix, $D_n^+$ is the Moore-Penrose generalized inverse matrix of $D_n$, $\otimes$ is the Kronecker product, and $E_{ii}$ is $e_i e_i'$ when $e_i$ is the ith column unit;

wherein the Yuan and Bentler method I uses:

independent random variables $\xi_1, \ldots, \xi_m$ that satisfy E ($\xi_j$)=0, E ($\xi_j^2$)=1, E ($\xi_j^3$)=$\zeta_j$, and E ($\kappa_j^4$)=$\kappa_j$ ($1 \leq j \leq m$) with respect to parameters $\xi_j$ and $\kappa_j$;

a random variable $\nu$ independent from $\xi_j$ that satisfies E ($\nu$)=0, E ($\nu^2$)=1, E ($\nu^3$)=$\gamma$, and E ($\nu^4$)=$\beta$ with respect to parameters $\gamma$ and $\beta$;

a non-random n×m (m≦n) matrix T=($t_{ij}$) of n rank that satisfies TT'=$\Sigma$ with respect to a matrix $\Sigma$=($\sigma_{ij}$) where the matrix T' is a transposed matrix of T and where a random vector X=($x_1, \ldots, x_n$)' given by the following expression (C) satisfies Cov (X)=$\Sigma$;

$$X = \nu T\xi \quad (c)$$

where Cov (•) is a variance covariance matrix of a vector, and $\xi$=($\xi_1, \ldots, \xi_m$)'.

2. The method according to claim 1,
wherein random numbers in accordance with the Pearson distribution system are used for the random variables $\xi_1, \ldots, \xi_m$ and $\nu$.

3. The method according to claim 2,
wherein at least two types of Pearson distribution are used for the random variables $\xi_1, \ldots, \xi_m$ and $\nu$.

4. The method according to claim 1,
wherein the fitting comprises determining at least one of parameters T, $\zeta$=($\zeta_1, \ldots, \zeta_m$), $\gamma$, $\nu$=($\nu_1, \ldots, \nu_m$), and $\beta$ which minimize a value of an expression (f) with respect to third and fourth order moments of n-dimensional empirical distributions (random vector is to be ($X_1, \ldots, X_n$)') which are given by expressions (d) and (e), respectively:

$$m_{ijk} = E(X_i X_j X_k) \quad (d)$$

$$m_{ijkl} = E(X_i X_j X_k X_l) \quad (e)$$

$$\sum_{i \leq j \leq k} w_{ijk}(f_{ijk}(T, \zeta, \gamma, \kappa, \beta) - m_{ijk})^2 + \quad (f)$$
$$\sum_{i \leq j \leq k \leq l} w_{ijkl}(f_{ijkl}(T, \zeta, \gamma, \kappa, \beta) - m_{ijkl})^2$$

wherein $f_{ijk}$ (T, $\zeta$, $\gamma$, $\nu$, $\beta$) and represented in accordance with the formulae (a) and (b) corresponding respectively to third order moment E ($x_i\, x_j\, x_k$) and fourth order moment E ($x_i\, x_j\, x_k\, x_l$) and $w_{ijk}$ and $w_{ijkl}$ are presented weights.

5. The method according to claim 4,
wherein $w_{ijk}$=1 and $w_{ijkl}$=1.

6. The method according to claim 4,
wherein n=2, and wherein the fitting comprises determining at least one of parameters T, $\zeta$=($\zeta_1, \zeta_2$), $\gamma$, $\nu$=($\nu_1, \nu_2$), and $\beta$ so as to minimize a value given by an expression (k) with respect to third and fourth order moments of two-dimensional empirical distributions (random vector is to be ($X_1, X_2$)') given respectively by expressions (g) and (h), and representations corresponding respectively to third order moment E ($x_i\, x_j\, x_k$) given by the expression (i) and fourth order moment E ($x_i\, x_j\, x_k\, x_l$) given by the expression (j):

$$m_1 = E(X_1^3) \quad (g)$$
$$m_2 = E(X_2^3)$$
$$m_3 = E(X_1^2 X_2)$$
$$m_4 = E(X_1 X_2^2)$$

$$m_5 = E(X_1^4) \quad (h)$$
$$m_6 = E(X_2^4)$$
$$m_7 = E(X_1^3 X_2)$$
$$m_8 = E(X_1^2 X_2^2)$$
$$m_9 = E(X_1 X_2^3)$$

$$f_1 = \gamma t_{11}^3 \zeta_1 + \gamma t_{12}^3 \zeta_2 \quad (i)$$
$$f_2 = \gamma t_{21}^3 \zeta_1 + \gamma t_{22}^3 \zeta_2$$
$$f_3 = \gamma t_{11}^2 t_{21} \zeta_1 + \gamma t_{12}^2 t_{22} \zeta_2$$
$$f_4 = \gamma t_{11} t_{21}^2 \zeta_1 + \gamma t_{12} t_{22}^2 \zeta_2$$

$$f_5 = \beta[t_{11}^4(\kappa_1 - 3) + t_{21}^4(\kappa_2 - 3) + 3\sigma_{11}^2] \quad (j)$$
$$= \beta t_{11}^4 \kappa_1 + 6\beta t_{11}^2 t_{21}^2 + \beta t_{12}^4 \kappa_2$$
$$f_6 = \beta[t_{12}^4(\kappa_1 - 3) + t_{22}^4(\kappa_2 - 3) + 3\sigma_{22}^2]$$
$$= \beta t_{21}^4 \kappa_1 + 6\beta t_{22}^2 t_{12}^2 + \beta t_{22}^4 \kappa_2$$
$$f_7 = \beta[t_{11}^3 t_{21} \kappa_1 + 3(t_{11} t_{21}^3 + t_{11}^3 t_{22} t_{21}) + t_{21}^3 t_{22} \kappa_2]$$
$$f_8 = \beta[t_{11}^2 t_{21}^2 \kappa_1 + (t_{12}^4 + 4t_{11} t_{21}^2 t_{22} + t_{11}^2 t_{22}^2) + t_{21}^2 t_{22}^2 \kappa_2]$$
$$f_9 = \beta[t_{11} t_{21}^3 \kappa_1 + 3(t_{22} t_{12}^3 + t_{22}^2 t_{11} t_{21}) + t_{21} t_{21}^3 \kappa_2]$$

$$\sum_{i=1}^{9} w_i(f_i(T, \zeta, \gamma, \kappa, \beta) - m_i)^2. \quad (k)$$

7. The method according to claim 6,
wherein $w_i$=1.

8. The method according to claim 1,
wherein at least one of the parameters T, $\zeta$=($\zeta_1, \ldots, \zeta_m$), $\gamma$, $\nu$=($\nu_1, \ldots, \nu_m$), and $\beta$ is estimated by the maximum likelihood method.

9. The method according to claim 1,
wherein a type to which the random variables belong is determined using at least one correspondence relationship between values of $\nu$ indicated in table (ss):

TABLE (ss)

| | |
|---|---|
| $0 < \kappa < 1$ | Pearson IV Type |
| $\kappa > 1$ | Pearson VI Type(Beta II Type) |
| $\kappa < 0$ | Pearson I Type(Beta I Type) |
| $\kappa = 0, \beta_1 = 0, \beta_2 < 3$ | Pearson II Type(Beta I Type) |
| $\kappa = 0, \beta_1 = 0, \beta_2 = 3$ | Normal |
| $\kappa = 0, \beta_1 = 0, \beta_2 > 3$ | Pearson VII Type |
| $\kappa = \pm\infty, 2\beta_2 - 3\beta_1 - 6 = 0$ | Pearson III Type(Gamma) |
| $\kappa = 1$ | Pearson V Type | and wherein a type of distribution is determined using a value of $\nu$ given by the following expression (I):

$$\kappa = \frac{\beta_1(\beta_2+3)^2}{4(2\beta_2 - 3\beta_1 - 6)(4\beta_2 - 3\beta_1)} \quad (I)$$

wherein $\beta_1$ is square of skewness, $\beta_2$ is kurtosis, and $\nu$ in the expression (I) and the table (ss) differs from the parameters $\nu = (\nu_1, \ldots, \nu_m)$.

10. The method according to claim 9, wherein random numbers Z are generated by employing at least one generating methods shown in the following tables (tt) and (uu) in response to the types determined:

TABLE (tt)

| Type | Pearson VI | Pearson I | Pearson II |
|---|---|---|---|
| Generator | X~Gamma (m)<br>Y~Gamma ($\beta$) | X~Gamma (p)<br>X~Gamma (q) | X~Gamma (p)<br>Y~Gamma (p) |
| Random Numbers | (Skewness > 0)<br>$Z = \alpha\frac{(X+Y)}{X} - \alpha + a$<br>(Skewness < 0)<br>$Z = \alpha\frac{(X+Y)}{X} + \alpha + a$ | $Z = b\frac{X}{(X+Y)} + a$ | $Z = b\frac{X}{(X+Y)} + a$ |
| Transformation Formula | $r = \frac{6(\text{Kurtosis} - (\text{Skewness})^2 - 1)}{6 + 3\times(\text{Skewness})^2 - 2\times\text{Kurtosis}} \ (<0)$<br><br>$r_1 = \frac{1}{2}(r-2) + \frac{1}{2}r(r+2)\sqrt{\frac{(\text{Skewness})^2}{(\text{Skewness})^2(r+2)^2 + 16(r+1)}}$<br><br>$r_2 = \frac{1}{2}(r-2) - \frac{1}{2}r(r+2)\sqrt{\frac{(\text{Skewness})^2}{(\text{Skewness})^2(r+2)^2 + 16(r+1)}}$<br><br>$\beta = \text{Max}[r_1, r_2] + 1$<br>$m = -\text{Min}[r_1, r_2] - \beta$<br><br>$\alpha = \sqrt{\frac{\text{Var}\times(m-1)^2(m-2)}{(m+\beta-1)\beta}}$<br><br>$a = \text{Mean} - \frac{\alpha\beta}{m-1}$ (Skewness > 0)<br>$\text{Mean} + \frac{\alpha\beta}{m-1}$ (Skewness < 0) | $r = \frac{6(\text{Kurtosis} - (\text{Skewness})^2 - 1)}{6 + 3\times(\text{Skewness})^2 - 2\times\text{Kurtosis}} \ (<0)$<br><br>$r_3 = \frac{1}{2}r + \frac{1}{2}r(r+2)\sqrt{\frac{(\text{Skewness})^2}{(\text{Skewness})^2(r+2)^2 + 16(r+1)}}$<br><br>$r_4 = \frac{1}{2}r - \frac{1}{2}r(r+2)\sqrt{\frac{(\text{Skewness})^2}{(\text{Skewness})^2(r+2)^2 + 16(r+1)}}$<br><br>$q = \text{Max}[r_3, r_4]$ (Skewness > 0)<br>$\text{Min}[r_3, r_4]$ (Skewness < 0)<br><br>$p = \text{Max}[r_3, r_4]$ (Skewness > 0)<br>$\text{Min}[r_3, r_4]$ (Skewness < 0)<br><br>$b = (p+q)\sqrt{\frac{\text{Var}\times(p+q+1)}{pq}}$<br><br>$a = \text{Mean} - \frac{bp}{p+q}$ | $p = \frac{3 - 3\times\text{Kurtosis}}{2\times\text{Kurtosis} - 6}$<br><br>$b = \sqrt{4(2p+1)\text{Var}}$<br><br><br><br>$a = \text{Mean} - \frac{b}{2}$ |

TABLE (uu)

| Type | Gaussian | Pearson VII | Pearson III | Pearson V |
|---|---|---|---|---|
| Generator | $X \sim \text{Normal}(0, 1)$ | $X \sim \text{Normal}(0, 1)$ $Y \sim \text{Gamma}\left(b - \frac{1}{2}\right)$ | $X \sim \text{Gamma}(\alpha)$ | $X \sim \text{Gamma}(\nu)$ |
| Random Numbers | $Z = \sigma X + \mu$ | $Z = \tau \frac{X}{\sqrt{2Y}} + \mu$ | (Skewness > 0) $Z = \beta X + \gamma$ (Skewness < 0) $Z = -\beta X + \gamma$ | (Skewness > 0) $Z = \frac{\lambda}{X} + a$ (Skewness < 0) $Z = -\frac{\lambda}{X} + a$ |
| Transformation Formula | $\mu = \text{Mean}$ $\sigma = \sqrt{\text{Var}}$ | $b = \frac{5 \times \text{Kurtosis} - 9}{2 \times \text{Kurtosis} - 6}$ $\tau = \sqrt{(2b - 3) \times \text{Var}}$ $\mu = \text{Mean}$ | $\alpha = \frac{4}{(\text{Skewness})^2}$ $\beta = \sqrt{\frac{\text{Var}}{\alpha}}$ $\gamma = \text{Mean} - \alpha\beta$ (Skewness > 0) $\text{Mean} + \alpha\beta$ (Skewness < 0) | $\nu = \frac{16 + 6 \times (\text{Skewness})^2 + 8 \times \sqrt{4 + (\text{Skewness})^2}}{2 \times (\text{Skewness})^2}$ $\lambda = (\nu - 1)\sqrt{\text{Var} \times (\nu - 2)}$ $a = \text{Mean} - \frac{\lambda}{\nu - 1}$ (Skewness > 0) $\text{Mean} + \frac{\lambda}{\nu - 1}$ (Skewness < 0) |

11. The method according to claim 1, wherein random numbers according to Pearson type IV distribution are generated by calculating, using a computer, a normalizing constant based on an analytical solution of the normalizing constant in the Pearson type IV distribution or the expansion represented by the following expression (m):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (m)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2}$$

and generating, using the computer, the random numbers by a rejection method.

12. The method according to claim 1, further comprising:

calculating an expected amount of loss by fitting n-dimensional multivariate non-normal distributions for n-dimensional profit and loss distributions of n types of assets constituting a portfolio to calculate the expected amount of loss in a simulation.

13. The method according to claim 1, further comprising:

designing and pricing weather-insurance derivatives in accordance with the fitting and generating.

14. The method according to claim 1, further comprising:

allocating assets in accordance with the fitting and generating.

15. The method according to claim 1, further comprising:

assessing human ability in accordance with the fitting and generating.

16. The method according to claim 1, wherein the method is performed using a computer program executable using a computer.

17. The method according to claim 16, wherein the computer program is recorded on a recording medium.

18. The method of generating random numbers in accordance with claim 1, wherein a number of the random numbers generated using a computer is more than 100,000.

19. A method of generating random numbers in accordance with a Pearson type IV distribution, comprising:

calculating, using a computer, a normalizing constant based on an analytical solution of the normalizing constant in the Pearson type IV distribution or the expansion represented by the following expression (m):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (m)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

-continued $$\approx \frac{1}{B\left(b - \frac{1}{2}, \frac{1}{2}\right)} \times \prod_{k=0}^{n} \frac{1}{1 + \left(\frac{b\delta}{b+k}\right)^2}$$

generating, using the computer, the random numbers including pseudo-random numbers, by a rejection method and at least one of an additive generator method, an M-sequence method, a generalized feedback shift-register method, and a Mersenne Twister method, and excluding a congruential method, quasi-random numbers, low discrepancy sequences, and physical random numbers.

20. A method of generating random numbers in accordance with multivariate non-normal distributions, comprising:

acquiring, using a computer, data of empirical distributions $\{X_1', \ldots, x_N'\}$ with respect to data vector $X_1'$ consisting of n data $x_{1,i}' \sim x_{n,i}'$;

standardizing the data $\{X_1', \ldots, X_N'\}$ to obtain $\{X_1, \ldots, X_N\}$ by using the computer;

calculating a variance covariance matrix $\Sigma$ based on the data of standardized $\{X_1, \ldots, X_N\}$ by using the computer;

calculating third order moment $m_{ijk}$ ($1 \geq i \geq j \geq k \geq n$) based on the standardized data $\{X_1, \ldots, X_N\}$ by using the computer;

calculating fourth order moment $m_{ijkl}$ ($1 \geq i \geq j \geq k \geq l \geq n$) based on the standardized data $\{X_1, \ldots, X_N\}$ by using the computer;

calculating a matrix T from the variance covariance matrix $\Sigma$ by using the computer;

introducing a loss function, wherein a difference between third order moment $m_{ijk}$ ($1 \geq i \geq j \geq k \geq n$) as well as fourth order moment $m_{ijkl}$ ($1 \geq i \geq j \geq k \geq l \geq n$) and $f_{ijk}$ (T, $\zeta$, $\gamma$, $\nu$, $\beta$) as well as $f_{ijkl}$ (T, $\zeta$, $\gamma$, $\nu$, $\beta$) (where $\zeta = (\zeta_1, \ldots, \zeta_m)$, $\nu = (\nu_1, \ldots, \nu_m)$) is made to be a loss by using the computer with assuming that distributions according to the data vector have non-normal distributions which satisfy $X = \nu T \xi$ (where $\xi$ is random vector $(\xi_1, \ldots, \xi_m)'$ consisting of m (wherein m>n) random variables $\xi_1 \sim \xi_m$, wherein independent random variables $\xi_1, \ldots, \xi_m$ satisfy $E(\xi_j)=0$, $E(\xi_j^2)=1$, $E(\xi_j^3)=\zeta_j$, $E(\xi_j^4)=\nu_j$ ($1 \geq j \geq m$) with respect to parameters $\zeta_j$ and $\nu_j$, and wherein a random variable $\nu$ independent from $\xi_j$ satisfies $E(\nu)=0$, $E(\nu^2)=1$, $E(\nu^3)=\gamma$, and $E(\nu^4)=\beta$ with respect to parameters $\gamma$ and $\beta$) to determine the parameters T, $(\zeta_1, \ldots, \zeta_m)$, $\gamma$, $(\nu_1, \ldots, \nu_m)$, and $\beta$ so as to minimize a risk function assessed as a whole under the condition of $TT'=\Sigma$ (T is a transposed matrix of T);

determining a type of Pearson distribution to which the random vector $(\xi_1, \ldots, \xi_m)'$ and the random variable $\nu$ belong based on the determined parameters $(\zeta_1, \ldots, \zeta_m)$, $\gamma$, $(\nu_1, \ldots, \nu_m)$ and $\beta$ using the computer in accordance with the following expression (1) and table (ss), where $\beta_1$ is square of skewness and $\beta_2$ is kurtosis:

$$\kappa = \frac{\beta_1(\beta_2 + 3)^2}{4(2\beta_2 - 3\beta_1 - 6)(4\beta_2 - 3\beta_1)} \quad (1)$$

TABLE (ss)

| | |
|---|---|
| $0 < \kappa < 1$ | Pearson IV Type |
| $\kappa > 1$ | Pearson VI Type(Beta II Type) |
| $\kappa < 0$ | Pearson I Type(Beta I Type) |
| $\kappa = 0, \beta_1 = 0, \beta_2 < 3$ | Pearson II Type(Beta I Type) |
| $\kappa = 0, \beta_1 = 0, \beta_2 = 3$ | Normal |
| $\kappa = 0, \beta_1 = 0, \beta_2 > 3$ | Pearson VII Type |
| $\kappa = \pm\infty, 2\beta_2 - 3\beta_1 - 6 = 0$ | Pearson III Type(Gamma) |
| $\kappa = 1$ | Pearson V Type | generating, using a computer, random numbers including pseudo-random numbers by at least one of an additive generator method, an M-sequence method, a generalized feedback shift-resister method, and a Mersenne Twister method, and excluding a congruential method, quasi-random numbers, low discrepancy sequences, and physical random numbers, by calculating random numbers with respect to the random vectors $(\xi_1, \ldots, \xi_m)'$ and the random variable $\nu$ based on the random numbers which have been already generated;

calculating the standardized random numbers of X based on $X = \nu T \xi$ by using the computer;

transforming the standardized random numbers of X into the random numbers before standardization by using the computer, wherein $\beta_1$ is square of skewness, $\beta_2$ is kurtosis, and $\nu$ differs from the parameter $\nu = (\nu_1, \ldots, \nu_m)$ in the expression (1) and table (ss).

21. The method according to claim 20, wherein the loss function (L) and the risk function (R) are given by either pair of expressions (q) and (r), (s) and (t), or (u) and (v):

$$L(x, y) = (x - y)^2 \quad (q)$$

$$R = \sum_{i \leq j \leq k} w_{ijk}(f_{ijk}(T, \zeta, \gamma, \kappa, \beta) - m_{ijk})^2 + \quad (r)$$
$$\sum_{i \leq j \leq k \leq l} w_{ijkl}(f_{ijkl}(T, \zeta, \gamma, \kappa, \beta) - m_{ijkl})^2$$

$$L(x, y) = |x - y|, \quad (s)$$

$$R = \sum_{i \leq j \leq k \leq l} w_{ijkl}|f_{ijk}(T, \zeta, \gamma, \kappa, \beta) - m_{ijk}| + \quad (t)$$
$$\sum_{i \leq j \leq k \leq l} w_{ijkl}|f_{ijkl}(T, \zeta, \gamma, \kappa, \beta) - m_{ijkl}|$$

$$L(x, y) = |x - y|^p (p > 0), \text{ and} \quad (u)$$

$$R = \sum_{i \leq j \leq k} w_{ijk}|f_{ijk}(T, \zeta, \gamma, \kappa, \beta) - m_{ijk}|^p + \quad (v)$$
$$\sum_{i \leq j \leq k \leq l} w_{ijkl}|f_{ijkl}(T, \zeta, \gamma, \kappa, \beta) - m_{ijkl}|^p.$$

22. The method according to claim 20, wherein random numbers Z are generated in response to the type determined by employing at least one generating method shown in the following tables (xx) and (yy):

TABLE (xx)

| Type | Pearson VI | Pearson I | Pearson II |
|---|---|---|---|
| Generator | $X \sim$ Gamma $(m)$<br>$Y \sim$ Gamma $(\beta)$ | $X \sim$ Gamma $(p)$<br>$X \sim$ Gamma $(q)$ | $X \sim$ Gamma $(p)$<br>$Y \sim$ Gamma $(p)$ |
| Random Numbers | (Skewness > 0)<br>$Z = \alpha \dfrac{(X+Y)}{X} - \alpha + a$<br>(Skewness < 0)<br>$Z = \alpha \dfrac{(X+Y)}{X} + \alpha + a$ | $Z = b \dfrac{X}{(X+Y)} + a$ | $Z = b \dfrac{X}{(X+Y)} + a$ |
| Transformation Formula | $r = \dfrac{6(\text{Kurtosis} - (\text{Skewness})^2 - 1)}{6 + 3 \times (\text{Skewness})^2 - 2 \times \text{Kurtosis}} \ (< 0)$<br><br>$r_1 = \dfrac{1}{2}(r-2) + \dfrac{1}{2}r(r+2)\sqrt{\dfrac{(\text{Skewness})^2}{(\text{Skewness})^2(r+2)^2 + 16(r+1)}}$<br><br>$r_2 = \dfrac{1}{2}(r-2) - \dfrac{1}{2}r(r+2)\sqrt{\dfrac{(\text{Skewness})^2}{(\text{Skewness})^2(r+2)^2 + 16(r+1)}}$<br><br>$\beta = \text{Max}[r_1, r_2] + 1$<br>$m = -\text{Min}[r_1, r_2] - \beta$<br><br>$\alpha = \sqrt{\dfrac{\text{Var} \times (m-1)^2 (m-2)}{(m + \beta - 1)\beta}}$<br><br>$a = \text{Mean} - \dfrac{\alpha\beta}{m-1}$ (Skewness > 0)<br>$\text{Mean} + \dfrac{\alpha\beta}{m-1}$ (Skewness < 0) | $r = \dfrac{6(\text{Kurtosis} - (\text{Skewness})^2 - 1)}{6 + 3 \times (\text{Skewness})^2 - 2 \times \text{Kurtosis}} \ (< 0)$<br><br>$r_3 = \dfrac{1}{2}r + \dfrac{1}{2}r(r+2)\sqrt{\dfrac{(\text{Skewness})^2}{(\text{Skewness})^2(r+2)^2 + 16(r+1)}}$<br><br>$r_4 = \dfrac{1}{2}r - \dfrac{1}{2}r(r+2)\sqrt{\dfrac{(\text{Skewness})^2}{(\text{Skewness})^2(r+2)^2 + 16(r+1)}}$<br><br>$q = \text{Max}[r_3, r_4]$ (Skewness > 0)<br>$\text{Min}[r_3, r_4]$ (Skewness < 0)<br><br>$p = \text{Max}[r_3, r_4]$ (Skewness > 0)<br>$\text{Min}[r_3, r_4]$ (Skewness < 0)<br><br>$b = (p+q)\sqrt{\dfrac{\text{Var} \times (p+q+1)}{pq}}$<br><br>$a = \text{Mean} - \dfrac{bp}{p+q}$ | $p = \dfrac{3 - 3 \times \text{Kurtosis}}{2 \times \text{Kurtosis} - 6}$<br><br>$b = \sqrt{4(2p+1)\text{Var}}$<br><br>$a = \text{Mean} - \dfrac{b}{2}$ |

TABLE (yy)

| Type | Gaussian | Pearson VII | Pearson III | Pearson V |
|---|---|---|---|---|
| Generator | $X \sim$ Normal $(0,1)$ | $X \sim$ Normal $(0, 1)$<br>$Y \sim$ Gamma $\left(b - \dfrac{1}{2}\right)$ | $X \sim$ Gamma $(\alpha)$ | $X \sim$ Gamma $(v)$ |
| Random Numbers | $Z = \sigma X + \mu$ | $Z = \tau \dfrac{X}{\sqrt{2Y}} + \mu$ | (Skewness > 0)<br>$Z = \beta X + \gamma$<br>(Skewness < 0)<br>$Z = -\beta X + \gamma$ | (Skewness > 0)<br>$Z = \dfrac{\lambda}{X} + a$<br>(Skewness < 0)<br>$Z = -\dfrac{\lambda}{X} + a$ |
| Transformation Formula | $\mu = \text{Mean}$<br>$\sigma = \sqrt{\text{Var}}$ | $b = \dfrac{5 \times \text{Kurtosis} - 9}{2 \times \text{Kurtosis} - 6}$<br>$\tau = \sqrt{(2b-3) \times \text{Var}}$<br>$\mu = \text{Mean}$ | $\alpha = \dfrac{4}{(\text{Skewness})^2}$<br><br>$\beta = \sqrt{\dfrac{\text{Var}}{\alpha}}$<br><br>$\gamma = \text{Mean} - \alpha\beta$ (Skewness > 0)<br>$\text{Mean} + \alpha\beta$ (Skewness < 0) | $v = \dfrac{16 + 6 \times (\text{Skewness})^2 + 8 \times \sqrt{4 + (\text{Skewness})^2}}{2 \times (\text{Skewness})^2}$<br><br>$\lambda = (v-1)\sqrt{\text{Var} \times (v-2)}$<br><br>$a = \text{Mean} - \dfrac{\lambda}{v-1}$ (Skewness > 0)<br>$\text{Mean} + \dfrac{\lambda}{v-1}$ (Skewness < 0) |

23. The method according to claim 20,
wherein random numbers according to a Pearson type IV distribution are generated, using a computer, by calculating a normalizing constant based on an analytical solution of the normalizing constant in the Pearson type IV distribution or the expansion represented by the following expression (m):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (m)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2}$$

and generating, using the computer, random numbers by a rejection method.

24. A method of generating random numbers in accordance with multivariate non-normal distributions, comprising:

acquiring, using a computer, data of empirical distributions $\{X_1', \ldots, X_N'\}$ with respect to data vector $X_i'$ consisting of n data $x_{1,i}' \sim x_{n,i}'$;

standardizing the data $\{X_1', \ldots, X_N'\}$ to obtain $\{X_1, \ldots, X_N\}$ by using the computer;

calculating a variance covariance matrix $\Sigma$ based on the standardized data $\{X_1, \ldots, X_N\}$ by using the computer;

calculating third order moment $m_{ijk}$ ($1 \leq i \leq j \leq k \leq n$) based on the standardized data $\{X_1, \ldots, X_N\}$ by using the computer;

calculating fourth order moment $m_{ijkl}$ ($1 \leq i \leq j \leq k \leq l \leq n$) based on the standardized data $\{X_1, \ldots, X_N\}$ by using the computer;

calculating a matrix T satisfying $T = \Sigma^{1/2}$ (square root of the matrix) from the variance covariance matrix $\Sigma$ by using the computer;

introducing a loss function, wherein a difference between third order moment $m_{ijk}$ ($1 \leq i \leq j \leq k \leq n$) as well as fourth order moment $m_{ijkl}$ ($1 \leq i \leq j \leq k \leq l \leq n$) and $f_{ijk}$ ($\zeta$, $\gamma$, $\nu$, $\beta$) as well as $f_{ijkl}$ ($\zeta$, $\gamma$, $\nu$, $\beta$) (where $\zeta = (\zeta_1, \ldots 1992, \zeta_m)$, $\nu = (\nu_1, \ldots, \nu_m)$) is made to be a loss by using the computer with assuming that distributions according to the data vector have non-normal distributions which satisfy $X = \nu T \xi$ (where $\xi$ is random vector $(\xi_1, \ldots, \xi_m)'$ consisting of m (where m=n) random variables $\xi_1 \sim \xi_m$, wherein independent random variables $\xi_1, \ldots, \xi_m$ satisfy $E(\xi_j) = 0$, $E(\xi_j^2) = 1$, $E(\xi_j^3) = \zeta_j$, $E(\xi_j^4) = \nu_j$ ($1 \leq j \leq m$) with respect to parameters $\zeta_j$ and $\nu_j$, and wherein a random variable $\nu$ independent from $\xi_j$ satisfies $E(\nu) = 0$, $E(\nu^2) = 1$, $E(\nu^3) = \gamma$, and $E(\nu^4) = \beta$ with respect to parameters $\gamma$ and $\beta$) to determine the parameters ($\zeta_1, \ldots, \zeta_m$), $\gamma$, ($\nu_1, \ldots, \nu_m$), and $\beta$ so as to minimize a risk function assessed as a whole;

determining a type of Pearson distribution to which the random vector $(\xi_1, \ldots, \xi_m)'$ and the random variable $\nu$ belong based on the determined parameters ($\zeta_1, \ldots, \zeta_m$), $\gamma$, ($\nu_1, \ldots, \nu_m$) and $\beta$ using the computer in accordance with the following expression (1) and table (ss), where $\beta_1$ is square of skewness and $\beta_2$ is kurtosis:

$$\kappa = \frac{\beta_1(\beta_2 + 3)^2}{4(2\beta_2 - 3\beta_1 - 6)(4\beta_2 - 3\beta_1)} \quad (1)$$

TABLE (ss)

| | |
|---|---|
| $0 < \kappa < 1$ | Pearson IV Type |
| $\kappa > 1$ | Pearson VI Type(Beta II Type) |
| $\kappa < 0$ | Pearson I Type(Beta I Type) |
| $\kappa = 0, \beta_1 = 0, \beta_2 < 3$ | Pearson II Type(Beta I Type) |
| $\kappa = 0, \beta_1 = 0, \beta_2 = 3$ | Normal |
| $\kappa = 0, \beta_1 = 0, \beta_2 > 3$ | Pearson VII Type |
| $\kappa = \pm\infty, 2\beta_2 - 3\beta_1 - 6 = 0$ | Pearson III Type(Gamma) |
| $\kappa = 1$ | Pearson V Type | generating, using a computer, random numbers including pseudo-random numbers by at least one of an additive generator method, an M-sequence method, a generalized feedback shift-register method, and a Mersenne Twister method, and excluding a congruential method, a quasi-random numbers method, low discrepancy sequences, and physical random numbers, to calculate random numbers with respect to the random vector $(\xi_1, \ldots, \xi_m)'$ and the random variable $\nu$ based on the random numbers which have been already generated;

calculating the standardized random numbers of X based on $X = \nu T \xi$ by using the computer;

transforming the standardized random numbers of X into the random numbers before standardization by using the computer, where $\beta_1$ is square of skewness, $\beta_2$ is kurtosis, and $\nu$ differs from the parameter $\nu = (\nu_1, \ldots, \nu_m)$ in the expression (1) and table (ss).

25. A method of estimating parameters of multivariate non-normal distributions, comprising:

calculating, using a computer, the multivariate non-normal distributions given by a random vector $X = (x_1, \ldots, x_n)'$ obtained as a product of a random variable $\nu$ in accordance with a predetermined probability distribution, a non-random n×m (m≥n) matrix T of a rank n, and random vector $\xi = (\xi_1, \ldots, \xi_m)'$ in accordance with a predetermined probability distribution as indicated by the following expression (x):

$$X = \nu T \xi \quad (x)$$

and estimating the parameters by the maximum likelihood method.

26. The method according to claim 25, wherein:

the estimating the parameters by the maximum likelihood method includes;

dividing, using a computer, n-dimensional space;

dividing the number of random numbers belonging to respective divisions to which $X_i$ belongs with respect to empirical distribution data $\{X_1, \ldots, X_N\}$ by the total number of the random numbers by using the computer to determine a probability of the questioned division given by the following expression (y):

$$P_i(\theta) = \frac{\text{the number of points belonging to division of } Xi}{\text{the number of all the points}} \quad (y)$$

dividing the probability of division by an N-dimensional volume of the questioned division to determine a likelihood $f_i(\theta)$ of the division given by the following expression (z):

$$f_i(\theta) = \frac{P_i(\theta)}{(\Delta h)^n} \quad \text{(z)}$$

to which the $X_i$ belongs by using the computer; and
estimating the parameters $\theta$ by which a product $\Pi_{i=1}^{N} fi(\theta)$ of the likelihood or a sum of logarithmic likelihood $\Sigma_{i=1}^{N} \log fi(\theta)$ comes to be the maximum by using the computer.

27. The method according to claim 25,
wherein random numbers according to the Pearson distribution system are employed for the random variables $\xi_1, \ldots, \xi_m$ and $\nu$.

28. The method according to claim 27,
wherein at least two types of Pearson distribution are employed for random variables $\xi_1, \ldots, \xi_m$ and $\nu$.

29. The method according to claim 25,
wherein random numbers according to a Pearson type IV distribution are generated, using a computer, by calculating a normalizing constant based on an analytical solution of the normalizing constant in the Pearson type IV distribution or the expansion represented by the following expression (m):

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad \text{(m)}$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2}$$

and generating, using the computer, the random numbers by a rejection method.

30. The method according to claim 25, further comprising:
fitting, using a computer, n-dimensional multivariate non-normal distributions for n-dimensional empirical distributions based on the Yuan and Bentler method I by employing the following formulae (a) and (b):

$$E(\text{vech}(XX')X') = \gamma D_n^+ (T \otimes T)\left(\sum_{j=1}^{m} \zeta_j E_{ii} \otimes e_i\right) T' \quad \text{(a)}$$

$$\text{var}(\text{vech}(XX')) = 2\beta D_n^+ (\Sigma \otimes \Sigma) D_n^{+\prime} + \quad \text{(b)}$$
$$(\beta - 1)\text{vech}(\Sigma)\text{vech}'(\Sigma) +$$
$$\beta \sum_{j=1}^{m} (\kappa_j - 3)\text{vech}(t_j t_j')\text{vech}'(t_j t_j')$$

wherein the parameters $\theta$ are estimated with respect to neighborhood of the parameters determined in the fitting,
wherein $E(\cdot)$ is an expectation, vech $(\cdot)$ is a vector consists of matrix elements not duplicated in symmetrical matrix, $D_n$ is an n-order duplication matrix, $D_n^+$ is the Moore-Penrose generalized inverse matrix of $D_n$, $\otimes$ is the Kronecker product, and $E_{ii}$ is $e_i e_i'$ when $e_i$ is the ith column unit;

wherein the Yuan and Bentler method I uses;
independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=\nu_j$ ($1 \leq j \leq m$) with respect to parameters $\zeta_j$ and $\nu_j$;

a random variable $\nu$ independent from $\xi_j$ that satisfies $E(\nu) = 0$, $E(\nu^2)=1$, $E(\nu^3)=\gamma$, and $E(\nu^4)=\beta$ with respect to parameters $\gamma$ and $\beta$;

a non-random n×m ($m \leq n$) matrix $T=(t_{ij})$ of n rank that satisfies $TT'=\Sigma$ with respect to a matrix $\Sigma=(\sigma_{ij})$ where the matrix T' is a transposed matrix of T and where a random vector $X=(x_1, \ldots, x_n)'$ given by the following expression (c) satisfies Cov $(X)=\Sigma$:

$$X = \nu T \xi \quad \text{(c)}$$

where Cov $(\cdot)$ is a variance covariance matrix of a vector, and $\xi=(\xi_1, \ldots, \xi_m)'$.

31. The method according to claim 25,
wherein the parameter $\theta$ represents at least one of the parameters T, $\zeta=(\zeta_1, \ldots, \zeta_m)$, $\gamma$, $\nu=(\nu_1, \ldots, \nu_m)$, and $\beta$.

32. The method according to claim 25,
wherein random numbers including pseudo-random numbers are generated, using a computer, by at least one of an additive generator method, an M-sequence method, a generalized feedback shift-register method, and a Mersenne Twister method, and excluding a congruential method, quasi-random numbers, low discrepancy sequences, and physical random numbers.

33. A method of estimating parameters of multivariate non-normal distributions, comprising:
fitting, using a computer, n-dimensional multivariate non-normal distribution for n-dimensional empirical distributions based on the Yuan and Bentler method I by employing the following formulae (a) and (b):

$$E(\text{vech}(XX')X') = \gamma D_n^+ (T \otimes T)\left(\sum_{j=1}^{m} \zeta_j E_{ii} \otimes e_i\right) T' \quad \text{(a)}$$

$$\text{var}(\text{vech}(XX')) = 2\beta D_n^+ (\Sigma \otimes \Sigma) D_n^{+\prime} + \quad \text{(b)}$$
$$(\beta - 1)\text{vech}(\Sigma)\text{vech}'(\Sigma) +$$
$$\beta \sum_{j=1}^{m} (\kappa_j - 3)\text{vech}(t_j t_j')\text{vech}'(t_j t_j')$$

calculating, using a computer, random numbers with respect to the following X assuming that the n-dimensional empirical distributions have non-normal distributions which satisfy $X=\nu T \xi$, where $\xi$ is random vector $(\xi_1, \ldots, \xi_m)'$ consisting of m (where $m \leq n$) random variables $\xi_1 \sim \xi_m$, wherein independent random variables $\xi_1, \ldots, \xi_m$ satisfy E $(\xi_j)=0$, E $(\xi_j^2)=0$, E $(\xi_j^2)=1$, E $(\xi_j^3)=\zeta_j$, E $(\xi_j^4)=\nu_j$ ($1 \leq j \leq m$) with respect to parameters $\zeta_j$ and $\nu_j$, and wherein a random variable $\nu$ independent from $\xi_j$ satisfies E $(\nu)=0$, E $(\nu^2)=1$, E $(\nu^3)=\gamma$, and E $(\nu^4)=\beta$ with respect to parameters $\gamma$ and $\beta$);

dividing spaces concerning respective random variables $x_1$ and $x_n$ with a predetermined spacing $\Delta h$ by using the computer to divider the n-dimensional spaces into hypercubes of $(\Delta h)^n$;

dividing, using the computer, the number of random numbers existing in sections $(\Delta h)^n$ to which respective data vectors belong by the total number of the random numbers to calculate a probability $P_i(\theta)$ of the questioned sections $(\Delta h)^n$;

dividing, using the computer, the probability $P_i(\theta)$ by n-dimensional volume $(\Delta h)^n$ to calculate a likelihood $f_i(\theta)$ of the sections $(\Delta h)^n$ to which the data vectors belong; and estimating a parameter $\theta$ by which a product $\Pi_{i=1}^{N} fi(\theta)$ of the likelihood or a sum of logarithmic likelihood $\Sigma_{i=1}^{N} \log fi(\theta)$ comes to be the maximum by using the computer, where E (•) is an expectation, vech (•) is a vector consists of matrix elements not duplicated in symmetrical matrix, $D_n$ is an n-order duplication matrix, $D_n^+$ is the Moore-Penrose generalized inverse matrix of $D_n$, ⊗ is the Kronecker product, and $E_{ii}$ is $e_i e_i'$ when $e_i$ is the ith column unit;

wherein the Yuan and Bentler method I uses;

independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=v_j (1 \leq j \leq m)$ with respect to parameters $\zeta_j$ and $v_j$;

a random variable $v$ independent from $\xi_j$ that satisfies E $(v)=0$, E $(v^2)=1$, E $(v^3)=\gamma$, and E $(v^4)=\beta$ with respect to parameters $\gamma$ and $\beta$;

a non-random n×m (m≦n) matrix $T=(t_{ij})$ of n rank that satisfies $TT'=\Sigma$ with respect to a matrix $\Sigma=(\sigma_{ij})$ where the matrix T' is a transposed matrix of T and where random vector $X=(x_1, \ldots, x_n)'$ given by the following expression (c) satisfies Cov $(X)=\Sigma$:

$$X = vT\xi \quad (c)$$

where Cov (•) is a variance covariance matrix of a vector, and $\xi = (\xi_1, \ldots, \xi_m)'$.

34. The method according to claim 33, wherein random numbers according to the Pearson distribution system are employed for the random variables $\xi_1, \ldots, \xi_m$ and $v$.

35. The method according to claim 34, wherein at least two types of Pearson distribution are employed for random variables $\xi_1, \ldots, \xi_m$ and $v$.

36. The method according to claim 33, wherein random numbers according to a Pearson type IV distribution are generated, using a computer, by calculating a normalizing constant based on an analytical solution of the normalizing constant in the Pearson type IV distribution or the expansion represented by an expression (m);

$$C = \frac{1}{B\left(b - \frac{1}{2}, \frac{1}{2}\right)} \times \frac{\Gamma(b + b\delta i)\Gamma(b - b\delta i)}{\{\Gamma(b)\}^2} \quad (m)$$

$$= \frac{1}{B\left(b - \frac{1}{2}, \frac{1}{2}\right)} \times \prod_{k=0}^{\infty} \frac{1}{1 + \left(\frac{b\delta}{b+k}\right)^2}$$

$$\approx \frac{1}{B\left(b - \frac{1}{2}, \frac{1}{2}\right)} \times \prod_{k=0}^{n} \frac{1}{1 + \left(\frac{b\delta}{b+k}\right)^2}$$

and generating, using the computer, the random numbers by a rejection method.

37. The method according to claim 33, wherein random numbers including pseudo-random numbers are generated, using a computer, by at least one of an additive generators method, an M-sequence method, a generalized feedback shift-register method, and a Mersenne Twister method, and excluding a congruential method, quasi-random numbers, low discrepancy sequences, and physical random numbers.

38. A method for generating random numbers on a computer in accordance with multivariate non-normal distributions based on the Yuan and Bentler method I, comprising:

fitting, using a computer, the n-dimensional multivariate non-normal distributions for n-dimensional empirical distributions;

generating, using the computer, random numbers; and calculating an expected amount of loss by applying the n-dimensional multivariate non-normal distributions to n-dimensional profit and loss distributions of n types of assets constituting a portfolio to calculate the expected amount of loss in a simulation:

wherein the fitting employs the following formulae (a) and (b) with respect to an application as to third and fourth order moments of the empirical distributions:

$$E(vech(XX')X') = \gamma D_n^+ (T \otimes T) \left( \sum_{j=1}^{m} \zeta_j E_{ii} \otimes e_i \right) T' \quad (a)$$

$$\text{var}(vech(XX')) = 2\beta D_n^+ (\Sigma \otimes \Sigma) D_n^{+'} + \quad (b)$$
$$(\beta - 1) vech(\Sigma) vech'(\Sigma) + \beta \sum_{j=1}^{m} (\kappa_j - 3) vech(t_j t_j') vech'(t_j t_j')$$

where E (•) is an expectation, vech (•) is a vector consists of matrix elements not duplicated in symmetrical matrix, $D_n$ is an n-order duplication matrix, $D_n^+$ is the Moore-Penrose generalized inverse matrix of $D_n$, ⊗ is the Kronecker product, and $E_{ii}$ is $e_i e_i'$ when $e_i$ is the ith column unit;

wherein the Yuan and Bentler method I uses:

independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=v_j (1 \leq j \leq m)$ with respect to parameters $\zeta_j$ and $v_j$;

a random variable $v$ independent from $\xi_j$ that satisfies E $(v)=0$, E $(v^2)=1$, E $(v^3)=\gamma$, and E $(v^4)=\beta$ with respect to parameters $\gamma$ and $\beta$;

a non-random n×m (m≧n) matrix $T=(t_{ij})$ of n rank that satisfies $TT'=\Sigma$ with respect to a matrix $\Sigma=(\sigma_{ij})$ where the matrix T' is a transposed matrix of T and where random vector $X=(x_1, \ldots, x_n)'$ given by the following expression (c) satisfies Cov $(X)=\Sigma$:

$$X = vT\xi \quad (c)$$

where Cov (•) is a variance covariance matrix of a vector, and $\xi = (\xi_1, \ldots, \xi_m)'$.

39. A method for generating random numbers on a computer in accordance with multivariate non-normal distributions based on the Yuan and Bentler method I, comprising:

fitting, using a computer, n-dimensional multivariate non-normal distributions for n-dimensional empirical distributions;

generating, using a computer, random numbers; and simulating financial instruments by simulating the characteristics of the financial instruments based on random numbers in accordance with the multivariate non-normal distributions, wherein the fitting employs the following formulae (a) and (b) with respect to an application as to third and fourth order moments of the empirical distributions:

$$E(vech(XX')X') = \gamma D_n^+(T \otimes T)\left(\sum_{j=1}^m \zeta_j E_{ii} \otimes e_i\right)T' \quad (a)$$

$$\mathrm{var}(vech(XX')) = 2\beta D_n^+(\Sigma \otimes \Sigma)D_n^{+'} + \quad (b)$$
$$(\beta-1)vech(\Sigma)vech'(\Sigma) + \beta\sum_{j=1}^m (\kappa_j - 3)vech(t_j t_j')vech'(t_j t_j')$$

where E (•) is an expectation, vech (•) is a vector consists of matrix elements not duplicated in symmetrical matrix, $D_n$ is an n-order duplication matrix, $D_n^+$ is the Moore-Penrose generalized inverse matrix of $D_n$, ⊗ is the Kronecker product, and $E_{ii}$ is $e_i e_i'$ when $e_i$ is the ith column unit;

wherein the Yuan and Bentler method I uses:
independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=\nu_j$ $(1 \leq j \leq m)$ with respect to parameters $\zeta_j$ and $\nu_j$;
a random variable ν independent from $\xi_j$ that satisfies E $(\nu)=0$, E $(\nu^2)=1$, E $(\nu^3)=\gamma$, and E $(\nu^4)=\beta$ with respect to parameters γ and β;
a non-random n×m (m≦n) matrix $T=(t_{ij})$ of n rank that satisfies TT'=Σ with respect to a matrix $\Sigma=(\sigma_{ij})$ where the matrix T' is a transposed matrix of T and whose a random vector $X=(x_1, \ldots, x_n)'$ given by the following expression (c) satisfies Cov (X)=

$$\Sigma: X=\nu T \xi \quad (c)$$

where Cov (•) is a variance covariance matrix of a vector, and $\xi=(\xi_1, \ldots, \xi_m)'$.

40. A method for generating random numbers on a computer in accordance with multivariate non-normal distributions based on the Yuan and Bentler method I, comprising
fitting, using a computer, n-dimensional multivariate non-normal distributions for n-dimensional empirical distributions;
generating, using a computer, random numbers; and
simulating ion implantation by simulating ion distributions according to ion implantation based on random numbers in accordance with the multivariate non-normal distributions
wherein the fitting employs the following formulae (a) and (b) with respect to an application as to third and fourth order moments of the empirical distributions:

$$E(vech(XX')X') = \gamma D_n^+(T \otimes T)\left(\sum_{j=1}^m \zeta_j E_{ii} \otimes e_i\right)T' \quad (a)$$

$$\mathrm{var}(vech(XX')) = 2\beta D_n^+(\Sigma \otimes \Sigma)D_n^{+'} + \quad (b)$$
$$(\beta-1)vech(\Sigma)vech'(\Sigma) + \beta\sum_{j=1}^m (\kappa_j - 3)vech(t_j t_j')vech'(t_j t_j')$$

where E (•) is an expectation, vech (•) is a vector consists of matrix elements not duplicated in symmetrical matrix, $D_n$ is an n-order duplication matrix, $D_n^+$ is the Moore-Penrose generalized inverse matrix of $D_n$, ⊗ is the Kronecker product, and $E_{ii}$ is $e_i e_i'$ when $e_i$ is the ith column unit;

wherein the Yuan and Bentler method I uses:
independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=\nu_j$ $(1 \leq j \leq m)$ with respect to parameters $\zeta_1$ and $\nu_j$;
a random variable ν independent from $\xi_j$ that satisfies E $(\nu)=0$, E $(\nu^2)=1$, E $(\nu^3)=\gamma$, and E $(\nu^4)=\beta$ with respect to parameters γ and β;
a non-random n×m (m≦n) matrix $T=(t_{ij})$ of n rank that satisfies TT'=Σ with respect to a matrix $\Sigma=(\sigma_{ij})$ where the matrix T' is a transposed matrix of T and where a random vector $X=(x_1, \ldots, x_n)'$ given by the following expression (c) satisfies Cov (X)=

$$\Sigma: X=\nu T \xi \quad (c)$$

where Cov (•) is a variance covariance matrix of a vector, and $\xi=(\xi_1, \ldots, \xi_m)'$.

41. The method according to claim 40,
wherein random numbers according to a Pearson type IV distribution are generated, using a computer, by calculating normalizing constant based on an analytical solution of the normalizing constant in the Pearson type IV distribution or the expression represented by the following expression (m);

$$C = \frac{1}{B\left(b-\frac{1}{2},\frac{1}{2}\right)} \times \frac{\Gamma(b+b\delta i)\Gamma(b-b\delta i)}{\{\Gamma(b)\}^2} \quad (m)$$

$$= \frac{1}{B\left(b-\frac{1}{2},\frac{1}{2}\right)} \times \prod_{k=0}^{\infty} \frac{1}{1+\left(\frac{b\delta}{b+k}\right)^2}$$

$$\approx \frac{1}{B\left(b-\frac{1}{2},\frac{1}{2}\right)} \times \prod_{k=0}^{n} \frac{1}{1+\left(\frac{b\delta}{b+k}\right)^2}$$

and generating, using the computer, the random numbers by a rejection method.

42. A method of generating random numbers in accordance with multivariate non-normal distributions, comprising:
(a) acquiring, using a computer, data of empirical distributions $\{X_1', \ldots, X_N'\}$ with respect to data vector $X_1'$ consisting of n data $x_{i,j}' \sim x_{a,i}'$;
(b) standardizing the data $\{X_1', \ldots, X_N'\}$ to obtain $\{X_1, \ldots, X_N\}$ by using the computer;
(c) calculating a variance covariance matrix Σ based on the standardized data $\{X_1, \ldots, X_N\}$ by using the computer;
(d) calculating third order moment $m_{ijk}$ $(1 \leq i \leq j \leq k \leq n)$ based on the standardized data $\{X_1, \ldots, X_N\}$ by using the computer;
(e) calculating fourth order moment $m_{ijkl}$ $(1 \leq i \leq j \leq k \leq l \leq n)$ based on the standardized data $\{X_1, \ldots, X_N\}$ by using the computer;
(f) calculating a matrix T satisfying $T=\Sigma^{1/2}$ (a square root of the matrix Σ) from the variance covariance matrix Σ by using the computer;
(g) introducing a loss function, wherein a difference between third order moment $m_{ijk}$ $(1 \leq i \leq j \leq k \leq n)$ as well as fourth order moment $m_{ijkl}$ $(1 \leq i \leq j \leq k \leq l \leq n)$ and $f_{ijk}$ $(\zeta, \gamma, \nu, \beta)$ as well as $f_{ijkl}$ $(\zeta, \gamma, \nu, \beta)$ (where $\zeta=(\zeta_1, \ldots, \zeta_m)$, $\nu=(\nu_1, \ldots \nu_m)$) is made to be a loss by using the computer with assuming that distributions according to the data vector have non-normal distributions which satisfy $X=\nu T\xi$ (where ξ is random vector $(\xi_1, \ldots, \xi_m)'$ consisting of m (where m=n) random variables $\xi_1 \sim \xi_m$, wherein independent random variables $\xi_1, \ldots, \xi_m$ satisfy E $(\xi_j)=0$, E $(\xi_j^2)=1$, E $(\xi_j^3)=\zeta_j$, E $(\xi_j^4)=\nu_j$ $(1 \leq j \leq m)$ with respect to parameters $\zeta_j$ and $\nu_j$, and wherein ν satisfies $\nu=1$, $E(\nu^2)=1$, E $(\nu^3)=\gamma=1$ and E $(\nu^4)=\beta=1$ with respect to parameters γ and β) to determine the parameters $(\zeta_1, \ldots, \zeta_m), \gamma, (v_1, \ldots, v_m)$, and $\beta$ so as to minimize a risk function assessed as a whole;

(h) determining a type of Pearson distribution to which the random vector $(\xi_1, \ldots, \xi_m)'$ belongs, based on the determined parameters $(\zeta_1, \ldots, \zeta_m), \gamma, (v_1, \ldots, v_m)$ and $\beta$ using the computer in accordance with the following expression (1) and table (ss), where $\beta_1$ is square of skewness and $\beta_2$ is kurtosis:

$$\kappa = \frac{\beta_1(\beta_2+3)^2}{4(2\beta_2-3\beta_1-6)(4\beta_2-3\beta_1)} \quad (1)$$

TABLE (ss)

| | |
|---|---|
| $0 < \kappa < 1$ | Pearson IV Type |
| $\kappa > 1$ | Pearson VI Type(Beta II Type) |
| $\kappa < 0$ | Pearson I Type(Beta I Type) |
| $\kappa = 0, \beta_1 = 0, \beta_2 < 3$ | Pearson II Type(Beta I Type) |
| $\kappa = 0, \beta_1 = 0, \beta_2 = 3$ | Normal |
| $\kappa = 0, \beta_1 = 0, \beta_2 > 3$ | Pearson VII Type |
| $\kappa = \pm\infty, 2\beta_2 - 3\beta_1 - 6 = 0$ | Pearson III Type(Gamma) |
| $\kappa = 1$ | Pearson V Type |

(i) generating, using a computer, random numbers;

(j) calculating random numbers with respect to the random vector $(\xi_1, \ldots, \xi_m)'$ based on the random numbers generated;

(k) calculating the standardized random numbers of X based on $X = vT\xi$ by using the computer;

(l) transforming, using the computer, the standardized random numbers of X into the random numbers before standardization by an inverse transformation of the standardization;

where $\beta_1$ is square of skewness, $\beta_2$ is kurtosis, and $v$ differs from the parameter $v=(v_1, \ldots, v_m)$ in the expression (1) and table (ss):

wherein and the loss function (L) and the risk function (R) are given by either pair of expressions (q) and (r), (s) and (t), or (u) and (v):

$$L(x, y) = (x - y)^2 \quad (q)$$

$$R = \sum_{i \leq j \leq k} w_{ijk}(f_{ijk}(T, \zeta, \gamma, \kappa, \beta) - m_{ijk})^2 + \quad (r)$$
$$\sum_{i \leq j \leq k \leq l} w_{ijkl}(f_{ijkl}(T, \zeta, \gamma, \kappa, \beta) - m_{ijkl})^2$$

$$L(x, y) = |x - y|, \quad (s)$$

$$R = \sum_{i \leq j \leq k \leq l} w_{ijkl}|f_{ijk}(T, \zeta, \gamma, \kappa, \beta) - m_{ijk}| + \quad (t)$$
$$\sum_{i \leq j \leq k \leq l} w_{ijkl}|f_{ijkl}(T, \zeta, \gamma, \kappa, \beta) - m_{ijkl}|$$

$$L(x, y) = |x - y|^p (p > 0), \text{ and} \quad (u)$$

$$R = \sum_{i \leq j \leq k} w_{ijk}|f_{ijk}(T, \zeta, \gamma, \kappa, \beta) - m_{ijk}|^p + \quad (v)$$
$$\sum_{i \leq j \leq k \leq l} w_{ijkl}|f_{ijkl}(T, \zeta, \gamma, \kappa, \beta) - m_{ijkl}|^p.$$

where $f_{ijk}(T, \zeta, \gamma, \Xi, \beta)$ and $f_{ijkl}(T, \zeta, \gamma, v, \beta)$ are third order moment $E(x_i x_j x_k)$ and fourth order moment $E(x_i x_j x_k x_l)$ represented by the formula (a) and (b), and $W_{ijk}$ and $W_{ijkl}$ are predetermined weights, respectively;

$$E(vech(XX')X') = \gamma D_n^+(T \otimes T)\left(\sum_{j=1}^m \zeta_j E_{ii} \otimes e_i\right)T' \quad (a)$$

$$\text{var}(vech(XX')) = 2\beta D_n^+(\Sigma \otimes \Sigma) D_n^{+'} + \quad (b)$$
$$(\beta - 1) vech(\Sigma) vech'(\Sigma) +$$
$$\beta \sum_{j=1}^m (\kappa_j - 3) vech(t_j t_j') vech'(t_j t_j')$$

where E (•) is an expectation, vech (•) is a vector consists of matrix elements not duplicated in symmetrical matrix, $D_n$ is an n-order duplication matrix, $D_n^+$ is the Moore-Penrose generalized inverse matrix of $D_n$, $\otimes$ is the Kronecker product, and $E_{ii}$ is $e_i e_i'$ when $e_i$ is the ith column unit.

43. The method of generating random numbers in accordance with claim 42, wherein the random numbers generated in (i) includes pseudo-random numbers by at least one of an additive generator method, an M-sequence method, a generalized feedback shift-register method, and a Mersenne Twister method, and excluding a congruential method, quasi-random numbers, low discrepancy sequences, and physical random numbers.

44. A method of estimating parameters of multivariable non-normal distributions, comprising:

fitting, using a computer, n-dimensional multivariate non-normal distributions for n-dimensional empirical distributions based on the Yuan and Bentler method I by employing the following formulae (a) and (b):

$$E(vech(XX')X') = \gamma D_n^+(T \otimes T)\left(\sum_{j=1}^m \zeta_j E_{ii} \otimes e_i\right)T' \quad (a)$$

$$\text{var}(vech(XX')) = 2\beta D_n^+(\Sigma \otimes \Sigma) D_n^{+'} + \quad (b)$$
$$(\beta - 1) vech(\Sigma) vech'(\Sigma) +$$
$$\beta \sum_{j=1}^m (\kappa_j - 3) vech(t_j t_j') vech'(t_j t_j')$$

calculating, using a computer, random numbers with respect to the following X assuming that the n-dimensional empirical distributions have non-normal distributions which satisfy $X = vT\xi$, where $\xi$ is random vector $(\xi_1, \ldots, \xi_m)'$ consisting of m (where $m \geq n$) random variables $\xi_1 \sim \xi_m$, wherein independent random variables $\xi_1, \ldots, \xi_m$ satisfy $E(\xi_j) = 0$, $E(\xi_j^2) = 1$, $E(\xi_j^3) = \zeta_j$, $E(\xi_j^4) = v_j$ ($1 \leq j \leq m$) with respect to parameters $\zeta_j$ and $v_j$, and wherein $v$ satisfies $v = 1$, $E(v^2) = 1$, $E(v^3) = 1$, and $E(v^4) = 1$;

dividing spaces concerning respective random variables $x_1$ to $x_n$ with a predetermined spacing $\Delta h$ by using the computer to divide the n-dimensional spaces into hypercubes of $(\Delta h)^n$;

dividing, using the computer, the number of random numbers existing in sections $(\Delta h)^n$ to which respective data vectors belong by the total number of the random numbers to calculate a probability $P_i(\theta)$ of the questioned sections $(\Delta h)^n$;

dividing, using the computer, the probability $P_i(\theta)$ by n-dimensional volume $(\Delta h)^n$ to calculate a likelihood $f_i(\theta)$ of the sections $(\Delta h)^n$ to which the data vectors belong; and estimating a parameter θ by which a product $\Pi_{i=1}^{N} fi(\theta)$ of the likelihood or a sum of logarithmic likelihood $\Sigma_{i=1}^{N} \log fi(\theta)$ comes to be the maximum by using the computer, where E (•) is an expectation, vech (•) is a vector consists of matrix elements not duplicated in symmetrical matrix, $D_n$ is an n-order duplication matrix, $D_n^+$ is the Moore-Penrose generalized inverse matrix of $D_n$, ⊗ is the Kronecker product, and $E_{ii}$ is $e_i e_i'$ when $e_i$ is the ith column unit;

wherein the Yuan and Bentler method I uses:

independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=v_j$ ($1 \leq j \leq m$) with respect to parameters $\zeta_j$ and $\kappa_j$;

ν that satisfiers $v=1$, E $(v^2)=1$, E $(v^3)=1$, and E $(v^4)=1$;

a non-random n×m (m≧n) matrix $T=(t_{ij})$ of n rank that satisfies TT'=Σ with respect to a matrix $\Sigma=(\sigma_{ij})$ where the matrix T' is a transposed matrix of T and where random vector $X=(x_1, \ldots, x_n)'$ given by the following expression (c) satisfies Cov (X)=

$$\Sigma: X=vT\xi \quad (c)$$

where Cov(•) is a variance covariance matrix of a vector, and $\xi=(\xi_1, \ldots, \xi_m)'$.

45. The method according to claim 44, wherein random numbers according to the Pearson distribution system are employed for the random variables $\xi 1, \ldots, \xi m$.

46. The method according to claim 45, wherein at least two types of Pearson distribution are employed for random variables $\xi 1, \ldots, \xi m$.

47. The method according to claim 44, wherein the n-dimensional empirical distributions is represented by $\{X1, \ldots, Xn\}$ in which each Xi (i=1, … n) is a vector consisting of a plurality of empirical data xi,j (J=1 … .N), wherein N is number of data;

wherein actual returns of n-types of asset are selected as the empirical data xi,j;

the method further comprising:

calculating random numbers $W=\Sigma i (wi*Xi)$, (i=1 … n), in which Xi is a random vector calculated above and wi is predetermined weight;

calculating a returns distribution based on the random numbers W thus calculated;

determining a position of return at which region integrated from minus infinity of the returns distribution is equal to a predetermined percent of total region; and defining the position of return as a return value.

48. The method of claim 47, further comprising:

calculating a value at risk by multiplying a absolute value of the return value by the amount of asset.

49. The method according to claim 44, further comprising:

calculating n asset allocations by inputting random vectors Xi(i=1 … n) calculated above into a mean-absolute deviation-skewness portfolio optimization method, wherein the mean-absolute deviation-skewness portfolio optimization model produces n asset allocation value Ai as outputs when n random variables yi are input into the model.

50. The method according to claim 44, further comprising:

calculating n asset allocations by inputting random vectors Xi (i=1 … n) calculated above into a mean-variance-skewness portfolio optimization model, wherein the mean-variance-skewness portfolio optimization model produces n asset allocation value Ai as outputs when n random variables yi are input into the model.

51. The method according to claim 44, further comprising:

calculating random number of each Xi(i=1. … n) for a parameter showing a time t;

regarding the random number thus calculated as a return of financial asset at the time t.

52. A method for generating random numbers on a computer in accordance with multivariate non-normal distributions based on the Yuan and Bentler method I, comprising:

fitting, using a computer, the n-dimensional multivariate non-normal distributions for n-dimensional empirical distributions;

generating, using the computer, random numbers; and calculating an expected amount of loss by applying the n-dimensional multivariate non-normal distributions to n-dimensional profit and loss distributions of n types of assets constituting a portfolio to calculate the expected amount of loss in a simulation:

wherein the fitting employs the following formulae (a) and (b) with respect to an application as to third and forth order moments of the empirical distributions:

$$E(vech(XX')X') = \gamma D_n^+ (T \otimes T) \left( \sum_{j=1}^{m} \zeta_j E_{ii} \otimes e_i \right) T' \quad (a)$$

$$\text{var}(vech(XX')) = 2\beta D_n^+ (\Sigma \otimes \Sigma) D_n^{+'} + \\ (\beta - 1) vech(\Sigma) vech'(\Sigma) + \\ \beta \sum_{j=1}^{m} (\kappa_j - 3) vech(t_j t_j') vech'(t_j t_j') \quad (b)$$

where E (•) is an expectation, vech (•) is a vector consists of matrix elements not duplicated in symmetrical matrix, $D_n$ is an n-order duplication matrix $D_n^+$ is the Moore-Penrose generalized inverse matrix of $D_n$, ⊗ is the Kronecker product, and $E_{ii}$ is $e_i e_i'$ when $e_i$ is the ith column unit;

wherein the Yuan and Bentler method I uses:

independent random variables $\xi_1, \ldots, \xi_m$ that satisfy E $(\xi_j)=0$, E $(\xi_j^2)=1$, E $(\xi_j^3)=\zeta_j$, and E $(\xi_j^4)=v_j$ ($1 \leq j \leq m$) with respect to parameters $\zeta_j$ and $v_j$;

ν that satisfies $v=1$, E $(v^2)=1$, E $(v^3)=1$, and E $(v^4)=1$;

a non-random n×m (m≧n) matrix $T=(t_{ij})$ of n rank that satisfies TT'=Σ with respect to a matrix $\Sigma=(\sigma_{ij})$ where the matrix T' is a transported matrix of T and where random vector $X=(x_1, \ldots, x_n)'$ given by the following expression (c) satisfies Cov (X)=

$$\Sigma: X=vT\xi \quad (c)$$

where Cov (•) is a variance covariance matrix of a vector, and $\xi=(\xi_1, \ldots, \xi_m)'$.

* * * * *